United States Patent [19]

Daughters et al.

[11] Patent Number: 4,742,215
[45] Date of Patent: May 3, 1988

[54] IC CARD SYSTEM

[75] Inventors: Turpen A. Daughters, Pinole; Patricia A. McGinnis, San Anselmo, both of Calif.

[73] Assignee: Personal Computer Card Corporation, New York, N.Y.

[21] Appl. No.: 860,560

[22] Filed: May 7, 1986

[51] Int. Cl.⁴ .............................................. G06K 19/06
[52] U.S. Cl. ...................... 235/487; 235/380
[58] Field of Search ................. 235/487, 380

[56] References Cited

U.S. PATENT DOCUMENTS

| | | |
|---|---|---|
| 3,702,464 | 11/1972 | Castrucci. |
| 3,868,057 | 2/1975 | Chavez. |
| 3,876,865 | 4/1975 | Bliss. |
| 3,894,756 | 7/1975 | Ward. |
| 3,919,447 | 11/1975 | Kilmer, Jr. et al. |
| 3,934,122 | 1/1976 | Riccitelli. |
| 3,971,916 | 7/1976 | Moreno. |
| 4,001,550 | 1/1977 | Schatz. |
| 4,004,133 | 1/1977 | Hannan et al. |
| 4,007,355 | 2/1977 | Moreno. |
| 4,092,524 | 5/1978 | Moreno. |
| 4,102,493 | 7/1978 | Moreno. |
| 4,211,919 | 7/1980 | Ugon. |
| 4,105,156 | | Dethloff. |
| 4,216,577 | 8/1980 | Badet et al. |
| 4,222,516 | 8/1980 | Badet et al. |
| 4,256,955 | 3/1981 | Giraud et al. |
| 4,295,041 | 10/1981 | Ugon. |
| 4,353,064 | 10/1982 | Stamm. |
| 4,361,756 | 11/1982 | Parmentier. |
| 4,367,402 | 1/1983 | Giraud et al. |
| 4,380,699 | 4/1988 | Monnier et al. |
| 4,382,279 | 5/1983 | Ugon. |
| 4,404,464 | 9/1988 | Moreno. |
| 4,408,119 | 10/1988 | Decavele. |
| 4,409,471 | 10/1988 | Aigo. |
| 4,442,345 | 4/1984 | Mollier et al. |
| 4,443,027 | 4/1984 | McNeely et al. |
| 4,447,716 | 5/1984 | Aigo. |
| 4,453,074 | 6/1984 | Weinstein. |
| 4,544,833 | 10/1985 | Ugon. |
| 4,471,216 | 9/1984 | Herve. |
| 4,549,075 | 10/1985 | Saada et al. |
| 4,459,474 | 7/1984 | Walton. |
| 4,463,971 | 8/1984 | Hoppe et al. |
| 4,474,292 | 10/1984 | Haghiri-Tehrani et al. |
| 4,483,067 | 11/1984 | Parmentier. |
| 4,499,371 | 2/1985 | Rose. |
| 4,501,960 | 2/1985 | Jouvet et al. |
| 4,506,148 | 3/1985 | Berthold et al. |
| 4,511,796 | 4.1985 | Aigo. |
| 4,532,419 | 7/1985 | Takeda. |
| 4,535,557 | 8/1985 | Porcher. |
| 4,539,472 | 9/1985 | Poetker et al. |
| 4,550,248 | 10/1985 | Hoppe et al. |
| 4,556,958 | 12/1985 | Ugon. |

*Primary Examiner*—Harold I. Pitts
*Attorney, Agent, or Firm*—Brumbaugh, Graves, Donohue & Raymond

[57] ABSTRACT

An IC information card includes a programmed microprocessor and a nonvolatile read/write memory (EPROM) embedded in a plastic card. Terminal contacts on the face of the card enable interfacing with a reader/writer coupled to a host computer, such as an IBM-XT. The data storage portion of the memory in the card is segmentable into one or more data zones, each requiring either no access code or one or more access codes to be entered in the card in order to access (read and/or write) that zone. Segmentation of the card memory and the assignment of required access codes is achieved by writing a zone definition table and one or more access codes into the card memory using a special access code that is fixed in the microprocessor program. The access codes for the data zones are thus stored on the card and the programmed microprocessor in the card compares incoming codes to the stored codes to determine whether access to a particular data zone is permissible. The access codes for the data zones of the card memory are advantageously stored in a control card, which is interfaced to a two-card reader/writer together with the card to be accessed.

19 Claims, 122 Drawing Sheets

Microfiche Appendix Included
(2 Microfiche, 145 Pages)

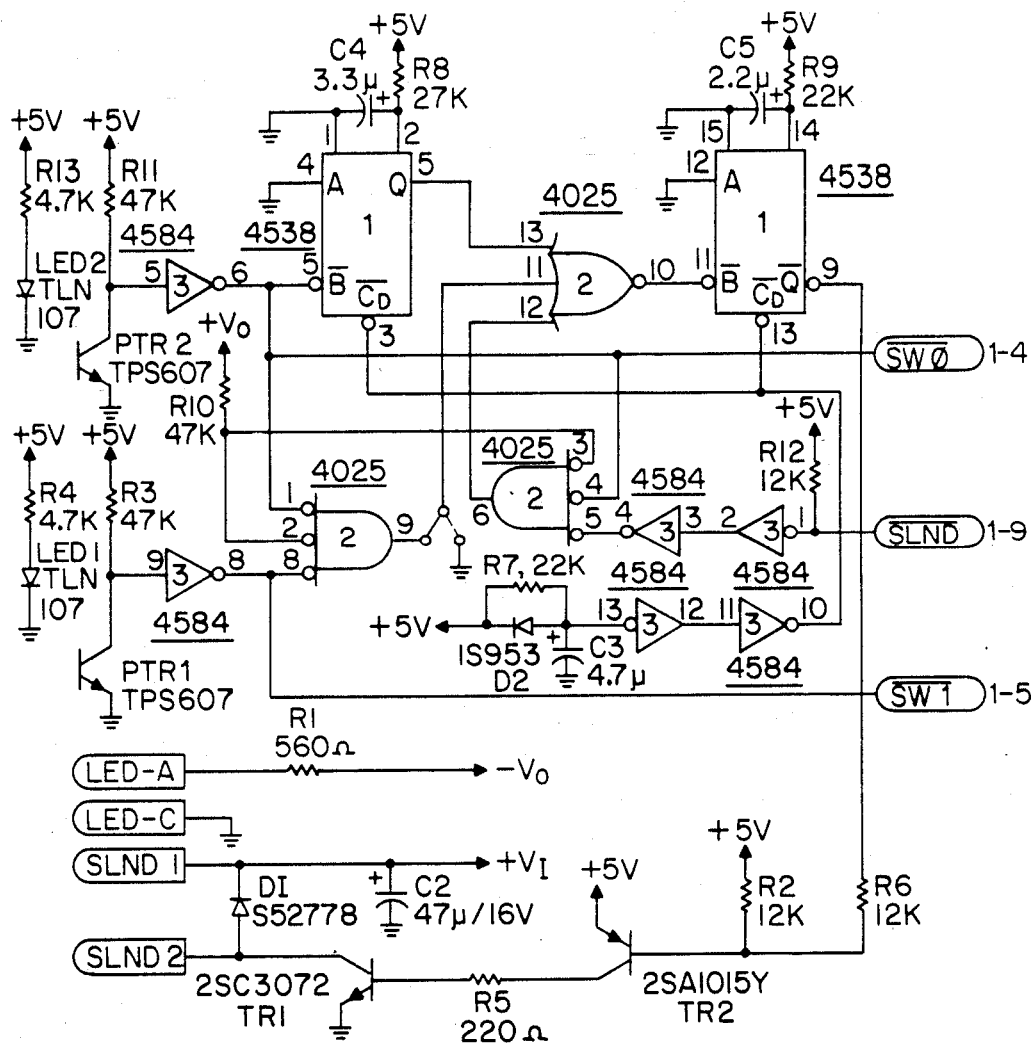
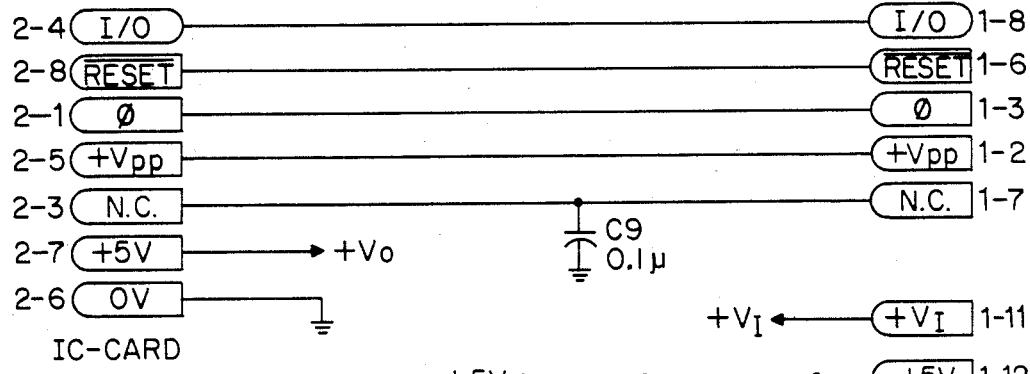
FIG. 11

MASTER CARD ZONE CONFIGURATION

| ZONE # | CONTENT | SECURITY LEVEL | | RECORD LENGTH |
|---|---|---|---|---|
| | | FOR WRITE | FOR READ | |
| 1 | CARD CODE | P-KEY | $\bar{O}$-KEY | 8 |
| 2 | BATCH NUMBER | P-KEY | $\bar{O}$-KEY | 8 |
| 3 | INDICATOR | P-KEY | $\bar{O}$-KEY AND PIN | 1 |
| 4 | O-KEY DATA | P-KEY | $\bar{O}$-KEY AND PIN | 8 |
| 5 | INDICATOR | P-KEY | $\bar{O}$-KEY AND PIN | 1 |
| 6 | NAME INDEX | P-KEY | $\bar{O}$-KEY AND PIN | 8 |
| 7 | INDICATOR | P-KEY | $\bar{O}$-KEY AND PIN | 1 |
| 8 | Z.D.T. DATA | P-KEY | $\bar{O}$-KEY AND PIN | $n$ |

PINWR <WRITE PIN>

R/W (BIOS)                  CARD

COMMAND(21H)

RETURN CODE

00H  : O.K.
            EEXIS : ALREADY
                WRITTEN
            ELOCK: LOCKED CARD
            ECOMD: COMMAND ERROR
            ESFUL : SECURITY MARK
                AREA FULL
                (PERMANENT
                LOCK)

ERTES: READ TEST
               ERROR (HARD
(IF <RETURN CODE> ≠ 00 THEN        WIRE ERROR)
  (RETURN WITH ERROR CODE)
(VPP ON)     O-KEY OR
        P-KEY (8 BYTES)
            (KEY CHECK)
    RETURN CODE

00H  : O.K.
            EKEYC: KEY INCORRECT
            ESECM: SECURITY MARK
                ERROR (IF < RETURN CODE > ≠ 00 THEN
  (VPP OFF) AND (RETURN WITH ERROR CODE)

PIN (4 BYTES DATA TO BE WRITTEN)

RETURN CODE

00H  : O.K.
            EWRIT : WRITE ERROR (VPP OFF)
(RETURN WITH O.K. OR ERROR CODE)

FIG. 23

PINWR <WRITE PIN>

R/W (BIOS)                                                                CARD

COMMAND(21H)

RETURN CODE

ØØH  : O.K.
                                    EEXIS : ALREADY
                                                 WRITTEN
                                    ELOCK: LOCKED CARD
                                    ECOMD: COMMAND ERROR
                                    ESFUL: SECURITY MARK
                                               AREA FULL
                                               (PERMANENT
                                               LOCK)

ERTES: READ TEST
                                         ERROR (HARD
(IF <RETURN CODE> ≠ ØØ THEN            WIRE ERROR)
    (RETURN WITH ERROR CODE)
(VPP ON)         O-KEY OR
                P-KEY (8 BYTES)
                                       (KEY CHECK)
              RETURN CODE

ØØH   : O.K.
                                  EKEYC: KEY INCORRECT
                                  ESECM: SECURITY MARK
                                             ERROR (IF <RETURN CODE> ≠ ØØ THEN
   (VPP OFF) AND (RETURN WITH ERROR CODE)

PIN (4 BYTES DATA TO BE WRITTEN)

RETURN CODE

ØØH  : O.K.
                                EWRIT: WRITE ERROR (VPP OFF)
(RETURN WITH O.K. OR ERROR CODE)

FIG. 23

OKEYWR <WRITE ORGANIZATION KEY>

R/W (BIOS)                                                      CARD

COMMAND (23H) →
                    ← RETURN CODE
                                    OK, ECOMD, ELOCK,
                                    ERTES, EEXIS OR
                                    ESFUL (IF <RETURN CODE> ≠ 00H
    THEN RETURN)
(VPP ON)

P-KEY →
                    ← RETURN CODE
                                    OK, EKEYC OR ESECM (IF <RETURN CODE> ≠ 00H THEN
    (VPP OFF) AND (RETURN))

O-KEY (8 BYTES DATA TO BE WRITTEN) →
                    ← RETURN CODE
                                    OK, EWRIT (VPP OFF)
(RETURN)

FIG. 24

RDZDT <READ ZONE DEFINITION TABLE>

R/W (BIOS)                                                              CARD

COMMAND (24H) ⟶

⟵ RETURN CODE
                                    | OK, ECOMD, ELOCK
                                    | ESFUL, ERTES (IF <RETURN CODE> ≠ 00H
     THEN (RETURN))
(VPP ON)

KEY TYPE ⟶
        PIN :1H
        O-KEY :2H
        P-KEY :5H

KEY ⟶

⟵ RETURN CODE
                                    | OK, EKEYC, ESECM (VPP OFF)
(IF <RETURN CODE> ≠ 00H
     THEN (RETURN))

ZONE NUMBER ⟶
        01H-FFH |
                    ⟵ RETURN CODE
                                    | OK,
                                    | EZONE : ZONE NUMBER
                                    |         ERROR
                                    |         ZONE DOESN'T
                                    |         EXIST (IF <RETURN CODE> ≠ 00H
     THEN RETURN))

(READ DATA)
                    ⟵ ZONE DEFINITION TABLE (6 BYTES)
(RETURN)

FIG. 25

WRZDT <WRITE ZONE DEFINITION TABLE>

R/W (BIOS)                                                               CARD

COMMAND (25H)

RETURN CODE

OK, ECOMD, ELOCK,
                                      ESFUL, ERTES
                                    EEXIS: ZONE DEFINITION
                                          TABLE ALREADY
                                          CLOSED (IF <RETURN CODE> ≠ ØØH
     THEN (RETURN))
(VPP ON)

P-KEY

RETURN CODE

OK, EKEYC, ESECM (IF <RETURN CODE> ≠ ØØH
     THEN (VPP OFF) & (RETURN))

ZONE NUMBER
         Ø1H-FFH
                       RETURN CODE

OK
                                    EZONE: ZONE NUMBER
                                         ERROR (IF <RETURN CODE> ≠ ØØH
     THEN (VPP OFF) & (RETURN))
                 ZONE DEFINITION TABLE
                 DATA TO BE WRITTEN

RETURN CODE

OK, EWRIT (VPP OFF)
(RETURN)

FIG. 26

CLZDA <CLOSE ZONE DEFINITION AREA>

R/W (BIOS)                                                                                                CARD

———— COMMAND (26H) ————→

←———— RETURN CODE ————

OK, ECOMD, ELOCK,
                                                            ESFUL, ERTES
                                               EEXIS: ZONE DEFINITION
                                                             TABLE ALREADY
                                                             CLOSED (IF <RETURN CODE> ≠ 00H
    THEN (RETURN))
(VPP ON)

———— P-KEY ————→

←———— RETURN CODE I ————

OK, EKEYC, ESECM (IF <RETURN CODE> ≠ 00H
    THEN (VPP OFF) & (RETURN))

←———— CODE II ————

OK
                                                     EMRIT: CLOSE FAILURE (VPP OFF)
(RETURN)

FIG. 27

RDZN <READ A ZONE>

R/W (BIOS)                                                                    CARD

COMMAND (10H) ⟶

⟵ RETURN CODE
                                          OK, ELOCK, ECOMD,
                                          ESFUL, ERTES (IF <RETURN CODE> ≠ 00H
    THEN (RETURN))

ZONE NUMBER ⟶
    01H-FFH
                   ⟵ RETURN CODE
(IF <RETURN CODE> ≠ 00H              OK, EZONE
    THEN (RETURN))   SECURITY LEVEL ⟶
                                          0H ~ 7H

┌─────────────────────────────────┐
           │  SEE KEY PROCEDURE (NEXT PAGE)  │
           └─────────────────────────────────┘

⟵ NUMBER OF RECORDS (N)
                                          00H ~ FFH
                                          IN CASE 0: THERE IS NO
                                                     RECORD IN
                                                     THAT CARD (IF <NUMBER OF RECORDS> ≠ 00H
     THEN RETURN))

⟵ RECORD LENGTH (L)

⟵ 1ST RECORD DATA (L) BYTES DATA

⟵ CHECK SUM BYTE

•
                           •
                           •

⟵ NTH RECORD DATA

⟵ CHECK SUM BYTE   (N) MEANS NUMBER
                                          OF RECORDS

FIG. 28

WRZN <WRITE ZONE (WRITE ONE RECORD)>

```
R/W (BIOS)                                                    CARD
                        COMMAND (11H) ⟶
                   ⟵ RETURN CODE
                                        OK, ECOMD, ELOCK,
                                          ESFUL, ERTES (IF <RETURN CODE> ≠ ØØH
   THEN (RETURN))
                        ZONE NUMBER ⟶
                   ⟵ RETURN CODE
                                        OK, EZONE
                                        EZFUL: ZONE FULL (IF <RETURN CODE> ≠ ØØH
   THEN (RETURN))
                   ⟵ SECURITY LEVEL
                                        ØH~7H

┌──────────────────┐
                  │ SEE KEY PROCEDURE │
                  └──────────────────┘
                        DATA LENGTH ⟶
  Ø1H-FFH (BYTES)
                   ⟵ RETURN CODE
                                        OK       DATA > RECORD
                                        EOVER: LENGTH LENGTH (IF <RETURN CODE> ≠ ØØH THEN (RETURN))
(VPP ON)
              1ST 1 BYTE DATA TO BE WRITTEN ⟶
                   ⟵ RETURN CODE
                                        OK, EWRIT
                                        EMALC: ALLOCATION
                                                MARK ERROR (IF <RETURN CODE> ≠ ØØH
   THEN (RETURN))
                        2ND 1 BYTE DATA ⟶
```

FIG. 30 ——— TO NEXT PAGE ———

WRZN <WRITE ZONE (WRITE 1 RECORD)>

———FROM BEFORE PAGE———

/ RETURN CODE
| OK, EWRIT (IF <RETURN CODE> ≠ ØØH
   THEN (VPP OFF) & RETURN •

•
•
•

NTH 1 BYTE DATA \

/ RETURN CODE
| OK, EWRIT

/ RETURN CODE
| OK, EWRIT
  CHECK SUM WRITE
     RESULT (VPP OFF)
(RETURN)

FIG. 31

WRZNWV <WRITE ZONE WITH VERIFY>

R/W (BIOS)                                                CARD

| SAME AS WRZN COMMAND |
COMMAND = (11H)

(IF <RETURN CODE> ≠ ØØH
   THEN (VPP OFF) & (RETURN))

/ RECORD LENGTH [L]

/ DATA (L BYTES)

/ CHECK SUM (R/W ERROR CHECK)
   ERROR CASE

ECHEK : CHECK SUM ERROR
      EVEFY : VERIFY ERROR (RETURN)                FIG. 32

STRD <READ RECORD STATUS>

R/W (BIOS)                                                                  CARD

COMMAND (14H) →

← RETURN CODE

OK, ECOMD, ELOCK,
                                  ESFUL, ERTES (IF <RETURN CODE> ≠ ØØH
    THEN (RETURN))

ZONE NUMBER →

← RETURN CODE

OK, EZONE (IF <RETURN CODE> ≠ ØØH
    THEN (RETURN))

← SECURITY LEVEL

| SEE KEY PROCEDURE |

← NO. OF RECORDS [N]

(IF <NUMBER OF RECORDS> ≠ ØØH
    THEN (RETURN))

← STATUS (1 BYTE)

REPEAT [N] TIMES (RETURN)

FIG. 33

STWR <WRITE RECORD STATUS MARK>

```
R/W (BIOS)                                                  CARD
                        COMMAND (15H) ↘
                       ↙ RETURN CODE
                                    │ OK, ECOMD, ELOCK,
                                    │   ESFUL, ERTES (IF <RETURN CODE> ≠ ØØH
    THEN (RETURN))
                          ZONE NUMBER ↘
            Ø1H~FFH │
                       ↙ RETURN CODE
                                    │ OK, EZONE
(IF <RETURN CODE> ≠ ØØH
    THEN (RETURN))    ↙ SECURITY LEVEL
                                    │ Ø1H~Ø7H

┌─────────────────────┐
                    │  SEE KEY PROCEDURE  │
                    └─────────────────────┘
                         RECORD NUMBER ↘
            Ø1H~FFH │
                       ↙ RETURN CODE
                                    │ OK
                                    │ ERECD: RECORD NUMBER
                                    │          ERROR (IF <RETURN CODE> ≠ ØØH
    THEN (RETURN))
(VPP ON)
                          BIT NUMBER ↘
               0-7 │
                       ↙ RETURN CODE
                                    │ OK
                                    │ EWRIT: MARK ERROR
                                    │ EBITN: BIT NUMBER
                                    │          ERROR
(VPP OFF)
(RETURN)
```

FIG. 34

REMAIN <NUMBER OF REMAINING RECORDS>

R/W (BIOS)                                                              CARD

COMMAND (28H) →

← RETURN CODE

OK, ECOMD, ELOCK,
                                    ESFUL, ERTES (IF <RETURN CODE> ≠ ØØH
    THEN (RETURN))

ZONE NUMBER →

← RETURN CODE
                                  OK, EZONE (IF <RETURN CODE> ≠ ØØH
    THEN (RETURN))

← SECURITY LEVEL
                                ØH ~ 7H

| SEE KEY PROCEDURE |

← NUMBER OF REMAINING RECORDS
                                  (ØØH ~ FFH)

(RETURN)          FIG. 36

MTEST <TEST AT MANUFACTURING>

R/W (BIOS)                                                              CARD

COMMAND (3ØH) →

← ANSWER (USUALLY SAME COMMAND
                                  ECOMD: COMMAND ERROR (IF <ANSWER> ≠ <COMMAND>
    THEN (RETURN))
(VPP ON)

COMMAND →

← RESULT
                                  OK, ECOMD
                                  EWRIT: TEST WRITE
                                        ERROR
                                  EBLNK: CARD BLANK
(VPP OFF)                                      ERROR
(RETURN)          FIG. 37

```
                    RTEST <READ TEST>
R/W (BIOS)                                                      CARD
                       COMMAND (31H)
                       ANSWER (USUALLY SAME TO COMMAND)
                                              ECOMD (IF <ANSWER> ≠ <COMMAND>
    THEN (RETURN))

COMMAND
                          RESULT
                                    OK, ECOMD
                                    ERTES: READ TEST
                                           ERROR (RETURN)             FIG. 38
```

```
              RDMPD <READ MASK PROGRAMED DATA>
R/W (BIOS)                                                      CARD
                       COMMAND (42H)
                        RETURN CODE
                                    OK, ECOMD (IF <RETURN CODE> ≠ 00H
    THEN (RETURN))

MASK DATA
                                    (8 BYTES PROGRAM
                                         NAME)
(RETURN)
                        FIG. 39
```

SPECIAL COMMAND:
(L)RDIB
(L)WRIB
RDMPD
MTEST
RTEST
UNLOCK

I/O (P27)='H'
OE (P26)='L'
$\overline{PGM}$ (P25)='H'
RADHI $\begin{pmatrix} P24 \\ | \\ P20 \end{pmatrix}$ ='0'

DATA $\begin{pmatrix} D37 \\ | \\ D30 \end{pmatrix}$ ='1'

RADLO $\begin{pmatrix} P17 \\ | \\ P10 \end{pmatrix}$ ='0'

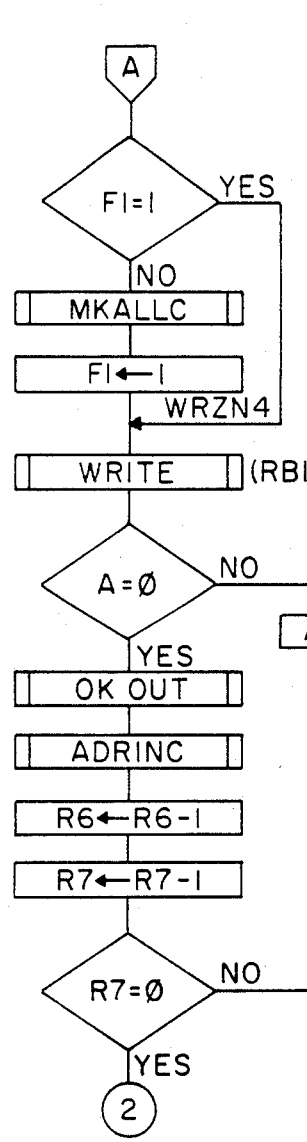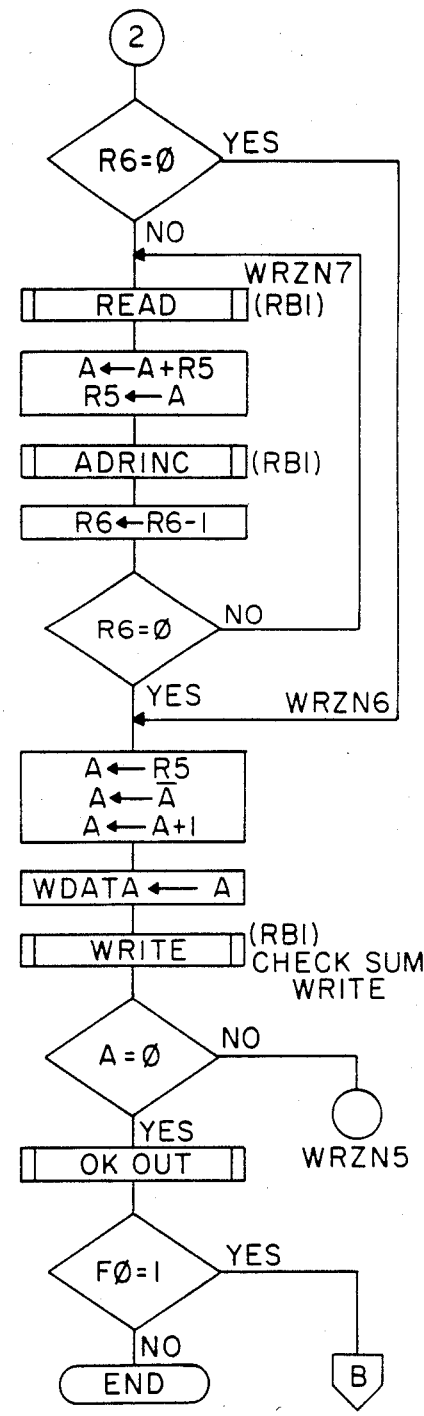
FIG. 57B

| | VA | RA | OFSET |
|---|---|---|---|
| 127 | 0H <br> ∫ <br> 7EH | 81H <br> ∫ <br> 0FFH | 81H |
| 255 | 7FH <br> ∫ <br> 17DH | 101H <br> ∫ <br> 1FFH | 82H |
| 511 | 17EH <br> ∫ <br> 37CH | 201H <br> ∫ <br> 3FFH | 83H |
| 1023 | 37DH <br> ∫ <br> 77BH | 401H <br> ∫ <br> 7FFH | 84H |
| 2047 | 77CH <br> ∫ <br> F7AH | 801H <br> ∫ <br> FFFH | 85H |
| 4015 | F7BH <br> ∫ <br> 1F79H | 1001H <br> ∫ <br> 1FFFH | 86H |

NOP COMMAND (ØØH)
1. FUNCTION
   FORCES AND PLACES I/Z IN A COMMAND WAIT STATUS.
2. PROCEDURE
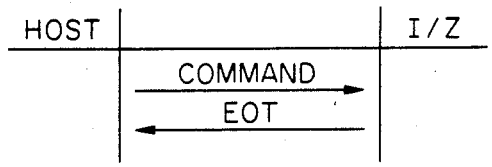
3. COMMAND FORMAT
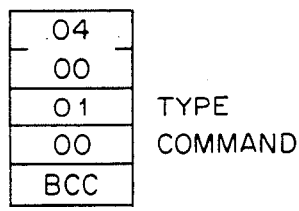
| .04 | |
|-----|------|
| 00  | |
| 01  | TYPE |
| 00  | COMMAND |
| BCC | |
FIG. 92

CARD INPUT COMMAND (01H)

1. FUNCTION

SENDS A CARD TO THE DEFINED POSITION AND CONTACTS IT WITH THE CONTACTOR.

2. PROCEDURE

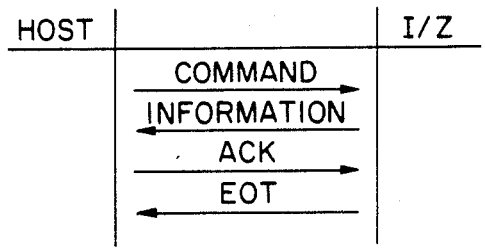

3. COMMAND FORMAT

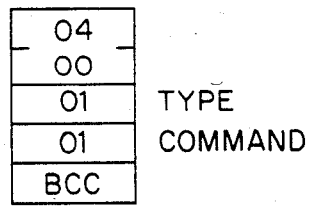

| | |
|---|---|
| 04 | |
| 00 | |
| 01 | TYPE |
| 01 | COMMAND |
| BCC | |

4. INFORMATION FORMAT

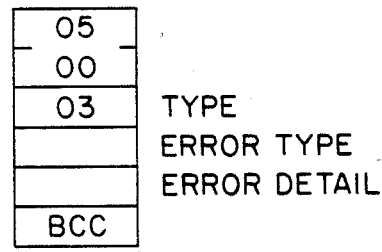

| | |
|---|---|
| 05 | |
| 00 | |
| 03 | TYPE |
| | ERROR TYPE |
| | ERROR DETAIL |
| BCC | |

| ERROR TYPE | ERROR DETAIL |
|---|---|
| NORMAL | NORMAL |
| PROCESS ERROR | CARD NOT INSERTED |
| DEVICE ERROR | CARD STUCK<br>CONTACTOR NOT LOWERING |
| IC CARD SYSTEM ERROR | COMMUNICATIONS ERROR |
| IC CARD FUNCTION ERROR | DEFECTIVE CARD |

FIG. 93

CARD OUTPUT COMMAND (02H)
1. FUNCTION
   SENDS A CARD TO THE EXIT.
2. PROCEDURE
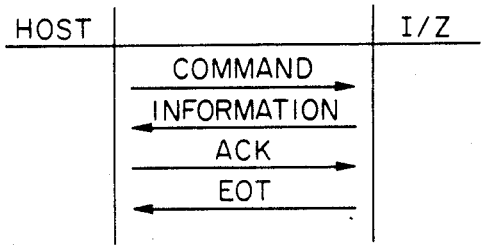
3. COMMAND FORMAT
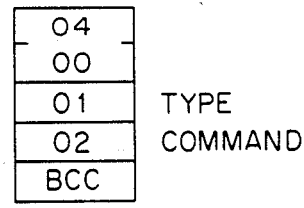
4. INFORMATION FORMAT
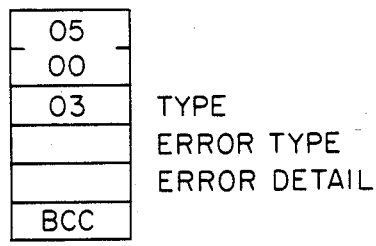
| ERROR TYPE | ERROR DETAIL |
|---|---|
| NORMAL | NORMAL |
|  |  |
| DEVICE ERROR | CARD STUCK<br>CONTACTOR NOT GOING UP |
FIG. 94

MAGNETIC DATA WRITE COMMAND (03H)
1. FUNCTION
   WRITES MAGNETIC DATA AND KEEPS A CARD AT ITS CONTACTOR PART.
2. PROCEDURE
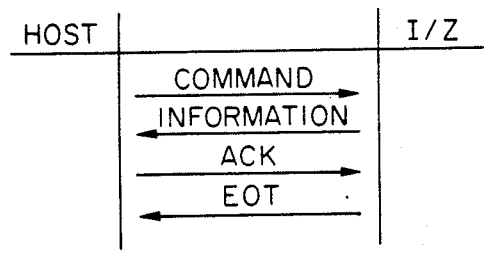
3. COMMAND FORMAT
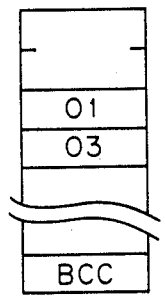
- 01 — TYPE
- 03 — COMMAND
- DATA LENGTH (LENGTH OF DATA PART)
- DATA (STX, ETX, LRC NOT INCLUDED)
- BCC
4. INFORMATION FORMAT
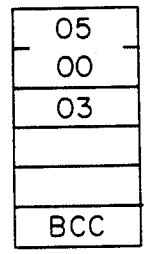
- 05
- 00
- 03 — TYPE
- ERROR TYPE
- ERROR DETAIL
- BCC
FIG. 95A

MAGNETIC DATA WRITE COMMAND (Ø3H) (CONT.)

| ERROR TYPE | ERROR DETAIL |
|---|---|
| NORMAL | NORMAL |
| PROCESS ERROR | CARD NOT INSERTED |
| DEVICE ERROR | CARD STUCK |
| MAGNETIC WRITE ERROR | STX ERROR<br>PARITY ERROR<br>LRC ERROR<br>ETX ERROR<br>LENGTH ERROR<br>CLOCK ERROR<br>VERIFY ERROR |

FIG. 95B

MAGNETIC DATA READ COMMAND (Ø4H)

1. FUNCTION
   READS MAGNETIC DATA AND KEEPS A CARD AT ITS CONTACTOR PART.

2. PROCEDURE

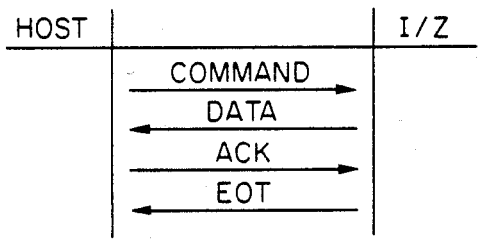

WHEN ERROR OCCURS

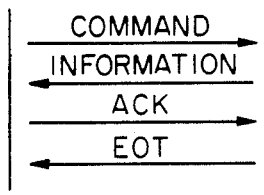

WHEN RETRANSFERRING

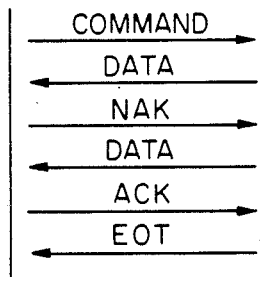

FIG. 96A

MAGNETIC DATA READ COMMAND (Ø4H) (CONT.)
3. COMMAND FORMAT
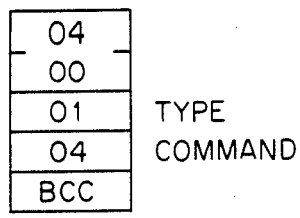
| 04 | |
|----|--|
| 00 | |
| 01 | TYPE |
| 04 | COMMAND |
| BCC | |
4. DATA FORMAT
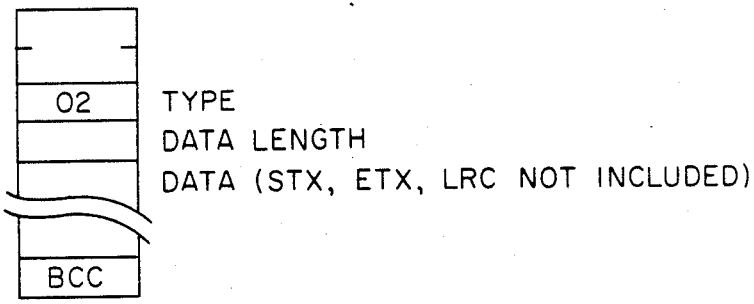
| | |
|---|---|
| 02 | TYPE |
| | DATA LENGTH |
| | DATA (STX, ETX, LRC NOT INCLUDED) |
| BCC | |
5. INFORMATION FORMAT
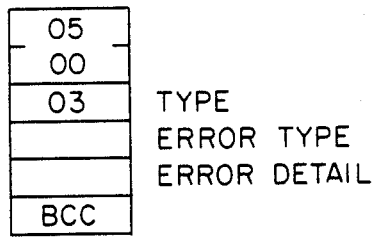
| 05 | |
|----|--|
| 00 | |
| 03 | TYPE |
| | ERROR TYPE |
| | ERROR DETAIL |
| BCC | |
| ERROR TYPE | ERROR DETAIL |
|---|---|
| PROCESS ERROR | CARD NOT INSERTED |
| DEVICE ERROR | CARD STUCK |
| | STX ERROR |
| | PARITY ERROR |
| | LRC ERROR |
| | ETX ERROR |
| | LENGTH ERROR |
| | CLOCK ERROR |
FIG. 96B CONTACTOR DOWN COMMAND (Ø5H)
1. FUNCTION
    LOWERS THE CARD'S CONTACTOR TO CONTACT THE CARD.
2. PROCEDURE
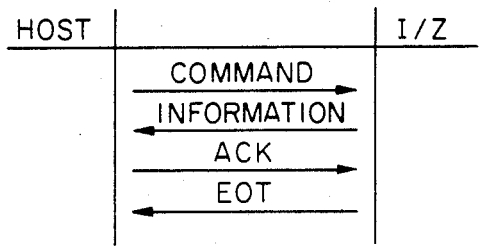
3. COMMAND FORMAT
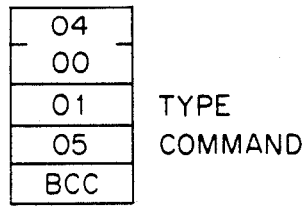
4. INFORMATION FORMAT
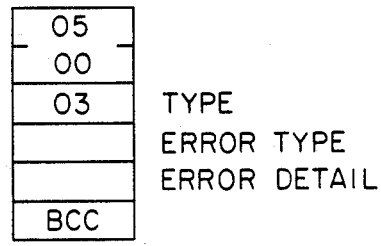
| ERROR TYPE | ERROR DETAIL |
|---|---|
| NORMAL | NORMAL |
| DEVICE ERROR | CONTACTOR NOT LOWERING |
| PROCESS ERROR | CARD NOT INSERTED AT WRONG POSITION |
| IC CARD SYSTEM ERROR | COMMUNICATIONS ERROR |
| IC CARD FUNCTION ERROR | DEFECTIVE CARD |
FIG. 97

CONTACTOR UP COMMAND (Ø6H)
1. FUNCTION
   LIFTS THE CARD'S CONTACTOR TO SEPARATE THE CARD.
2. PROCEDURE
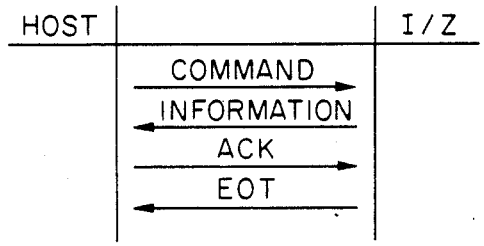
3. COMMAND FORMAT
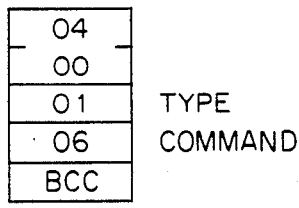
TYPE
COMMAND
4. INFORMATION FORMAT
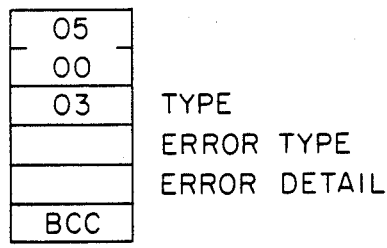
TYPE
ERROR TYPE
ERROR DETAIL
| ERROR TYPE | ERROR DETAIL |
|---|---|
| NORMAL | NORMAL |
| DEVICE ERROR | CONTACTOR NOT GOING UP |
FIG. 98

ZONE WRITE COMMAND (07H)
1. FUNCTION
   WRITES DATA TO THE CERTAIN ZONE #.
2. PROCEDURE
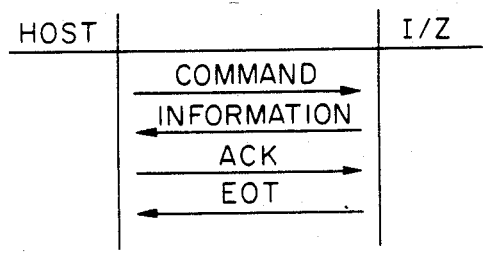
3. COMMAND FORMAT
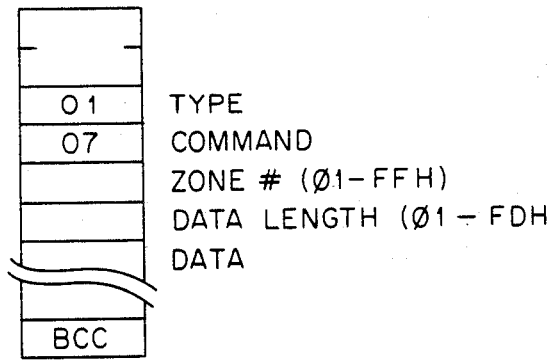
| | |
|---|---|
| 01 | TYPE |
| 07 | COMMAND |
| | ZONE # (01-FFH) |
| | DATA LENGTH (01-FDH) |
| | DATA |
| BCC | |
4. INFORMATION FORMAT
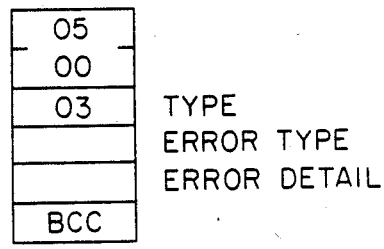
| | |
|---|---|
| 05 | |
| 00 | |
| 03 | TYPE |
| | ERROR TYPE |
| | ERROR DETAIL |
| BCC | |
FIG. 99A

ZONE WRITE COMMAND (∅7H) (CONT.)

| ERROR TYPE | ERROR DETAIL |
|---|---|
| NORMAL | NORMAL |
| IC CARD FUNCTION ERROR | LOCKED<br>DEFECTIVE CARD<br>SECURITY AREA FULL<br>ABNORMAL Vpp<br>Z.D.T. NOT FOUND<br>ZONE FULL<br>LOCKED<br>ENTRY ERROR<br>ZONE PROHIBITED TO USE |
| IC CARD SYSTEM ERROR | COMMUNICATIONS ERROR |
| MEMORY ERROR | P-KEY<br>O-KEY |
| KEY ERROR | P-KEY<br>O-KEY |
| PARAMETER ERROR | DATA TOO LONG<br>ZONE # |
| UNDEFINED ERROR | P-KEY<br>O-KEY |

FIG. 99B

ZONE READ COMMAND (DATA REQUEST) (Ø8H)
1. FUNCTION
   READS DATA OF A CERTAIN ZONE #.
2. PROCEDURE
   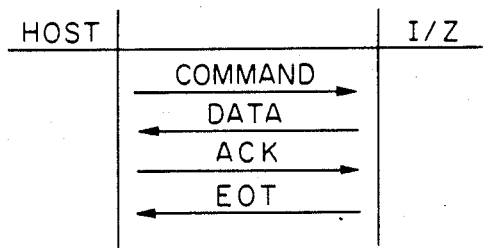
   WHEN ERROR OCCURS
   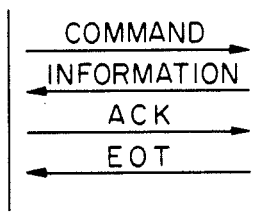
   WHEN RETRANSFERRING
   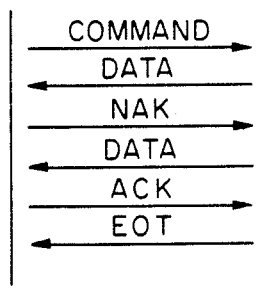
   FIG. 100A ZONE READ COMMAND (Ø8H) (CONT.)
3. COMMAND FORMAT
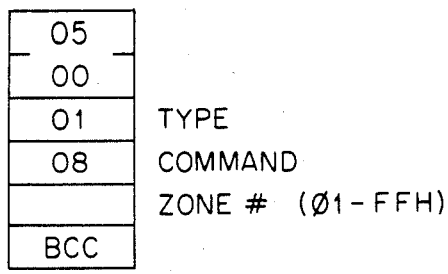
| 05 | |
|---|---|
| 00 | |
| 01 | TYPE |
| 08 | COMMAND |
| | ZONE # (Ø1-FFH) |
| BCC | |
4. DATA FORMAT
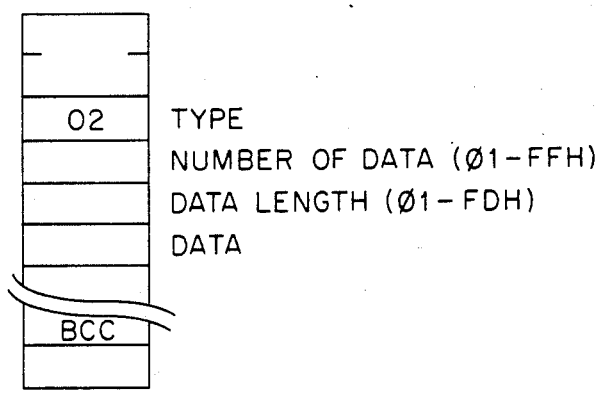
| 02 | TYPE |
|---|---|
| | NUMBER OF DATA (Ø1-FFH) |
| | DATA LENGTH (Ø1-FDH) |
| | DATA |
| BCC | |
5. INFORMATION FORMAT
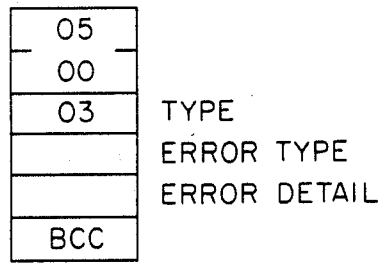
| 05 | |
|---|---|
| 00 | |
| 03 | TYPE |
| | ERROR TYPE |
| | ERROR DETAIL |
| BCC | |
FIG. 100B

ZONE READ COMMAND (Ø8H)

| ERROR TYPE | ERROR DETAIL |
|---|---|
| IC CARD FUNCTION ERROR | LOCKED<br>SECURITY AREA FULL<br>DEFECTIVE CARD<br>Z.D.T. NOT FOUND<br>ZONE PROHIBITED TO USE<br>LOCKED<br>RECORD NOT FOUND<br>DATA CORRUPTED<br>ABNORMAL $V_{PP}$ |
| IC CARD SYSTEM ERROR | COMMUNICATIONS ERROR |
| KEY ERROR | P-KEY<br>O-KEY<br>PIN |
| MEMORY ERROR | P-KEY<br>O-KEY<br>PIN |
| PARAMETER ERROR | ZONE # |
| UNDEFINED SETUP | P-KEY<br>O-KEY<br>PIN |

FIG. 100C

ZONE READ COMMAND (DATA NOT REQUIRED) (Ø9H)
1. FUNCTION
   STORES DATA OF A CERTAIN ZONE # IN THE SPECIFIED LOCATION OF I/Z. THE DATA ARE NOT SENT TO THE HOST COMPUTER.
2. PROCEDURE
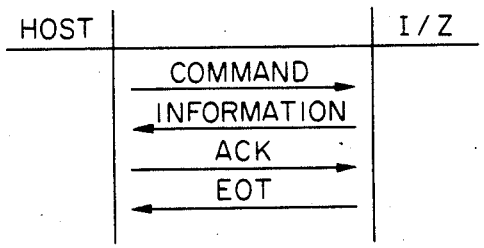
3. COMMAND FORMAT
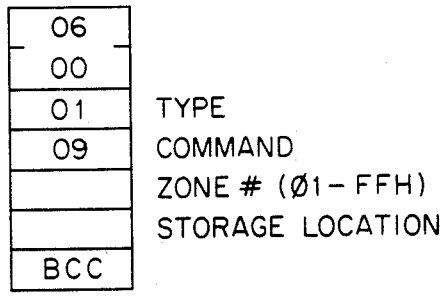
| STORAGE LOCATION | CODE |
|---|---|
| O-KEY | 01 |
| BATCH NUMBER | 02 |
| Z.D.T. | 03 |
| NAME LOCATION DATA | 04 |
FIG. 101A

ZONE READ COMMAND (09H) (CONT.)

4. INFORMATION FORMAT

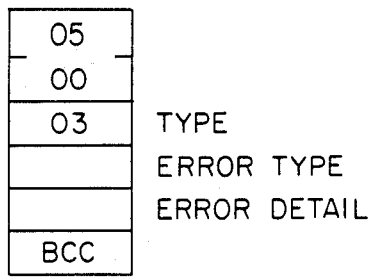

| 05 |
| 00 |
| 03 | TYPE
|    | ERROR TYPE
|    | ERROR DETAIL
| BCC |

| ERROR TYPE | ERROR DETAIL |
|---|---|
| NORMAL | NORMAL |
| IC CARD FUNCTION ERROR | LOCKED<br>SECURITY AREA FULL<br>DEFECTIVE CARD<br>Z.D.T NOT FOUND<br>ZONE PROHIBITED TO USE<br>LOCKED<br>RECORD NOT FOUND<br>DATA CORRUPTED<br>ABNORMAL Vpp |
| IC CARD FUNCTION ERROR | COMMUNICATIONS ERROR |
| MEMORY ERROR | P-KEY<br>O-KEY<br>PIN |
| KEY ERROR | P-KEY<br>O-KEY<br>PIN |
| PARAMETER ERROR | STORAGE LOCATION<br>ZONE # |
| UNDEFINED ERROR | P-KEY<br>O-KEY<br>PIN |

FIG. 101B

ZONE READ COMMAND (Ø9H) (CONT.)

| ERROR TYPE | ERROR DETAIL |
|---|---|
| IC CARD FUNCTION ERROR | LOCKED<br>DEFECTIVE CARD<br>O-KEY ALREADY EXISTS<br>SECURITY AREA FULL<br>LOCKED<br>O-KEY WRITE ERROR<br>ABNORMAL Vpp<br>Z.D.T IN USE<br>Z.D.T WRITE ERROR<br>CLOSE ERROR<br>BATCH NUMBER WRITE ERROR<br>CLOSED |
| IC CARD SYSTEM ERROR | COMMUNICATIONS ERROR |
| MEMORY ERROR | P-KEY ERROR<br>O-KEY ERROR<br>Z.D.T. ERROR<br>BATCH NUMBER ERROR |
| KEY ERROR | P-KEY<br>O-KEY |
| UNDEFINED ERROR | P-KEY<br>O-KEY<br>O-KEY DATA<br>Z.D.T DATA<br>BATCH NUMBER DATA |

FIG. 10IC

UNLOCK COMMAND (0BH)
1. FUNCTION
    UNLOCKS A LOCKED CARD.
2. PROCEDURE
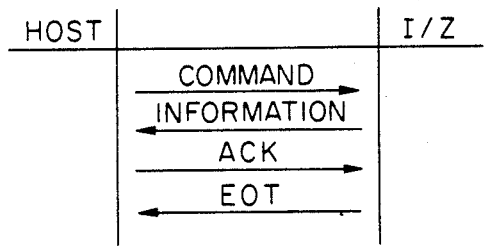
3. COMMAND FORMAT
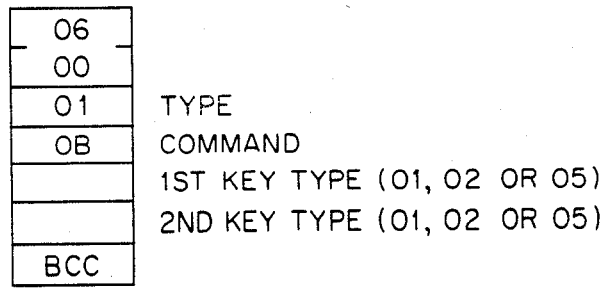
THE FIRST KEY TYPE IS DIFFERENT FROM THE SECOND KEY TYPE.
4. INFORMATION FORMAT
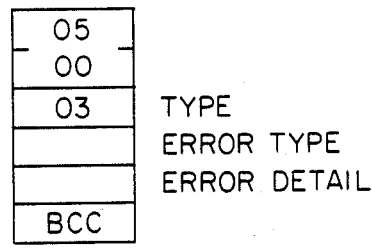
FIG. 102A

UNLOCK COMMAND (OBH) (CONT.)

| ERROR TYPE | ERROR DETAIL |
|---|---|
| NORMAL | NORMAL |
| IC CARD FUNCTION ERROR | DEFECTIVE CARD<br>SECURITY AREA FULL<br>ABNORMAL Vpp |
| IC CARD SYSTEM ERROR | COMMUNICATIONS ERROR |
| MEMORY ERROR | PIN ERROR<br>O-KEY ERROR<br>P-KEY ERROR |
| KEY ERROR | PIN<br>O-KEY<br>P-KEY |
| PARAMETER ERROR | KEY TYPE SPECIFICATION ERROR |
| UNDEFINED ERROR | P-KEY<br>O-KEY<br>PIN |

FIG. 102B

SENSOR CHECK COMMAND (OCH)
1. FUNCTION
    INSPECTS STATUS OF THE SENSOR IN I/Z.
2. PROCEDURE
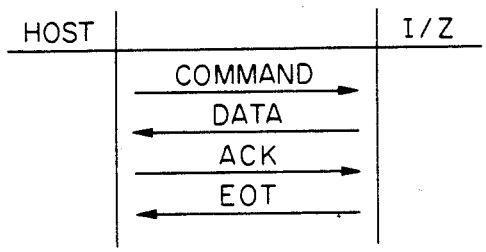
3. COMMAND FORMAT
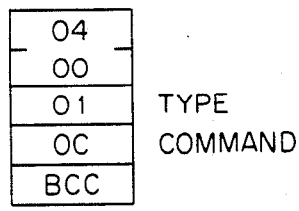
| 04 | |
|---|---|
| 00 | |
| 01 | TYPE |
| 0C | COMMAND |
| BCC | |
4. DATA FORMAT
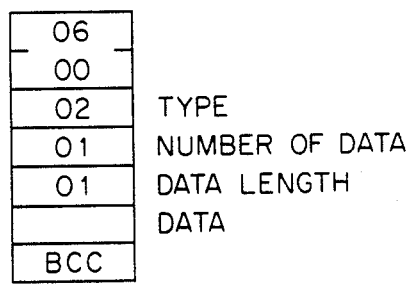
| 06 | |
|---|---|
| 00 | |
| 02 | TYPE |
| 01 | NUMBER OF DATA |
| 01 | DATA LENGTH |
|    | DATA |
| BCC | |
FIG. 103A SENSOR CHECK COMMAND (OCH) (CONT.)
SETS BITS CORRESPONDING SENSORS ON/OFF. THE DATA LENGTH IS ONE BYTE.

ON COMMAND (0DH)
1. FUNCTION
   TURNS ON CERTAIN FUNCTION OR DEVICE TO BE CONTROLLED, BUT DOES NOT CONFIRM THE EXECUTION.
2. PROCEDURE
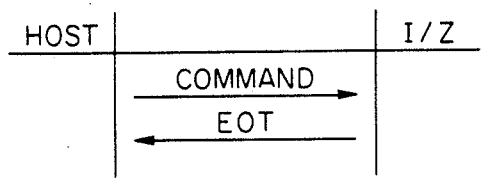
3. COMMAND FORMAT
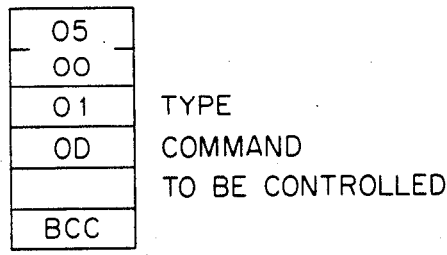
CERTAIN BITS CORRESPOND TO DEVICES TO BE CONTROLLED AS FOLLOWS.
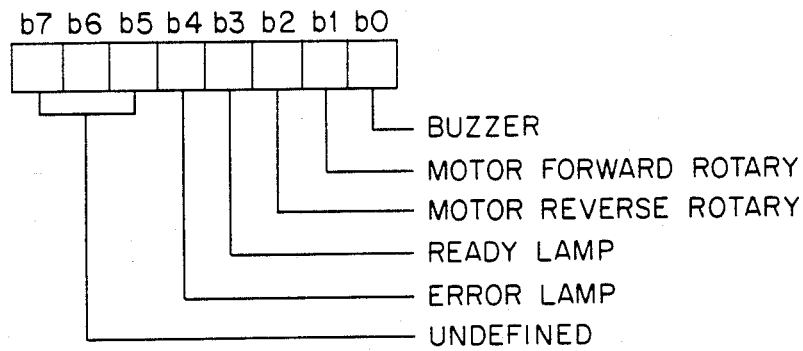
BITS 1: ON
      0: NOT AFFECT
FIG. 104

OFF COMMAND (OEH)
1. FUNCTION
    TURNS OFF THE CERTAIN FUNCTION OR DEVICE TO BE CONTROLLED, BUT DOES NOT CONFIRM THE EXECUTION.
2. PROCEDURE
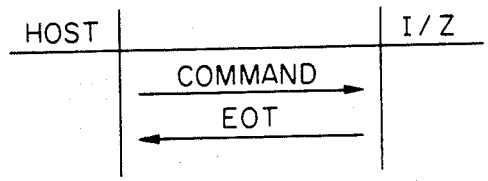
3. COMMAND FORMAT
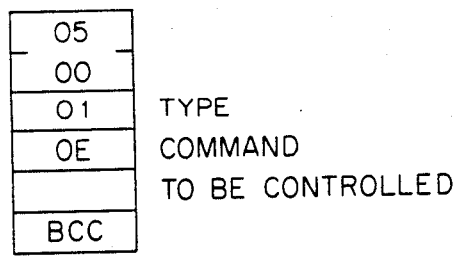
CERTAIN BITS CORRESPOND TO DEVICES TO BE CONTROLLED AS FOLLOWS
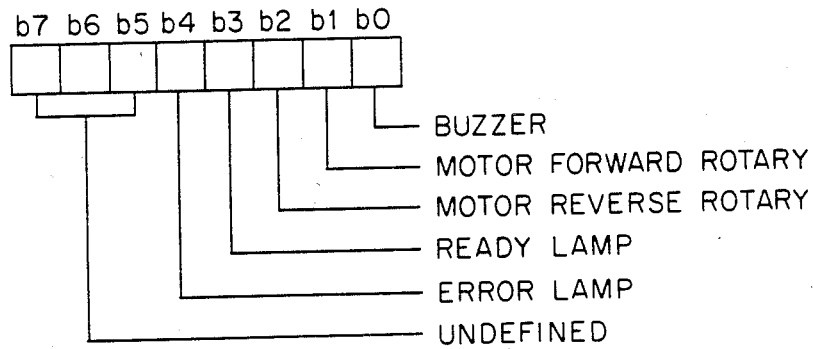
BITS 1: OFF
     0: NOT AFFECT
FIG. 105

DATA TRANSFER COMMAND (OFH)
1. FUNCTION
   TRANSFERS THE SPECIFIED DATA TO I/Z.
2. PROCEDURE
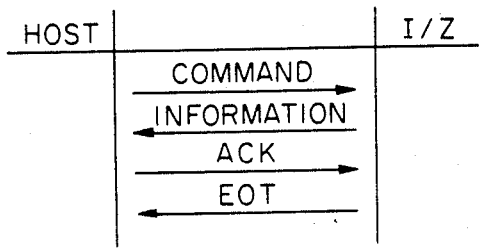
3. COMMAND FORMAT
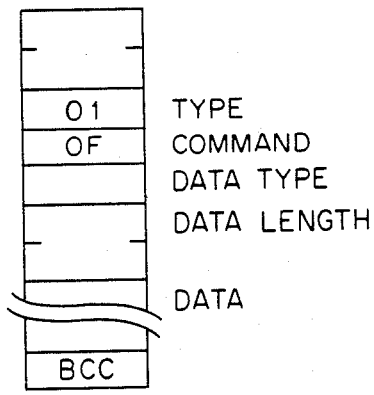
| DATA TYPE | CODE |
|---|---|
| P-KEY | 01 |
| O-KEY | 02 |
| PIN | 03 |
| O-KEY (DATA) | 04 |
| Z.D.T. (DATA) | 05 |
| BATCH NUMBER | 06 |
FIG. 106A

DATA TRANSFER COMMAND (OFH) (CONT.)

4. INFORMATION FORMAT

| ERROR TYPE | ERROR DETAIL |
|---|---|
| NORMAL | NORMAL |
| PARAMETER ERROR | DATA TYPE SPECIFICATION ERROR |
| MEMORY ERROR | |

PIN WRITE COMMAND (10H)
1. FUNCTION
   WRITES PIN.
2. PROCEDURE
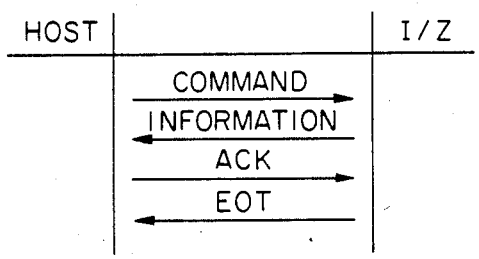
3. COMMAND FORMAT
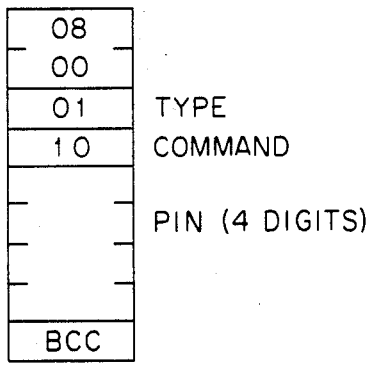
4. INFORMATION FORMAT
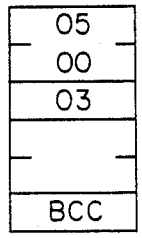
FIG. 107A

PIN WRITE COMMAND (IOH) (CONT.)

| ERROR TYPE | ERROR DETAIL |
|---|---|
| NORMAL | NORMAL |
| IC CARD FUNCTION ERROR | DEFECTIVE CARD<br>LOCKED<br>SECURITY AREA FULL<br>ABNORMAL Vpp<br>PIN IN USE<br>PIN WRITE ERROR |
| IC CARD SYSTEM ERROR | COMMUNICATIONS ERROR |
| MEMORY ERROR | O-KEY |
| KEY ERROR | O-KEY |
| UNDEFINED ERROR | P-KEY<br>O-KEY<br>PIN |

FIG. 107B

IC CARD SYSTEM

A microfiche appendix containing 145 frames on 2 cards is included in the specification and is hereafter referred to as Appendix I.

BACKGROUND OF THE INVENTION

The present invention relates to an integrated circuit (IC) information card system using a card having an integrated circuit chip or chips including a programmable processor and a nonvolatile read/write memory for storing data and access codes needed to access the data.

Various types of information cards have been developed which include storage media for storing information identifying the user of the card and other information. One such card is the ordinary plastic credit card or identification card which has embossed lettering on the card to indicate the identity of the holder, an identification or account number and possibly other information. In addition, the ordinary plastic credit or identification card has on its backside a magnetic stripe for magnetically storing data. The data stored on the magnetic strip typically verifies the embossed information on the front of the card and includes additional information. Such magnetic stripe plastic cards, while inexpensive to manufacture and issue, provide relatively little security against unauthorized or fraudulent access to the information stored on the exposed magnetic stripe, since such information can be easily read or altered using commonly available equipment. Furthermore, the recorded data on the magnetic stripe may be distorted or destroyed by dirt, scratches or contact of the magnetic stripe with magnetic materials. Moreover, the capacity of such a magnetic stripe plastic card is limited to about 0.5K bits to 1.7K bits, or about 70 to 200 alphanumeric characters.

Another type of card, known as the laser card, is similar to the magnetic-stripe plastic card but replaces the magnetic stripe with a stripe of reflective material. Information is stored in the laser card by burning microscopic holes in the surface of the reflective stripe with a focused, low-power laser. Although the laser card is capable of very high data storage capacities of up to 1 million bits, it also does not provide adequate protection against unauthorized access to the data stored in the exposed reflective stripe, which can be easily read or written using the proper equipment.

Yet another type of information card incorporates integrated circuit memory of either the read only and the write/read variety. Such a memory card typically has multiple electrical contacts located at one or more edges of the card or on a face of the card to permit electrical access to the address, data and any control terminals of the memory in the card. However, such memory cards generally provide relatively little or no protection against unauthorized access to the data stored in the card, since the contents of the card memory can, in most cases, be easily read out or added to with the proper equipment. Further, some memory cards use volatile memory requiring a costly, built-in, power source in the card to prevent loss of the data stored in the card memory. The foregoing deficiencies of memory cards have essentially limited their use.

Still another type of information card, known as the wired-logic card, incorporates an integrated hard-wired logic circuit together with nonvolatile integrated circuit memory to provide improved security for the data stored in the memory. In such a card, access to the memory may be entirely under the control of the hard-wired logic circuit, which may require the entry of a secret code or key before access to the memory is permitted. Owing to the limited processing capability of the hard-wired logic circuit, the wired-logic cards have been limited to relatively simple applications, such as for telephone payments and records.

The latest generation of information cards, which are commonly referred to as "intelligent" or "smart" cards, includes a programmable integrated circuit processor together with nonvolatile integrated circuit memory within the card. Since the programmable processor provides greatly expanded processing capabilities, the card may incorporate a sophisticated security system to prevent unauthorized or fraudulent access to some or all of the data stored in the card memory.

One such security system is disclosed and claimed in U.S. Pat. No. 4,211,919 to Michael Ugon, which issued on July 8, 1980. In that security system, the card memory is segmented into three particular zones, namely: a secret zone in which reading and writing operations are permitted only by the internal processor of the card; a working zone in which reading and writing operations are permitted directly by an external card reader/writer device; and a read zone in which only reading operations are permitted directly by the card reader/writer device. The secret zone of the card memory includes at least one key or code which is compared to a key received from a card reader/writer device to determine whether a particular access operation to the working zone is authorized.

The above-described card security system has the problem in that data segments of the working zone may be defined only in the application program of the host computer of the card system, therefore adding to the complexity of such an application program. Furthermore, all data in the working zone have only a single security level for reading and writing operations, respectively, i.e., with the entry of the proper key or combination of keys the entire working zone may be read or written.

In many applications for information cards, it is desirable to have the flexibility of being able to define the data zones of the card memory within the card itself and of being able to assign different security levels for reading or writing operations in the various data zones to suit the particular application. For example, in a health care application where the card is used to store data concerning a health care recipient, it would be appropriate to restrict access to certain categories of data only to particular classifications of health care personnel (e.g., doctors, pharmacists, etc.) and to similarly restrict the authority to add or alter the data in the card memory. Therefore, it is desirable to store the various categories of data concerning the health care recipient in different zones of the card memory as defined within the card and to assign an appropriate access security level, based on one or more access keys, for reading and writing operations to each data zone.

Accordingly, a need clearly exists for an IC card structure and method in which the card memory may be segmented into a desired number of data zones after this card is manufactured and in which each data zone of the card memory may be assigned a respective security level, based on one or more access keys, for reading or writing operations in that zone. A system using an IC card and method may advantageously include provisions for preventing the dissemination of knowledge of the access keys or combinations of such keys which define the security levels for the data zones of the card memory and for initializing the cards (i.e., defining the data zones of the card memory, assigning respective security levels to each data zone and loading the proper data into the various data zones card of the care memory) for each application on a mass production basis.

SUMMARY OF THE INVENTION

In accordance with the present invention, an IC information card, systems for using and initializing such cards and methods for segmenting the card memory and for preventing the dissemination of knowledge of access codes are provided which overcome or at least mitigate the limitations and problems of the prior art as described above.

The IC information card in accordance with the present invention comprises input/output means in the card for receiving at least data, commands and keycodes and for providing at least data. In addition, the card includes nonvolatile read/write memory means within the card,, the memory means having a multiplicity of addressable bit storage locations. Furthermore, the card includes first means within the card responsive to a first command, zone definition data and an entered keycode received by the input/output means for comparing the entered keycode with a first keycode stored in the card and for writing the zone definition data in a first region of the memory means only if the received keycode matches the first keycode, the zone definition data comprising one or more zone definition words each corresponding to a respective data zone in a second region of the memory means, each zone definition word specifying at least the starting address of the corresponding data zone and the size of the corresponding data zone.

Security levels may be specified for each of the data zones by providing the card with second means responsive to a second command, keycode data comprising one or more additional keycodes and an entered keycode received by the input/output means for comparing the entered keycode with the first keycode and for writing the additional keycodes in a third region of the memory means only if the entered keycode matches the first keycode, and having each zone definition word further specify either no keycode or one or more of the first keycode and the additional keycode or keycodes as being required to be received by the input/output means in order to read data from the corresponding zone and either no keycode or one or more of the first keycode and the additional keycode or keycodes as being required to be received by the input/output means in order to write data in the corresponding data zone.

In the preferred embodiment of the IC information card there is provided a third means within the card responsive to a read command, a code specifying a particular one of the data zones from which data is to be read and any entered keycode or keycodes received by the input/output means for comparing any entered keycode or keycodes with any keycode or keycodes specified as being required to read data in the particular data zone for providing data from the particular zone to the input/output means if the entered keycode or keycodes match the keycode or keycodes specified as being required to read data from the particular data zone or if no keycode is specified as being required to read data from the particular data zone. Also provided in the preferred embodiment is a fourth means within the card responsive to a write command, a code specifying a selected one of the data zones in which data is to be written, data is to be written in the selected zone and any entered keycode or keycodes received by the input/output means for comparing any entered keycode or keycodes with any keycode or keycodes specified as being required to write data in the selected data zone and for writing the received data in the selected data zone if the entered keycode or keycodes match the keycode or keycodes specified as being required to write data in the selected data zone or if no keycode is specified as being required to write data in the selected data zone.

Moreover, in the preferred embodiment of the IC information card data is stored in each data zone as successively located data records and each zone definition word further specifies the maximum number of data records that can be stored in the corresponding zone, the length of the data in each data record in the corresponding zone and a zone allocation area in the memory means for storing data indicative of the location of the next data record to be stored in the corresponding zone. Each data record stored in a data zone includes a checksum byte and a record status byte indicative of the validity of the data record. In addition, each zone definition word further specifies whether the data provided to the input/output means by the third means in response to a read command and a code specifying data to be read from the corresponding zone is only the last data record to be written in the corresponding zone or all data records that are stored in the corresponding zone in the order in which such data records are written in the corresponding zone.

An additional feature of the preferred embodiment of the IC information card in accordance with the present invention is the "locking" of the card after a specified number of successive unsuccessful attempts to access the card. This feature is implemented in the following manner. The memory means further contains a plurality of successively ordered lock status words, including a first and a last lock status word, each lock status word having a predetermined number of successively ordered bit positions, including a first and a last bit position, each bit position of each lock status word being initially in a second binary state. Additionally, the card further comprises fifth means within the card responsive to a failure of an entered keycode to match a keycode stored in the card, as a result of a keycode comparison made by the first, second, third or fourth means, for writing a first binary state in the lowest order bit position that is in the second binary state of the lowest order lock status word in which the highest order bit position is in the second binary state. The fifth means is responsive to a match of an entered keycode with a keycode stored in the card occurring directly after a failure of an entered keycode to match a keycode stored in the card, as a result of a comparison made by the first, second, third or fourth means, for writing a first binary state in the highest order bit position of the lock status word in which a first binary state was written by the fifth means in response to the directly preceding failure of an entered keycode to match a keycode stored in the card. The card further comprises sixth means within the card responsive to a lock status word having all but its highest order bit position in the first binary state for placing the card in a locked state in which at least reading and writing access to the first and second regions of the memory are prevented. Lastly, the card includes seventh means within the card responsive to an unlock command and one or more entered keycodes for comparing the entered keycode or keycodes with preselected keycode or keycodes stored in the card and for writing a first binary state in the highest order bit position of the lock status word having all but the highest order bit position in the first binary state to release the card from the locked state, if the entered keycode or keycodes match the preselected keycode or keycodes.

In the preferred embodiment of the IC information card in accordance with the invention, the first, second, third, fourth, fifth, sixth and seventh means are included in an appropriately programmed microprocessor operatively coupled to the input/output, means and the memory means includes a programmable read-only memory operatively coupled to the microprocessor.

The above-described IC information card in accordance with the invention is advantageously used in conjunction with two-card reader/writer means having a first and a second port for receiving a first and a second card, respectively, and for coupling to the input/output means thereof, coupling means for receiving at least commands, data and keycodes and for providing at least data, and reader/writer memory means. The reader/writer means further includes first means responsive to the coupling means receiving a command to read the second card, a code specifying a particular zone in the second card from which data is to be read and any keycode or keycodes to be entered in the first card, for providing to the input/output means of the first card one or more read commands together with a code or codes specifying the data zone or zones of the memory means of the first card where the keycode or keycodes required to read data in the particular zone of the second card are stored and any keycode or keycodes received by the coupling means. The first means then transfers such required keycode or keycodes to the reader/writer memory means if the keycode or keycodes received by the coupling means match the respective keycode or keycodes that are required to read the one or more data zones of the memory means of the first card or if no keycodes are required to read such data zones. Thereafter, the first means provides to the input/output means of the second card the read command, a code specifying the particular data zone and the keycode or keycodes for reading data in the particular zone transferred from the memory means of the first card to the reader/writer memory means and transfers any data provided by the input/output means of the second card to the reader/writer memory means.

The two-card reader/writer means also includes second means responsive to the coupling means receiving a command to write to the second card, a code specifying a selected zone in the second card in which data is to be written, data to be written in the selected zone and any keycode or keycodes to be entered in the card for providing to the input/output means of the first card one or more read commands together with a code or codes specifying the data zone or zones of the memory means of the first card where the keycode or keycodes required to write data in the selected zone of the second card are stored and any keycode or keycodes received by the coupling means. The second means then transfers such required keycode or keycodes to the reader/writer memory means if the keycode or keycodes received by the coupling means match the respective keycode or keycodes that are required to read the one or more data zones of the memory means of the first card or if no keycodes are required to read such data zones. Thereafter, the second means provides to the input/output means of the second card the write command, a code specifying the selected zone, the data to be written in the selected zone and the keycode or keycodes required for writing data in the selected zone transferred from the memory means of the first card to the reader/writer memory.

Thus in accordance with the present invention, by using the IC information card with two-card reader/writer means in the foregoing manner, dissemination of knowledge of the keycodes required to access the data zones of a card is avoided. In the preferred embodiment, the first card includes a data zone storing an identification code unique to that card. The identification code of the first card is read by the reader/writer means and stored in the reader/writer memory following initial insertion of the first card into the reader/writer means. The identification code in the first card is read again and compared with the identification code stored in the reader/writer memory means prior to each read or write access of the second card. If the identification code which is read prior to an access of the second card fails to match the identification code stored in the reader/writer memory means, access of the second card is prevented.

Further in accordance with the invention, the above-described IC information cards are initialized by a initialization system that includes input means for receiving one of the cards at a time to be initialized and for coupling to the input/output means of the card received thereby and initializer memory means for storing the first keycode, appropriate zone definition data and additional keycode or keycodes. In addition, the initialization system includes first initializer means for writing the zone definition data stored in the initializer memory means to the first region of the memory means of the card received by the input means using the first command, and the first keycode stored in the initializer memory means. Furthermore, the initialization system includes second initializer means for writing the additional keycode or keycodes stored in the initializer memory to the third region of the memory means of the card received by the input means using the second command, and the first keycode stored in the initializer memory means.

The initialization system in accordance with the preferred embodiment of the invention is also used to load the data zones of the IC information card with appropriate data to suit a particular application. This is accomplished by providing the card with second memory means, such as a magnetic stripe, for storing a file identification code and the initialization system with means for reading the second memory, such as a magnetic stripe reader, for obtaining the file identification code of a card received by the input means of the system. Additionally, the initialization system includes mass storage means for storing a multiplicity of data files each associated with a respective file identification number, each data file having a plurality of data segments corresponding to respective data zones of a card as defined by the zone definition data written into the card by the first initializer means. There is further included third initializer means responsive to the file identification code obtained by the means for reading the second memory means for searching the data files in the mass storage means for the data file associated with that file identification code. The initialization system further includes fourth initializer means for writing the segments of the associated data file into corresponding data zones of memory means of the card received by the input means using the write command and appropriate keycode or keycodes, if any, required for writing data in each corresponding data zone.

There is further provided according to the present invention a method for segmenting the data storage region of the IC card memory into a plurality of segments, each having assignable attributes including an assignable security level and a method for preventing the dissemination of knowledge of the access codes for an IC information card by storing such codes in a control card and using two card read/writer means.

Numerous other advantages and objects will appear to those skilled in the art with reference to the following detailed description of the invention, the appended claims and the accompanying drawings.

BRIEF DESCRIPTION OF THE DRAWINGS

FIG. 11 is an schematic diagram of the interface circuit for the card transport unit for the IC information card reader/writer of FIG. 10;

FIGS. 23 through 39 show the command protocols of the BIOS program of IC information card reader/writer in accordance with the invention;

FIGS. 92 through 107B show the communication protocols for the commands of the program of the IC information card initializer in accordance with the invention.

DETAILED DESCRIPTION OF THE PREFERRED EMBODIMENTS

Figure 1:
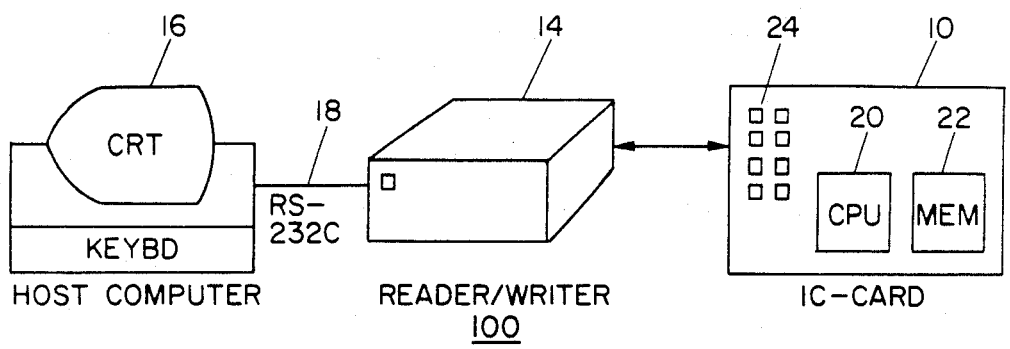
FIG. 1 is a block diagram of the IC information card system in accordance with the invention.

As shown in FIG. 1, the IC card system 100 according to the invention comprises an IC card 10, connected via its contacts 24 to corresponding contacts in a reader/writer (R/W) 14. The system also comprises a host computer 16 connected to the reader/writer 14 by an electrical link 18, which may comprise an RS-232C communications link. The host computer 16 may be an IBM Model XT. As will be described below, the reader/writer 14 has two receptacles or ports for receiving up to two IC cards 10 simultaneously. The individual components of the system will now be described in more detail.

IC CARD

Figure 2A:
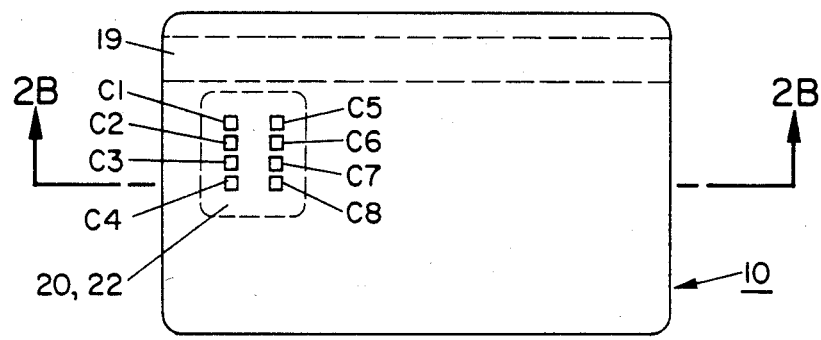
FIG. 2A is a plan view of the IC information card in accordance with the invention.
Figure 2B:
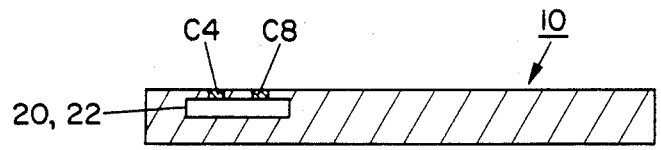
FIG. 2B is an elevated cross-sectional view of the IC card of FIG. 2A taken along line 2B—2B.

The IC card 10, as shown in FIGS. 2A and 2B is preferably the same general size as a conventional magnetic stripe credit card having a size 54 by 86 by 0.76 mm. The IC card has a magnetic stripe 19 and contains a CPU 20 and nonvolatile memory in the form of a PROM or EPROM 22. Alternatively, a storage device such as an EEPROM, i.e. an electrically erasable programmable read only memory, can be used as the storage device. The IC module comprising the CPU 20 and EPROM 22 is enclosed in the card 10 using a between-layers lamination method known to those skilled in the art.

The IC module is electrically connectable to the reader/writer 14 by means of eight terminals C1 through C8 as shown in FIG. 2A. The card size as well as the electrical terminals C1 through C8 are designed to comply with ISO (International Organization for Standardization) standards for IC cards. These standards provide essentially for eight terminals C1 through C8 located and positioned in the arrangement shown in FIG. 2A with the dimensions of each terminal being 2.0 by 3.9 mm and edge to edge vertical and horizontal spacings of 0.54 mm and 7.62 mm, respectively. The terminals C1 through C8 are adapted to engage corresponding contacts (not shown) in the reader/writer 14.

Figure 3:
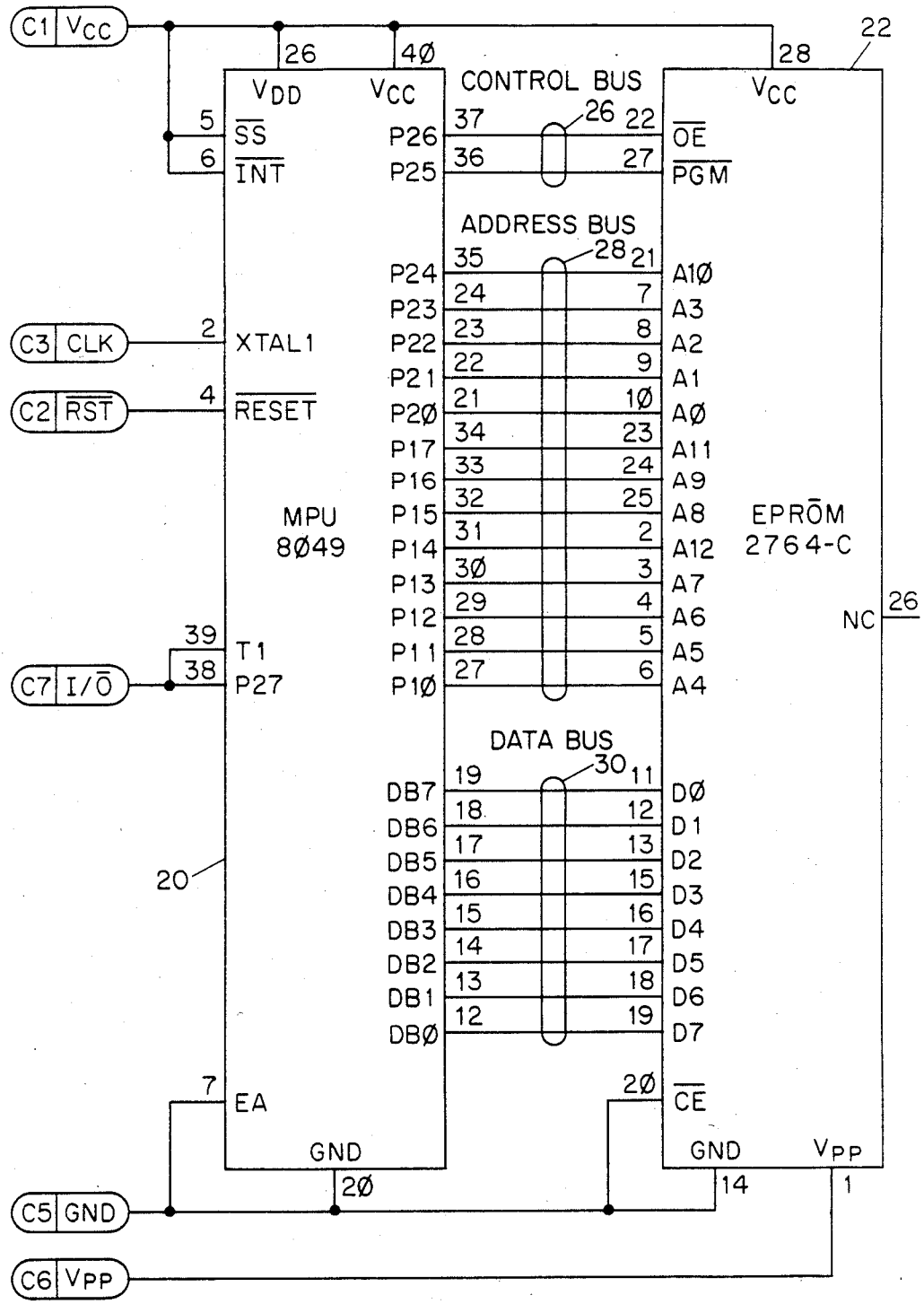
FIG. 3 is an electrical schematic diagram of the CPU and EPROM of the IC information card in accordance with the invention.

FIG. 3 shows in more detail the electrical connections between the terminals C1 through C8, the CPU 20 and the EPROM 22. The CPU may be a model 8049 8-bit microprocessor. The EPROM may be a model 2764 C with a storage capacity of 64K bits, (i.e. 8K bytes). Electrical connections between the CPU 20 and EPROM 22 include a control bus 26 comprising two lines, an address bus 28 comprising 13 lines, and a data bus 30 comprising 8 lines. Although the particular embodiment shows CPU 20 and EPROM 22 as separate IC chips, it is to be understood that equivalents of those two components may be fabricated on a single IC chip.

With respect to the C1 through C8 and with reference to FIG. 3, terminal C1 is designated VCC and provides the power (+5 volts) to the CPU and memory. Terminal C2 designated RST is the reset terminal of the CPU. Terminal C3 designated CLK is the clock terminal of the CPU. Terminal C5 designated GND is the ground. Terminal C6 designated VPP is the read-/write power terminal of the EPROM (although in some embodiments the single 5 volt power source C1 may accomplish this purpose). Terminal C7 designated I/O is the data input/output terminal for communicating data to and from the reader/writer. Terminals C4 and C8 are not presently used in the exemplary card.

IC CARD MEMORY

A unique feature of the present invention is in providing a user (data) memory area in the EPROM 22 of the card which can be selectively divided into a number of zones, each of which may be selectively accessed (for reading, writing or both) if a key or password code entered into the card by its user permits such access for that particular zone.

Figure 4:
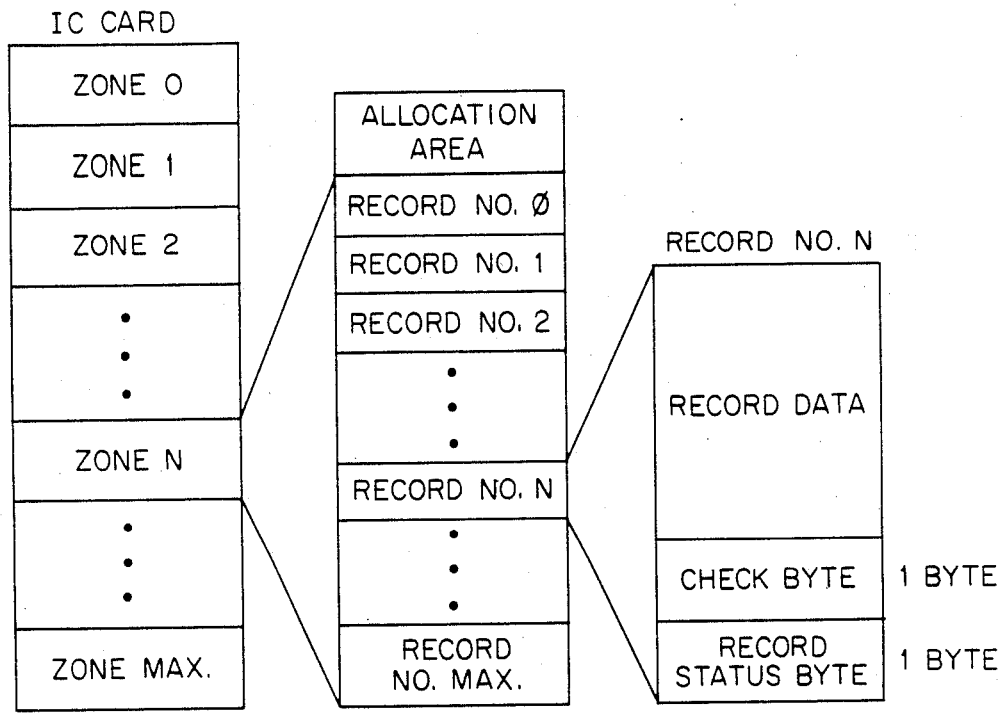
FIG. 4 illustrates the memory map of the memory in the IC information card in accordance with the invention.

The memory of the IC card will be described with reference to FIG. 4 which shows the data area of an IC card memory being divided into a plurality of zones, which can be from 1 to 255 in number. Each zone is further divided into a zone allocation area and a number of records from 1 to 255. Each record is further divided into three segments, the first being the segment where the data are stored, the second being a check byte and the third being a record status byte. The length of the records can be selectively defined by the user to be up to 253 bytes, so that the total size of the data record will be up to 255 bytes, with the check byte (CB) and record status byte (SB) included.

The check byte (CB) is used to detect distorted data in a data record. When a data record is written, the IC card calculates a value using this data by, for example, a check summation using the complement of 2 method, and writes this value into the check byte space. When a record is read, the IC card checks the integrity of the data by performing the same calculation and by comparing the calculated value to the value stored as the check byte. The record status byte (SB) is used for defining record attributes such as data validity and is read or written usin9 the record status byte write read commands of the IC card program.

ZONE DEFINITION

The attributes of each zone are defined by writing a zone definition table into the EPROM of the IC card. The following zone attributes may be defined for each zone:

(1) record length (number of bytes)
(2) number of records
(3) security level
(4) UPDATE/HISTORY.

(a) Record Length

The length of data per record is expressed as the number of bytes in the record. The shortest record permitted is one byte, and the longest record permitted is 253 bytes.

(b) Number Of Records

The number of records in each zone may range from 1 up to 255.

(c) Security Level

This attribute relates to the access level at the time of writing or reading a record. The IC card normally requires one or two keycodes corresponding to the security level defined for a zone to be entered into the card before reading or writing of data in the zone is permitted. If a keycode stored in the IC card for a particular zone does not match the code entered from an external source (e.g., an IC card reader/writer), data cannot be read or written in that zone. The security control functions of the IC card in accordance with the present invention will be explained in further detail hereinbelow.

(d) UPDATE/HISTORY

This attribute relates to the mode of reading data from a zone. When a zone is defined as "UPDATE", only the most recently written record in the zone is obtained when the zone is read. If a zone is defined as "HISTORY", all records in the zone are obtained in the sequence in which they were written when the zone is read. Whether to define a particular zone as an UPDATE zone or a HISTORY zone depends on the user application.

DATA READ/WRITE (a) Data Write

Data is written sequentially in a zone in units of records. For example, if in Zone No. N data has been written up to Record No. 1, additional data is written in Record No. 2.

(b) Data read

Data records are read out of only one zone at a time. The method of reading data records depends on whether the zone is defined as UPDATE or HISTORY. If the zone is defined as UPDATE, only the last written record in the zone is read. In the above example, Record No. 2, which was the last to be written, is read if zone No. N is defined as UPDATE. If the zone is defined as HISTORY, all records in the zone are read in the sequence the records were written. In the above example, data is read from zone No. N in the sequence of Record No. 0, Record No. 1 and Record No. 2 if that zone is defined as HISTORY.

(c) Record Status Byte

Figure 5:
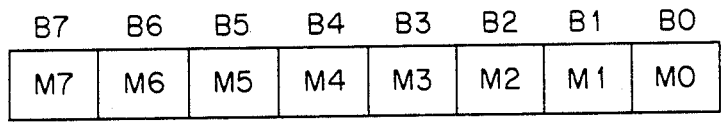
FIG. 5 illustrates the record status byte of a data record.

The configuration of record status byte is shown in FIG. 5. Each of the bits M0 through M7 of the record status byte can be given a special meaning in the data record. The meaning of each bit must be defined in advance by the system application that uses the IC card. The M7 bit is normally used to indicate "record deletion" or "unnecessary record". The record status byte can be written or read by issuing an appropriate command to the IC card.

KEY CODES (PASSWORD CODES)

This IC card needs a password code when writing or reading data in the card memory, in order to avoid unauthorized use of the card. The password code is not needed in applications that do not require security as will be described hereinbelow.

There are the following four types of keys or password codes:

| | | |
|---|---|---|
| (1) | Manufacturer's key (M-key) | 8 bytes |
| (2) | Personalization key (P-key) | 8 bytes |

-continued

| | | |
|---|---|---|
| (3) | Organization key (O-key) | 8 bytes |
| (4) | PIN | 4 bytes |

(a) Manufacturer's Key (M-Key)

The M-key is defined in the mask program of the microprocessor of the IC card. Therefore, it cannot be read externally by any means. The M-key is a password code consisting of 8 bytes and is specified by the manufacturer prior to the manufacture of the IC. The M-key must be controlled by the manufacturer and the system user and should not be made known to the IC card user. The M-key is used only for internal diagnostic activities within the card. (The system user mentioned here means the party who issues the initialized cards to user organizations.)

(b) Personalization Key (P-Key)

The P-key is defined in the mask program of the microprocessor of the IC card. Therefore, it cannot be read externally by any means. The P-key is a password code consisting of 8 bytes and can be specified by the system user upon request prior to the manufacture of the IC card. The P-key must be controlled by the system user and should not be made known to the IC card user. The P-key is used on the following occasions:

(1) to write an organization key;
(2) to write a PIN key;
(3) to write zone definition tables; and
(4) when the system user uses a specific zone for himself.

(c) Organization Key (O-Key)

The O-key is a eight-byte password code that the system user can define after the card is manufactured. When combined with a PIN code, the O-key can provide an additional level of security for the card. Although the O-key can be used in a variety of ways depending on the application, it is normally used as a higher level key than the PIN key. The O-key is stored in the EPROM of the IC card. The O-key may also be used to write the PIN key in the EPROM.

(d) PIN Key

The PIN (Personal Identification Number) key is a four-byte password code that the system user can define after the card is manufactured. As in the case of the O-key, this key can also be used in a variety of ways by the application, but the common use of the PIN key is as a private password code of the IC card user. The PIN key is also stored in the EPROM of the IC card.

SECURITY CONTROL FUNCTION (a) Security Level

Figure 6:
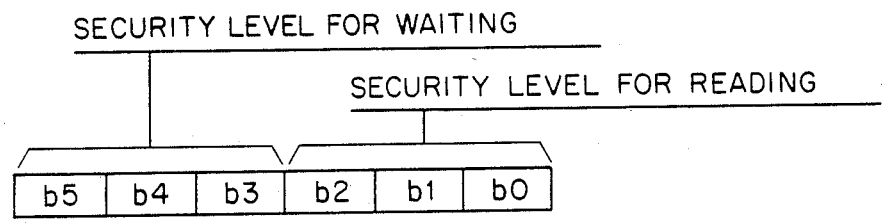
FIG. 6 illustrates the security level definition portion of a zone definition word in the memory of the IC information card in accordance with the invention.

The security level of each zone is defined in the zone definition table. The term "security level" as used herein means the key or combination of keys among those defined (P-key, O-key and PIN) that are required to perform a read or a write operation in a particular zone. Reading and writing operations for a given zone may have different security levels. A 6-bit portion of a zone definition word used to define the security levels for reading and writing in a particular zone and the codes defining the various security levels in accordance with the invention are illustrated in FIG. 6.

The different levels of security that are available in the IC card according to the present invention and the key or keys necessary for each security level are summarized in TABLE A.

TABLE A

| Security Level | Necessary Key(s) |
|---|---|
| 0 | Access disabled |
| 1 | PIN |
| 2 | O-key |
| 3 | PIN or O-key |
| 4 | PIN and O-key |
| 5 | P-key |
| 6 | Undefined |
| 7 | No key required |

(b) Card Lock

As explained above, the IC card requires a password code or codes as defined by the zone definition table in order to read or write in a zone. If an entered key does not match a required key three times in succession, the card is "locked" or disabled from further use. The "lock" function applies to all IC card operations (e.g., writing of a Pin or O-key, reading or writing of a zone definition table, reading or writing of a record status byte, etc.) where a key is needed and is not limited only to the reading or writing of a data record.

(c) Card Unlock

Once locked, the card cannot be used. However, it can be made usable by issuing an "UNLOCK" command to the card. Before unlocking a card, it must be carefully determined whether the cause for locking the card was a simple error in memorizing a required key on the part of the card user or an attempt at an unauthorized access of the card. The O-key (or P-key) and the PIN key are both needed to unlock a card. The unlock function can only be performed up to 486 times on a single card.

MEMORY MAP

Figure 7:
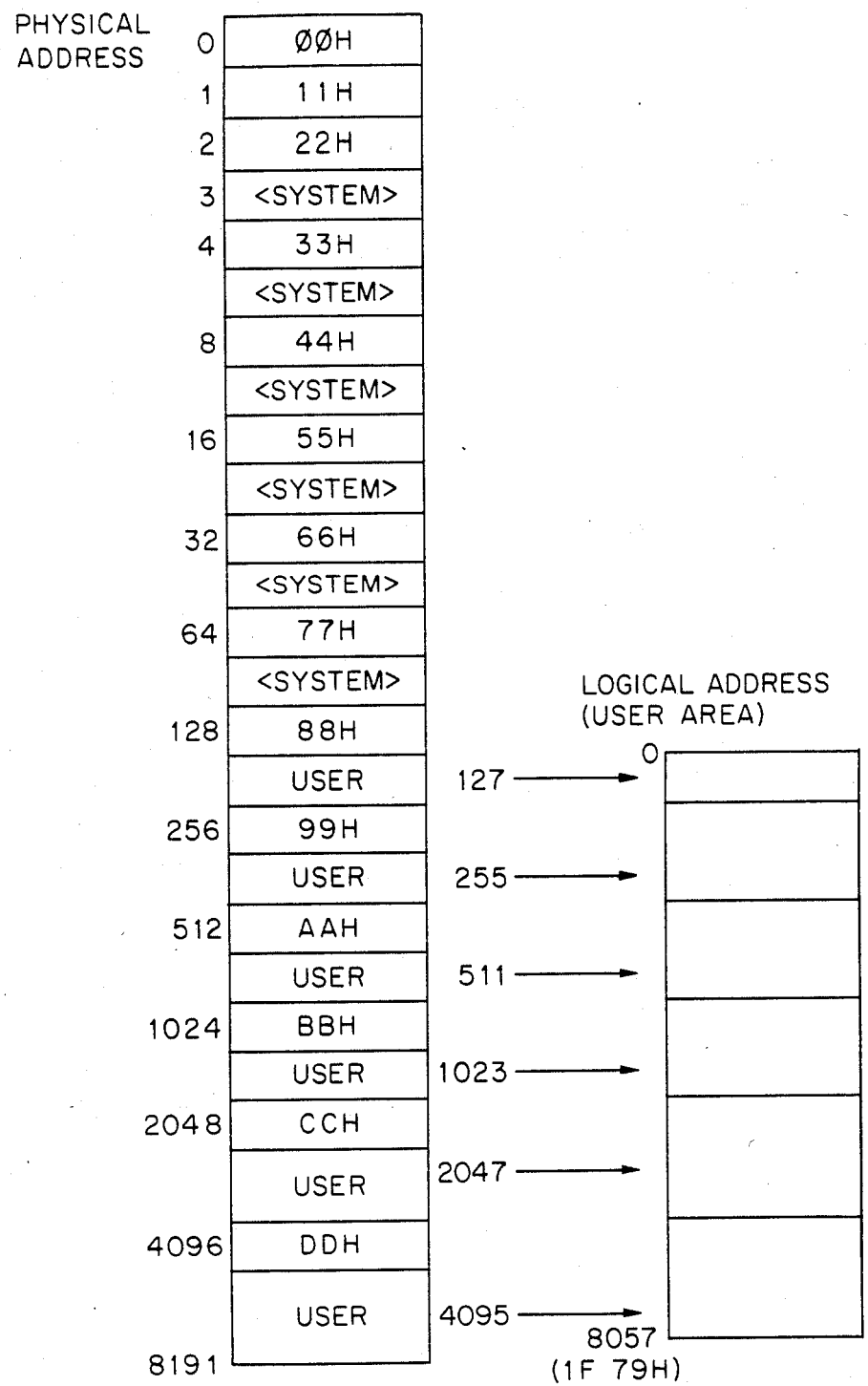
FIG. 7 shows a memory map depicting the test address, system and user areas, as well as the relationship between physical and logical addresses of the IC information card memory in accordance with the invention.

FIG. 7 shows the memory map of an IC card according to the present invention. The card has an EPROM. The 64k-bit memory consists of the following three areas:

(1) test address;
(2) system area; and
(3) user area.

(a) Test Address

This is a physical address. Addresses 0, 1, 2, 4, 8, 16, 32, 64, 128, 256, 512, 1024, 2048 and 4086 are used for testing at the time of manufacturing or during use of the IC card. During such testing the data of 00H, 11H, 22H, 33H, 44H, 55H, 66H, 77H, 88H, 99H, AAH, BBH, CCH and DDH are written sequentially into the test addresses. If the test data cannot be read or written correctly to each test address, a hardware failure is indicated.

(b) System Area

This area is used by the manufacturer of the card and is not in general available to either the system or card user. This area is used to check the card function, to control the card and to extend the application. The size of this area is 119 bytes.

(c) User Area

This area stores user data and has a size of 8058 bytes. This area is specially defined as "logical address".

$$\text{Logical address} = 0 - 8057 \ (1F79H) \quad (1)$$

Unless otherwise specified, the term "address" as used herein means a "logical address".

IC CARD FORMATTING OR INITIALIZATION

Prior to reading or writing a data record in the IC card memory, the memory must be formatted (initialized) to correspond to a particular application for the IC card system. The formatting of the IC card memory consists of the following two operations:

(1) writing of key codes; and
(2) writing of a zone definition table.

(a) Key Code Write

The PIN key (4 bytes) and the O-key (8 bytes) must be written into the IC card memory. If the respective security levels of all zones are defined as "No Key Required", there is no need to write the PIN and O-key into the card. Once written in, the PIN key and the O-key cannot be changed.

(b) Write Zone Definition Tables

As described above, the zone definition attributes are as follows:

(1) record length;
(2) number of records;
(3) security level (for writing and reading); and
(4) UPDATE/HISTORY data record read mode.

In addition to the above, the following additional zone definition attributes must also be defined:

(5) zone starting address; and
(6) number of allocation bytes

A zone definition word for each zone written into the IC card memory is 6-bytes in length containing codes representing the above six attributes.

Figure 8:
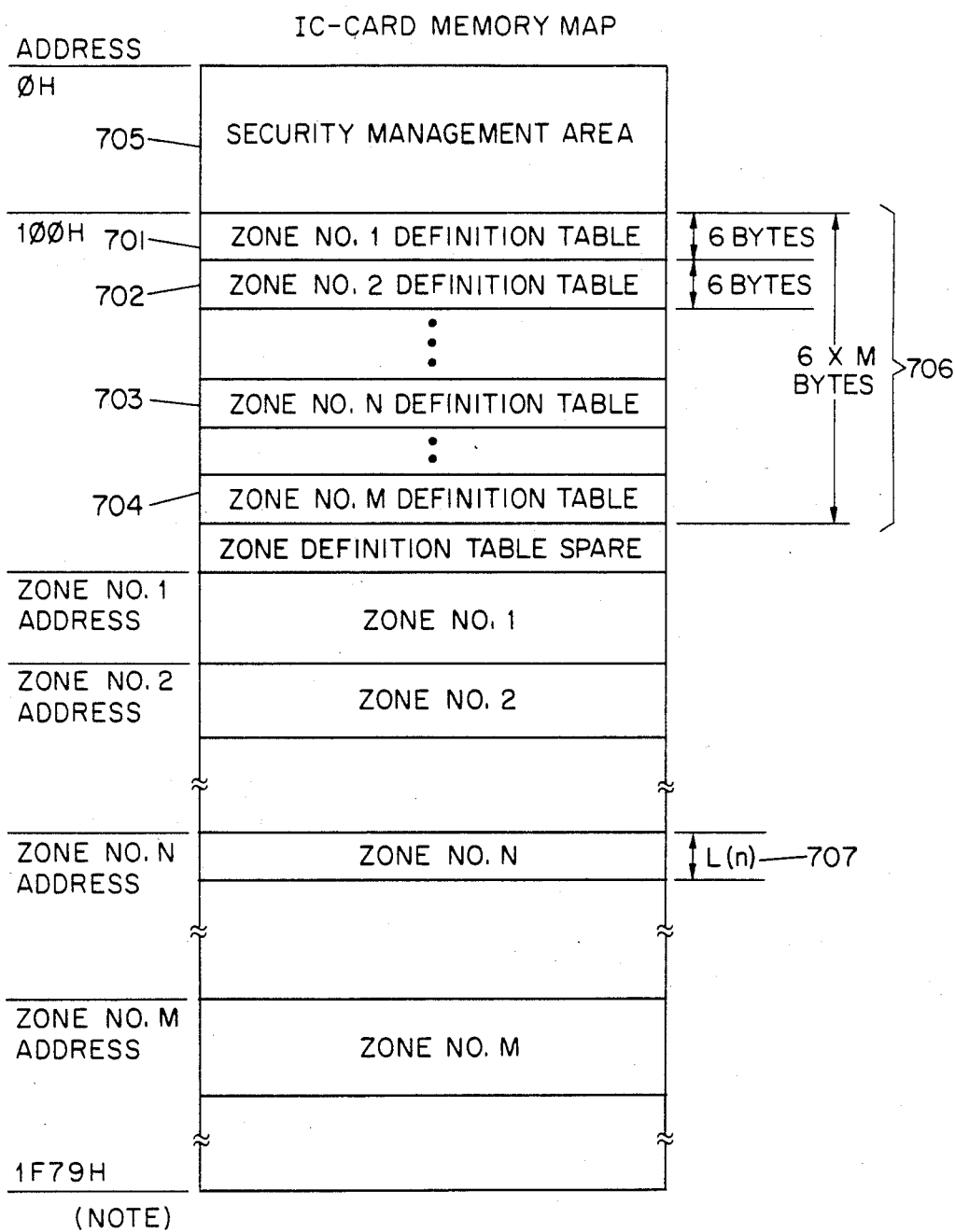
FIG. 8 shows a memory map depicting the security management area, the zone definition area and the data area of the IC information card memory in accordance with the invention.

FIG. 8 shows the memory map of an IC card at the time of zone definition. The security management area 705 of the IC card memory is used to store information for detecting unauthorized use of the card. The area 705 also includes three status bits which respectively indicate whether the PIN key and the O-key have been written and whether the zone definition area 706 has been closed. The PIN and O-keys themselves are stored in memory area 705.

The remainder of the security management area 705 (243 bytes) is divided into 486 4-bit nibbles. These nibbles are used one at a time for recording unsuccessful attempts to access the IC card memory. Each time an entered key does not match a required key, the next successive nonzero bit of the current nibble being used to record unsuccessful access attempts is set to zero. When the three lowest order bits of the current nibble are all set to zero, the card is "locked". The card may be "unlocked" by setting the highest order bit of the current nibble to zero. An access in which the entered key matches the required key resets the count. If the current nibble has recorded any unsuccessful access attempts, all bits of the current nibble are set to zero. The unlocking or resetting of the card causes further unsuccessful attempts to be recorded in the next successive nibble.

Figure 8A:
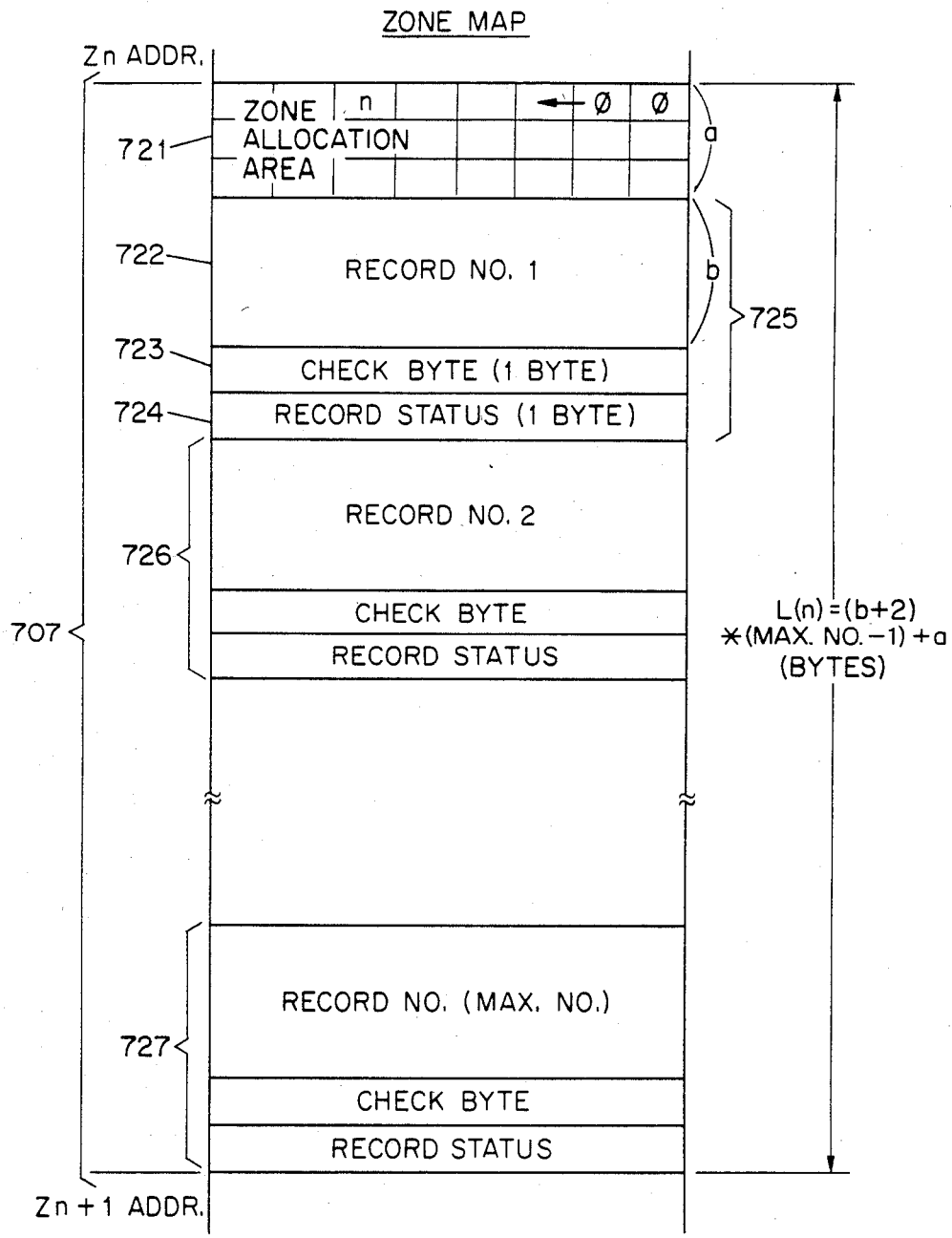
FIG. 8A shows a memory map depicting the organization of a single data zone of the IC information card memory in accordance with the invention.

FIG. 8A shows the memory map of an individual zone 707 as indicated on FIG. 8. Each zone includes an allocation area 721, which is used to store information as to which records in the zone have been written. The bits within the allocation area 721 are used to keep track of the next available record to be written. The lowest order bit of the first byte of the zone allocation area 721 is set to zero when the first record 725 of the zone is written. The next lowest order bit in the first byte of the zone allocation area 721 is set to zero when the second record 726 of the zone is written. The process continues as each successive record is written, setting a respective bit for each record, until the maximum number of records, as specified in the zone definition word 703 for that zone, is written. When the last allocated record 727 is written, no further records may be written to the zone 707, although the data in the zone may still be read. In the present exemplary embodiment the zone allocation area for each zone is located within the zone itself. However, in some instances it may be desirable to locate the zone allocation areas for all the zones together in a separate area of the card memory.

The check byte (CB) 723 has already been discussed in connection with FIG. 4. The status byte (SB) 724 has already been discussed in connection with FIGS. 4 and 5.

Up to 255 zones may be defined in the IC card memory. Since the starting address of a zone is stored in the zone definition word, there may be unused memory space between the end of the zone definition table area and the start of the first zone. A similar unused memory space may exist between two adjacent zones.

(c) Zone size

The size of Zone No. "n" (expressed as $L(n)$—number of bytes) is calculated using the following formula:

$$L(n) = m(n) \times (l(n) + 2) + m(n)/8 \qquad (2)$$

where $l(n)$ is the record length in number of bytes and $m(n)$ is the number of records. Decimal fractions are rounded to the next higher integer.

(d) Zone Address Calculation

Assuming that the number of zones to define is M, that the same address is not used for two or more places and that no unused memory space exists, the start address $S(N)$ of the N-th zone is calculated as follows:

$$S(N) = \sum_{n=1}^{N-1} L(n) + 6M + 256 \qquad (3)$$

The end address $E(N)$ of the N-th zone is calculated as follows:

$$E(N) = \sum_{n=1}^{N} L(n) + 6M + 255 \qquad (4)$$

From the above formulae, the last address $E(M)$ of the IC card memory is calculated as follows:

$$E(M) = \sum_{n=1}^{N} L(n) + 6M + 255 \qquad (5)$$

However, because of the limit on the IC card memory area the last address $E(M)$ is as follows:

$$E(M) \leq 8057 \qquad (6)$$

Because of the limit of available RAM buffer space, the product of record length and number of records in a zone may not exceed 2048.

$$l(n) \times m(n) \leq 2048 \ (800H) \qquad (7)$$

IC CARD OPERATION

Figure 9:
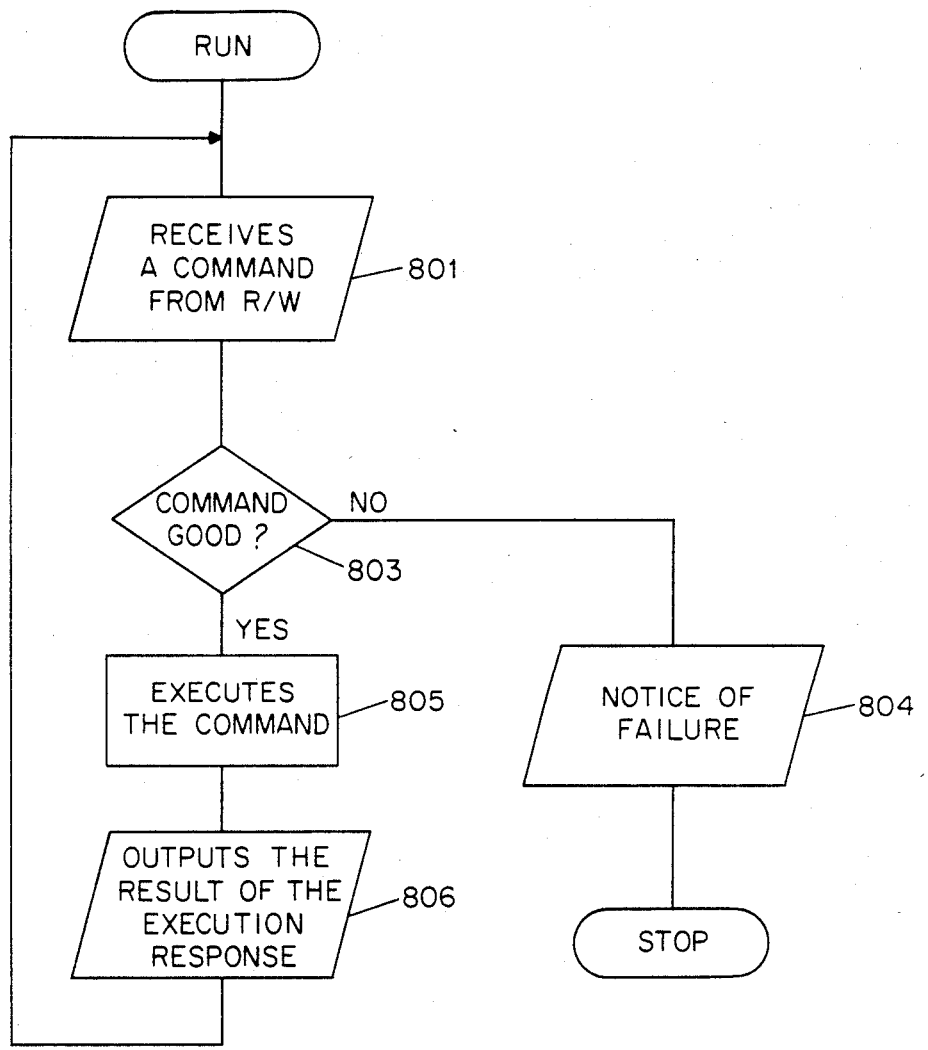
FIG. 9 is a flow chart showing the IC information card operation generally upon receiving a command from the reader/writer.

FIG. 9 is a flow diagram of the IC card operation. In accordance with this flow chart, the IC card first receives a command from the reader/writer at 801. The IC card then does a check at 803 to determine whether the command is supported by the card. If the command is not valid, an error code indicating such is produced at 804 and processing stops. However, if the command is valid, it is executed at 805, and the output as a result of command execution is provided at 806.

COMMAND DESCRIPTION

The IC card uses 15 commands which are classified into 8 different groups, namely, IC card hardware test, formatting, key write, zone read/write, records remaining to be written in a zone, record status management, and card program version information read. It should be understood that some commands require particular keys and parameters for their execution. The IC card commands in accordance with the present invention are listed in Table B herein.

RESULT OF EXECUTIONS BY THE IC CARD (RESPONSES)

The IC card informs the reader/writer of the result of the execution of a command. If the command includes a read command, the data obtained through execution of the read command are included in the response provided to the reader/writer. The response indicating command execution by the IC card can take the form of one or more return codes.

READER/WRITER COMPONENT

Figure 10:
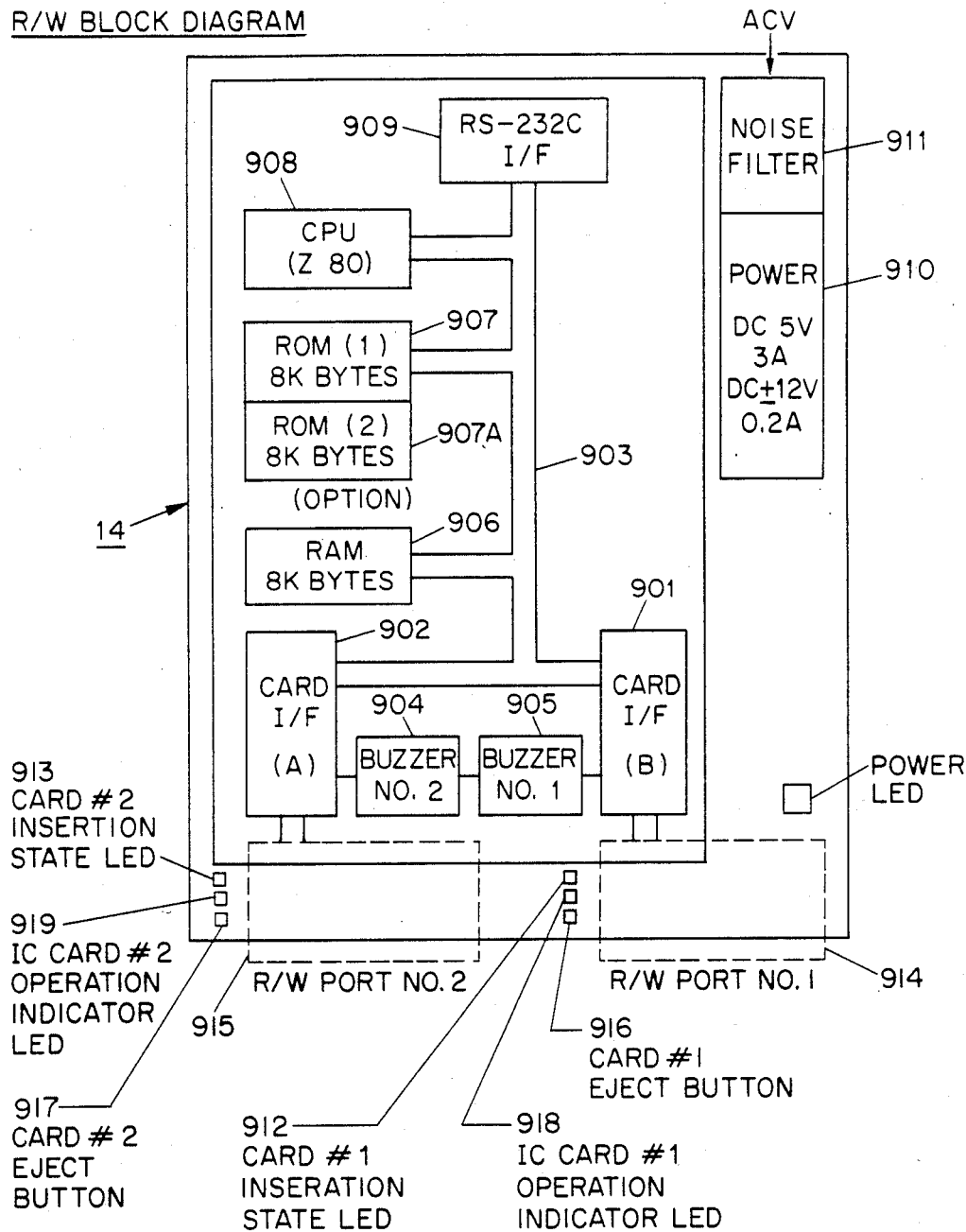
FIG. 10 is an block diagram of the IC information card reader/writer in accordance with the invention.

The reader/writer 14 which is connected to the host computer 16 via a RS-232C communication link 18 and which accepts one or two IC cards will now be described. FIG. 10 is a block diagram of a reader/writer 14 showing two ports numbered 1 and 2 (914 and 915) for receiving the IC information cards described above. The respective reader/writer ports are connected to card interfaces (I/F) 902 and 901 which are in turn connected via a data/address bus 903 to other components in the reader/writer. Also connected to the card interfaces 902 and 901 are respective buzzers or sound transducers 904 and 905, each of which may produce a different frequency, e.g. 600 Hertz and 2400 Hertz. A RAM memory 906 of 8K bytes, ROM memories 907 and 907A having a total of 16K bytes, and a CPU 908 in the form of a Z80A microprocessor are also connected to the data/address bus 903. The RS-232C interface 909 is also connected to the data/address bus 903. The reader/writer 14 is provided with a power supply 910 which receives 90 to 130 volts AC through a noise filter 911 and which supplies DC voltages of 5 volts, +12 volts and −12 volts.

As part of the reader/writer ports 914 and 915, card transports are provided for transporting the cards into and out of the reader/writer ports. Such transports are commercially available from various manufacturers, such as the Toppan Moore Company, Ltd. of Tokyo, Japan. An electrical schematic diagram of the interface for such a card transport is shown in FIG. 11. In the lower portion of the figure, the electrical connections provided to the terminals of the IC card are indicated.

When an IC card is inserted into one of the read/write ports, a solenoid is activated and the respective card is held in place within the reader/writer 14. At this time, the corresponding card insertion state LED 912 or 913 as shown in FIG. 10 is illuminated. When transactions involving the card are completed, the inserted card can be removed by pressing the card eject button 916 or 917 for the port in which the card is inserted. However, if the card eject button is pressed during IC card operation, i.e., while IC card operation indicator LED 918 or 919 is lit, the card eject button will be inoperative. The card may also be ejected by a command issued by the host computer as will be described below. When the card is ejected, the card insertion state LED 912 or 913 is extinguished.

Figure 12A:
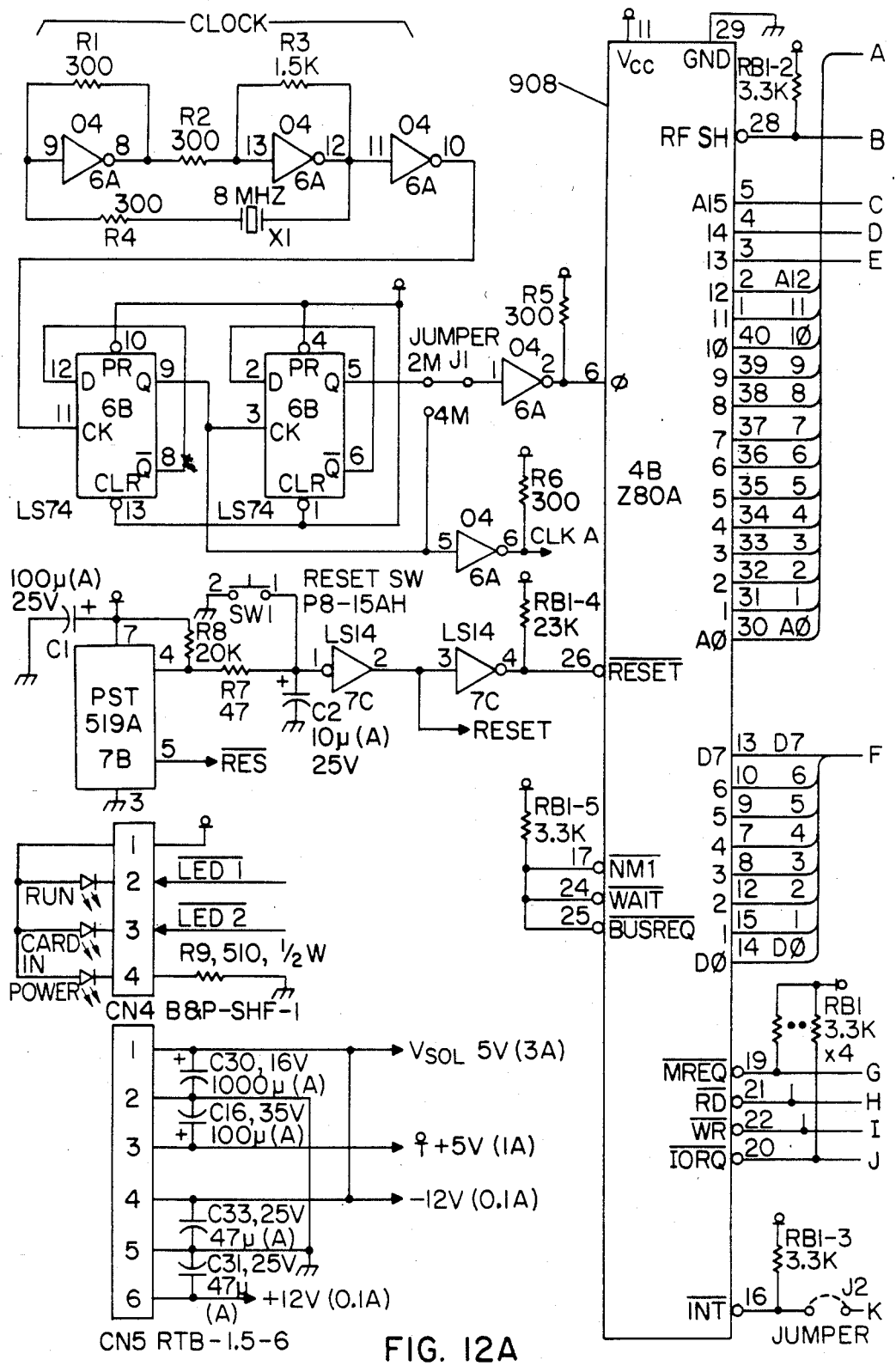
FIG. 12 and FIG. 13 together show the schematic diagram of the IC information card reader/writer of FIG. 10.
Figure 12B:
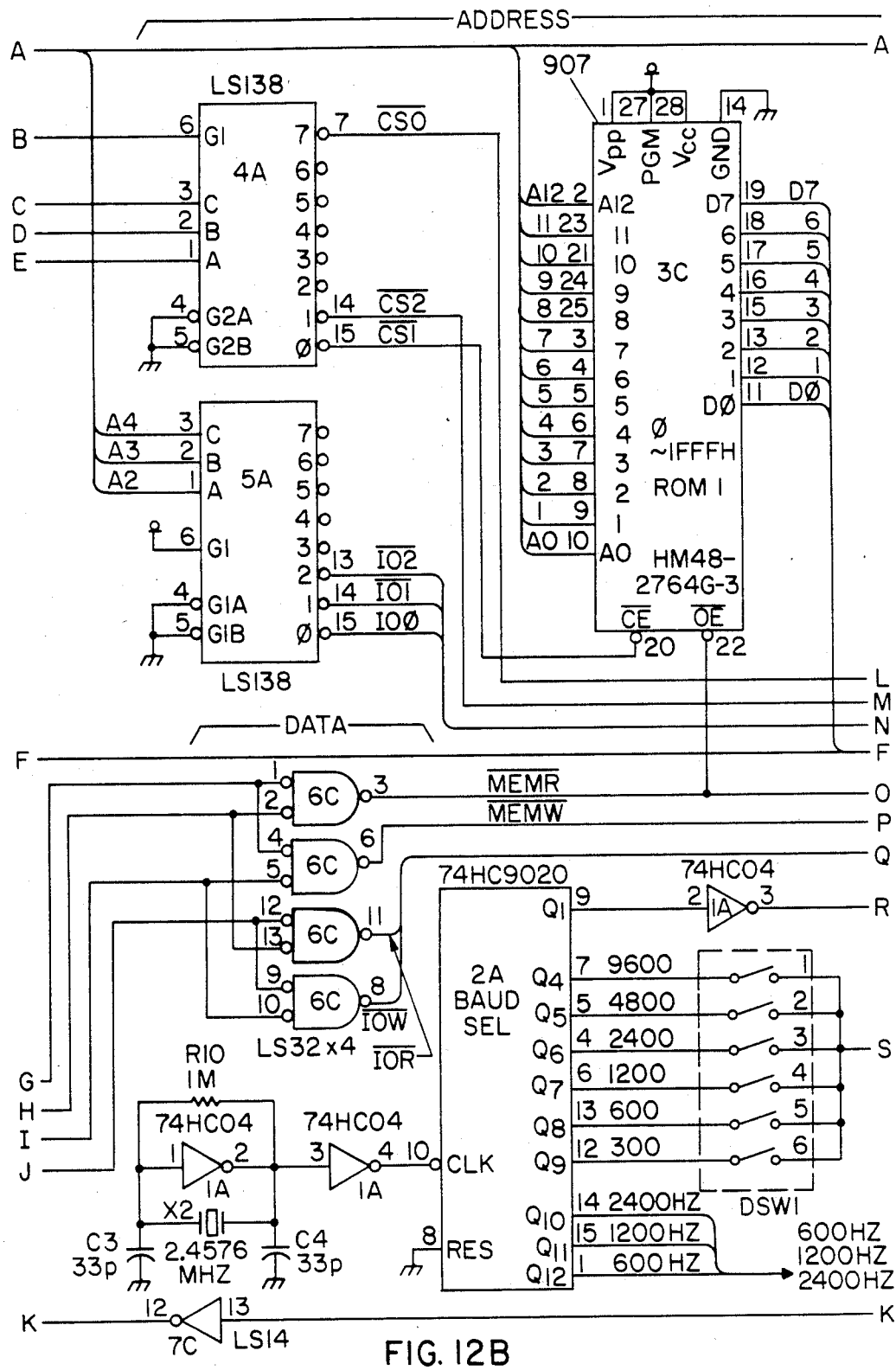
Figure 12C:
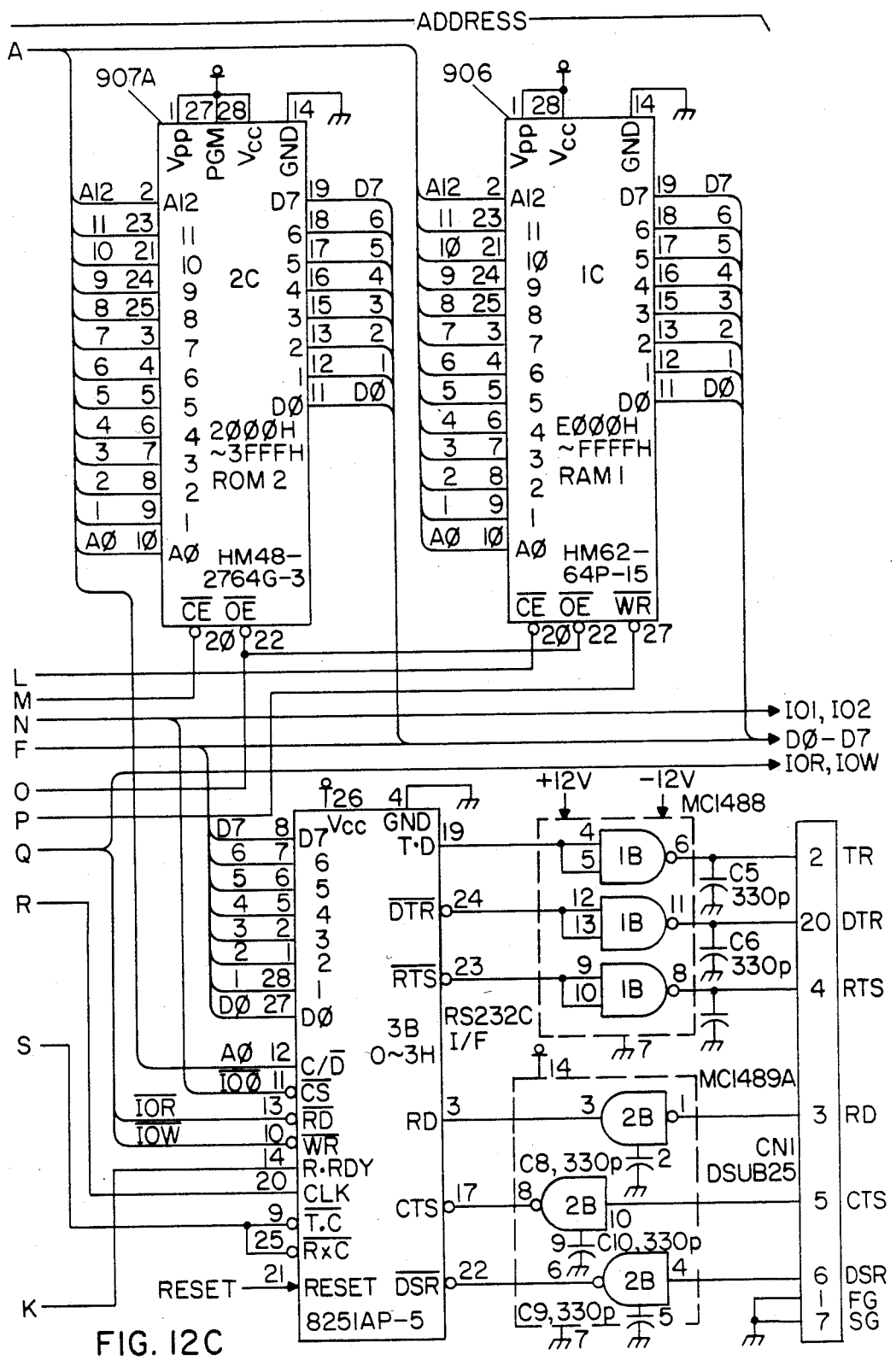
Figure 13A:
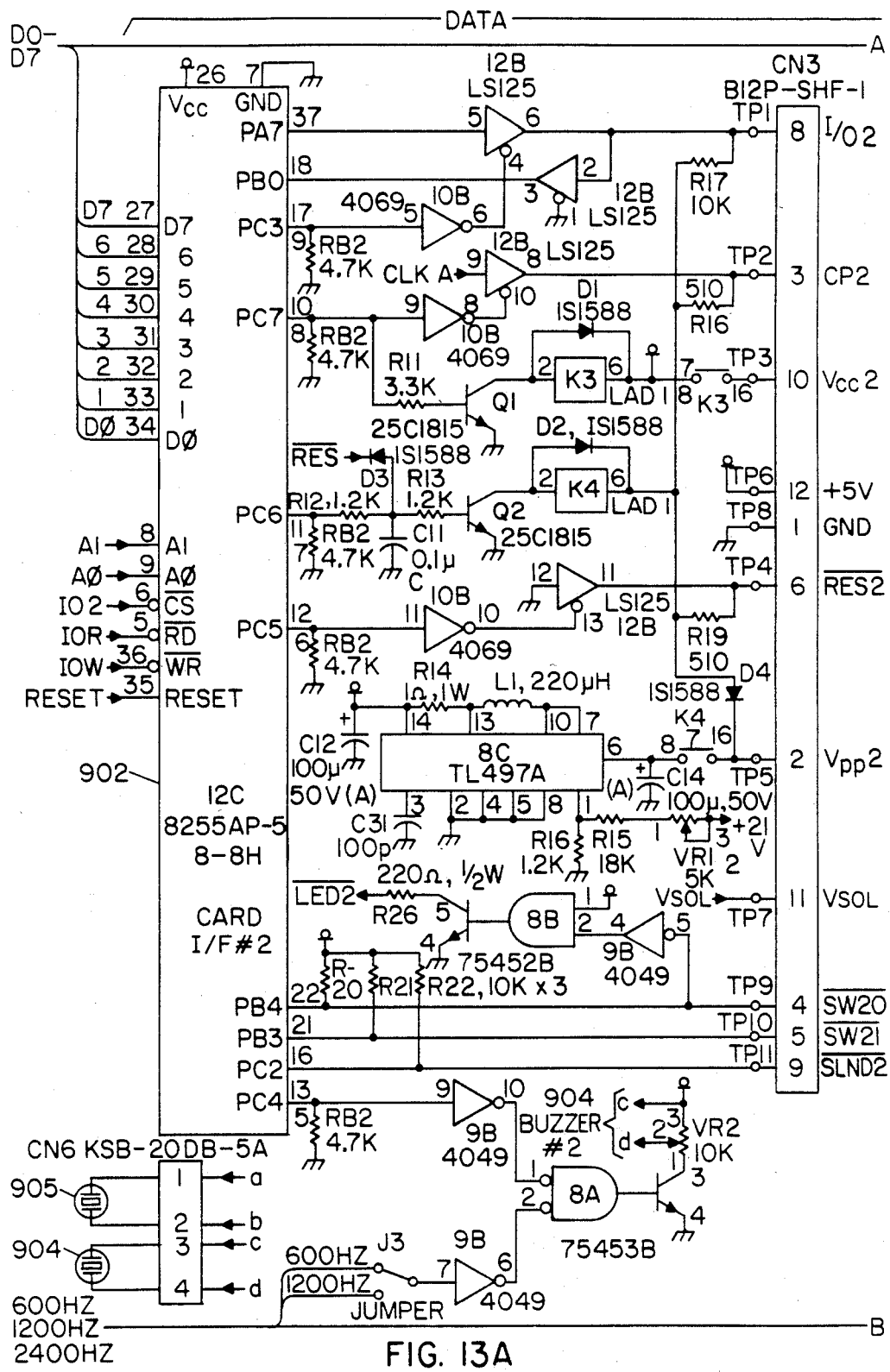
Figure 13B:
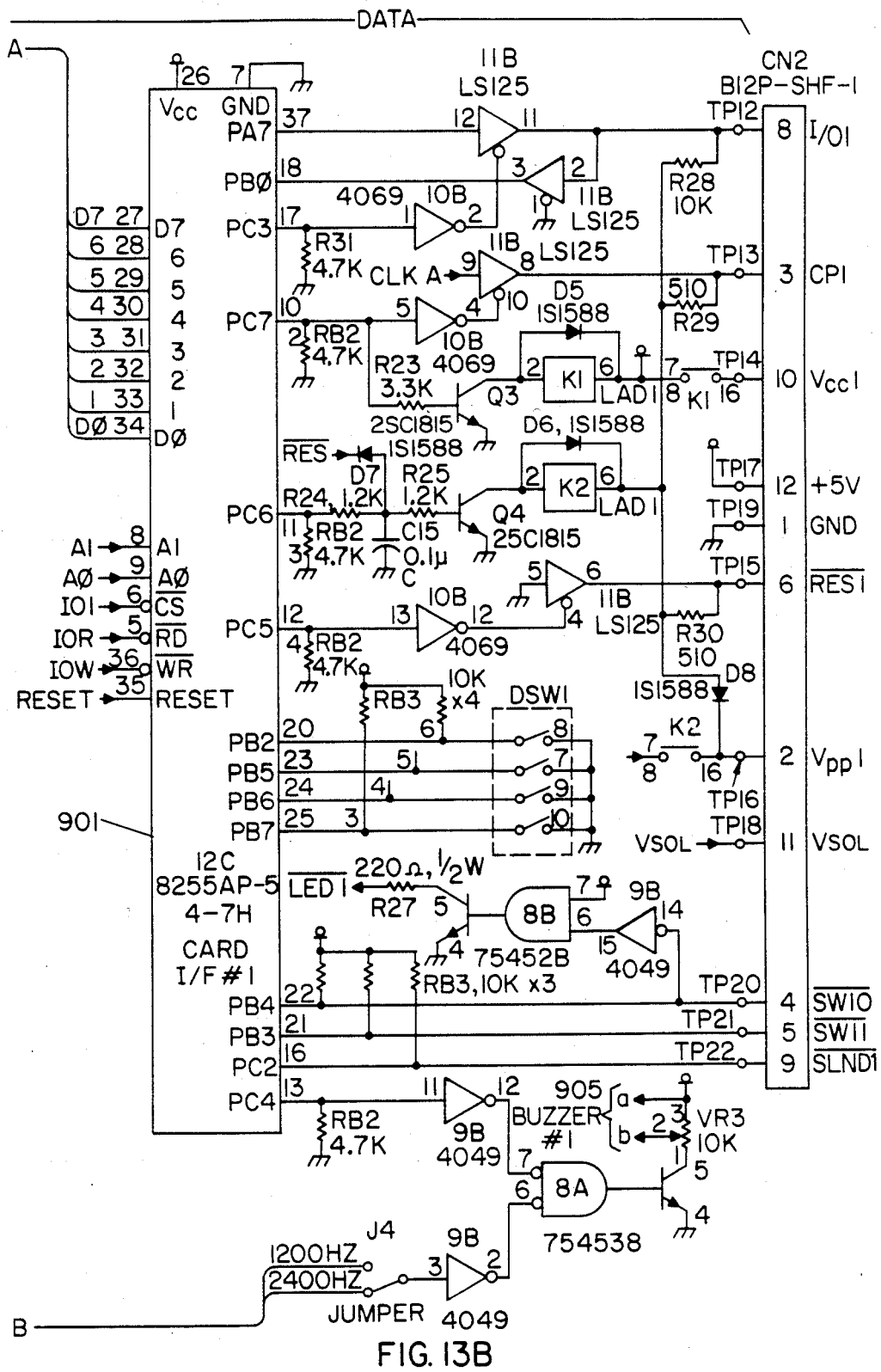

A more detailed schematic diagram of the reader/writer in accordance with the invention is shown in FIGS. 12 and 13. FIG. 12 shows on the left the Z80A CPU unit 908 being connected on the upper left to a clock which drives one of its inputs. A reset circuit is also provided on the left of this figure, as well as connections to the power LED and the connection socket for the power supply. Shown on the upper right in FIG. 12 are the ROMs 907 and 907A and the RAM 906, which are connected to the Z80A CPU 908 by an address bus in the upper part of the figure and a data bus in the central part of the figure. A baud rate selection dip switch arrangement is shown in the bottom center portion of the figure, which also provides square wave outputs to drive the respective buzzers. Also shown in the bottom portion of this figure is the RS-232C interface which is connected to the baud rate selection chip and to the cable connector to the RS-232C interface.

Referring to FIG. 13, the card interface units 901 and 902 are shown respectively in the right and left hand portions of the figure. Each of the interface units is connected to the data bus in the upper portion of the figure, and are connected to the various solenoid coils in the respective transport units of the reader/writer ports 914 and 915 via connection strips CN2 and CN3, respectively. The buzzer 905 for the card I/F1 is connectable to terminals a and b in the bottom right portion of the figure, and the buzzer 904 for card I/F2 is connectable to terminals c and d in the bottom center of the figure.

Figure 14:
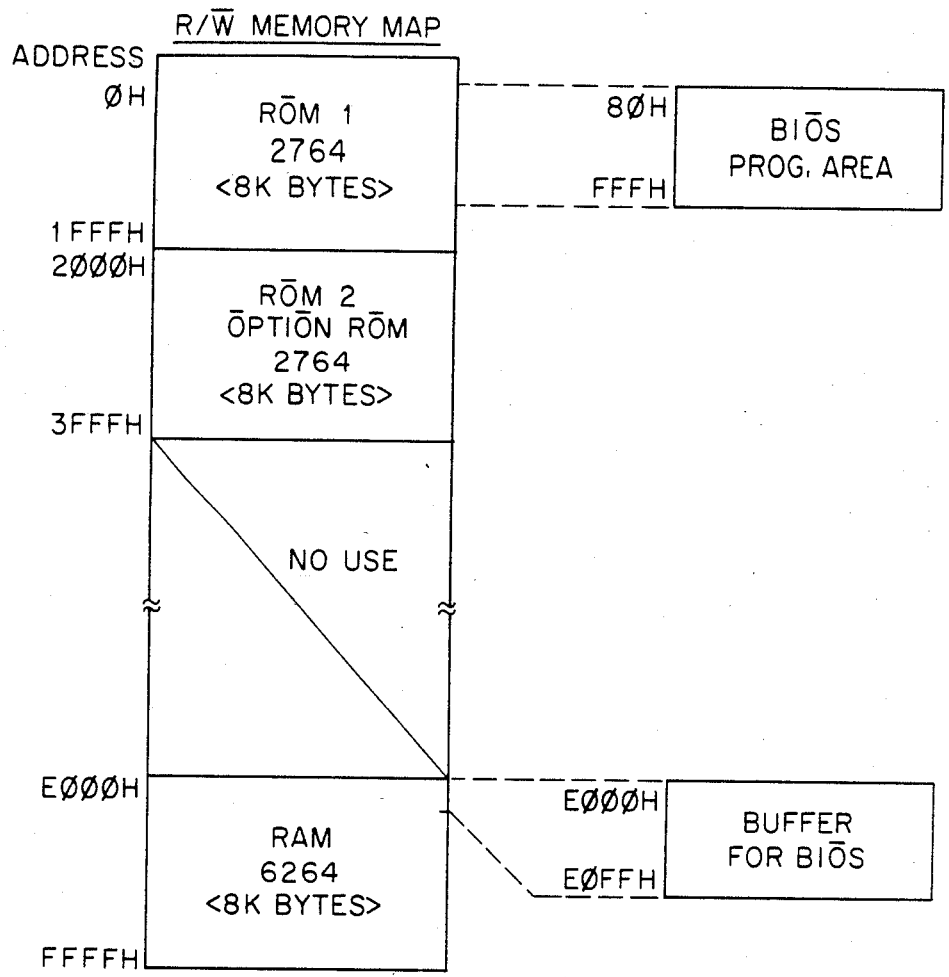
FIG. 14 shows the memory map of the ROM and RAM of the IC information card reader/writer of FIG. 10.

The reader/writer memory map is illustrated in FIG. 14. This memory map shows the BIOS program area resident in a portion of the 8K byte area of ROM1 907, and the buffer for the BIOS present in a portion of the 8K byte area of RAM 906.

IC CARD SECURITY SYSTEM SOFTWARE

Figure 15:
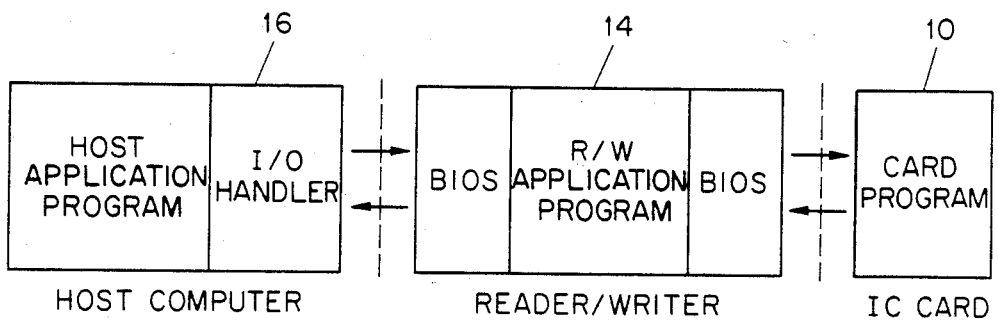
FIG. 15 shows in block diagram form the configuration of software for the IC information card system in accordance with the invention.

FIG. 15 shows the configuration of the software provided for the present IC card system in simple block form. As shown in this figure, the host computer 16 contains the host application program and the input/output (I/O) handler. The I/O handler of the host communicates with the reader/writer 14 through the BIOS program of the reader/writer. The reader/writer also has an application program. Communication with the IC card 10 is made through the BIOS program of the reader/writer as shown. The IC card 10 also has its own card program resident in its microprocessor memory.

The host application program is prepared according to the particular business requirements of the IC card system user. The I/O handler of the host provides the basic input/output routine for communication between the host computer and reader/writer. The BIOS program is the input/output handler for the IC card reader/writer and can perform input/output operations via the RS-232C link to the host computer, input/output operations to and from the IC cards, and other functions. Typical other functions include turning on and turning off of the internal buzzers 904 and 905 of the reader/writer, and checking whether a card is inserted or not inserted. The application program of the reader/writer is prepared according to the requirements of the system. The card program which is built into the CPU of the IC card during chip fabrication controls the configuration and access of the IC card and the card memory, as described above.

The reader/writer is designed to facilitate the host computer in accessing the data stored in the IC card in order to fully utilize the IC card functions. Commands issued by the host computer can be divided roughly into the following command types: reader/writer control commands, data record control commands, IC card issue commands (IC card format command), and security related commands. The reader/writer application program implements the reader/writer BIOS commands, which are listed in TABLE B herein. It should be understood that the host computer and the IC card reader/writer can be connected over a telecommunication link via a modem/acoustic coupler.

The reader/writer application program in the preferred embodiment incorporates a security plan which uses one of the two cards as the control card and the second as the application or user card. This approach increases the overall security of the system by avoiding the dissemination of knowledge of the keys required to access the various data zones of the IC card memory. For example, the O-key need not be known to any person, since it can be stored in the control card. Therefore, that key is not readily available to someone who wishes to make an unauthorized access attempt in the user card. Additionally, the two card approach eliminates the need for the entry of the access keys and other information by the system user.

Figure 40A:
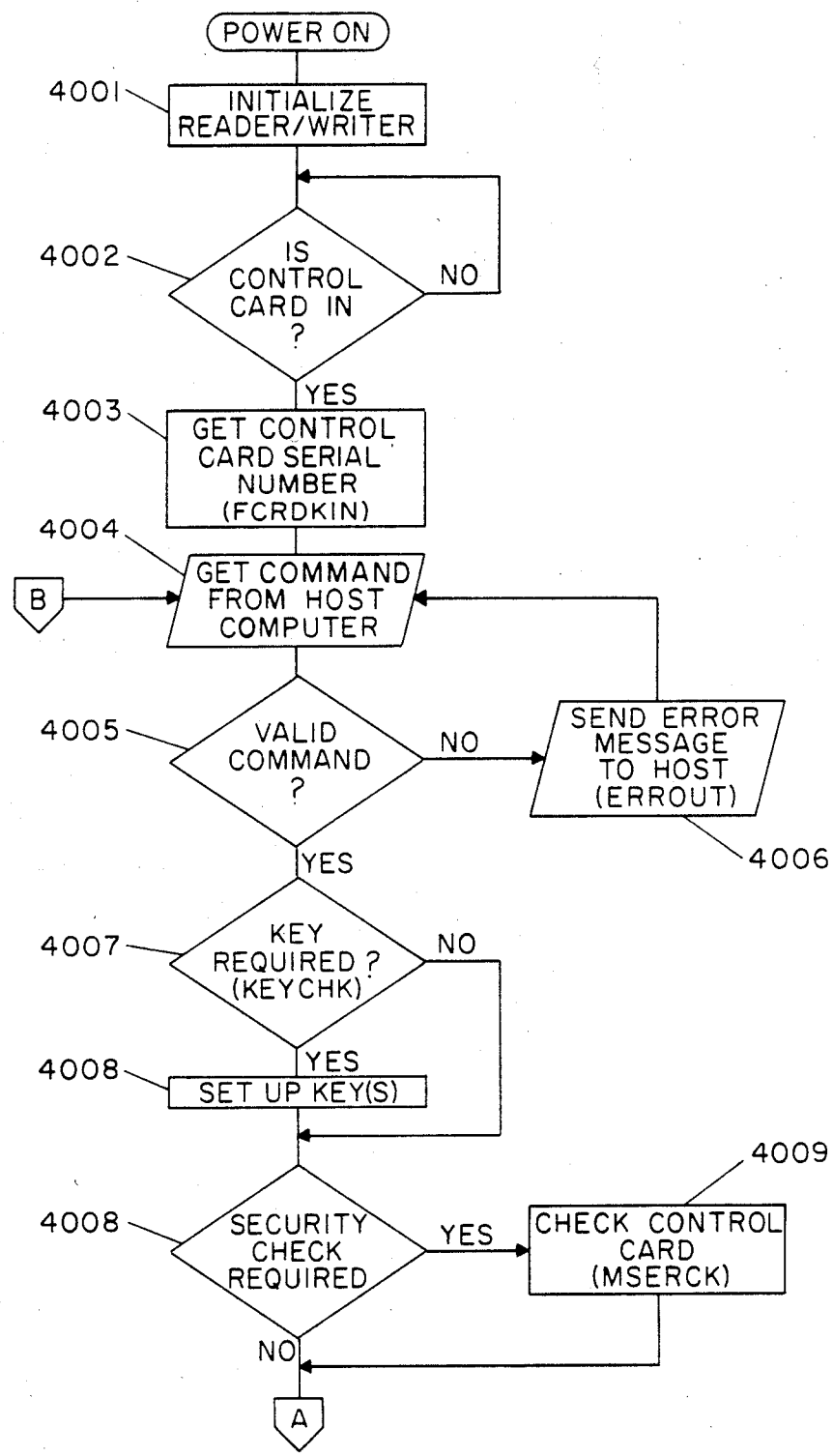
FIGS. 40A and 40B show flow diagrams representing the IC information card reader/writer application program process flow in accordance with the invention.
Figure 40B:
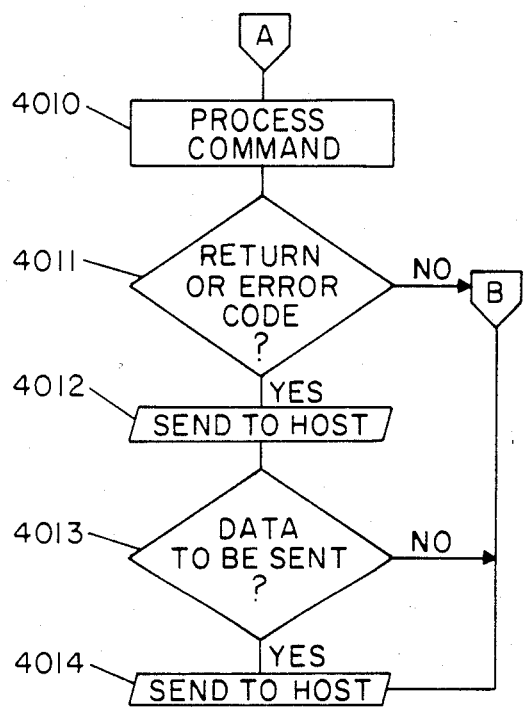
Figure 41:
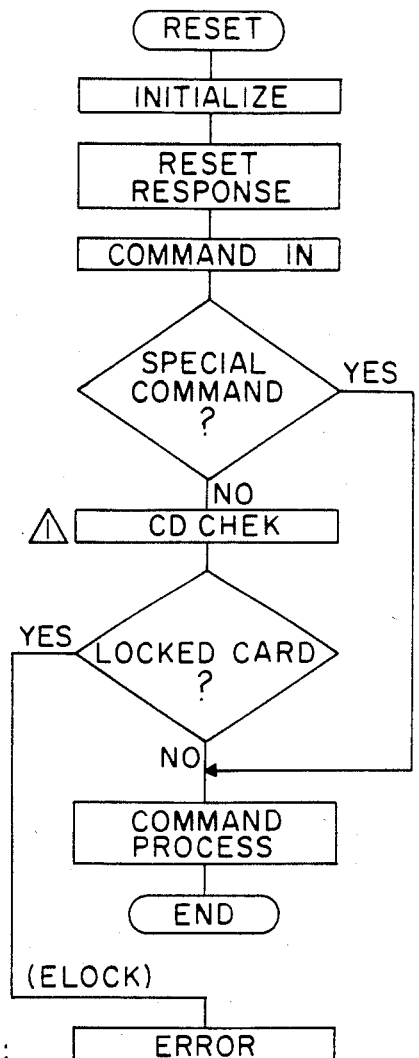
FIGS. 41 through 91B show the flow charts of the program of the microprocessor of the IC information card in accordance with the invention.
Figure 42:
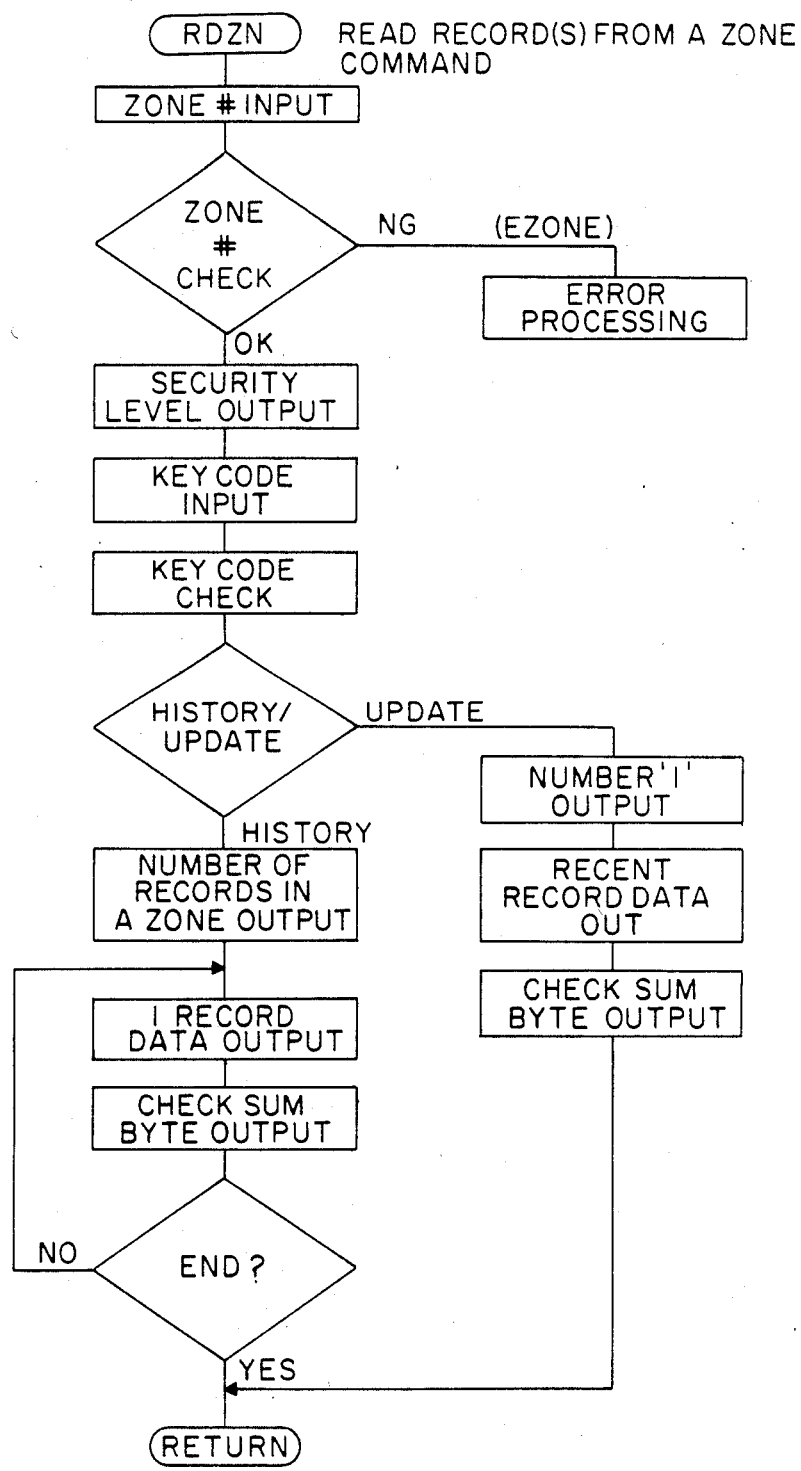
Figure 43:
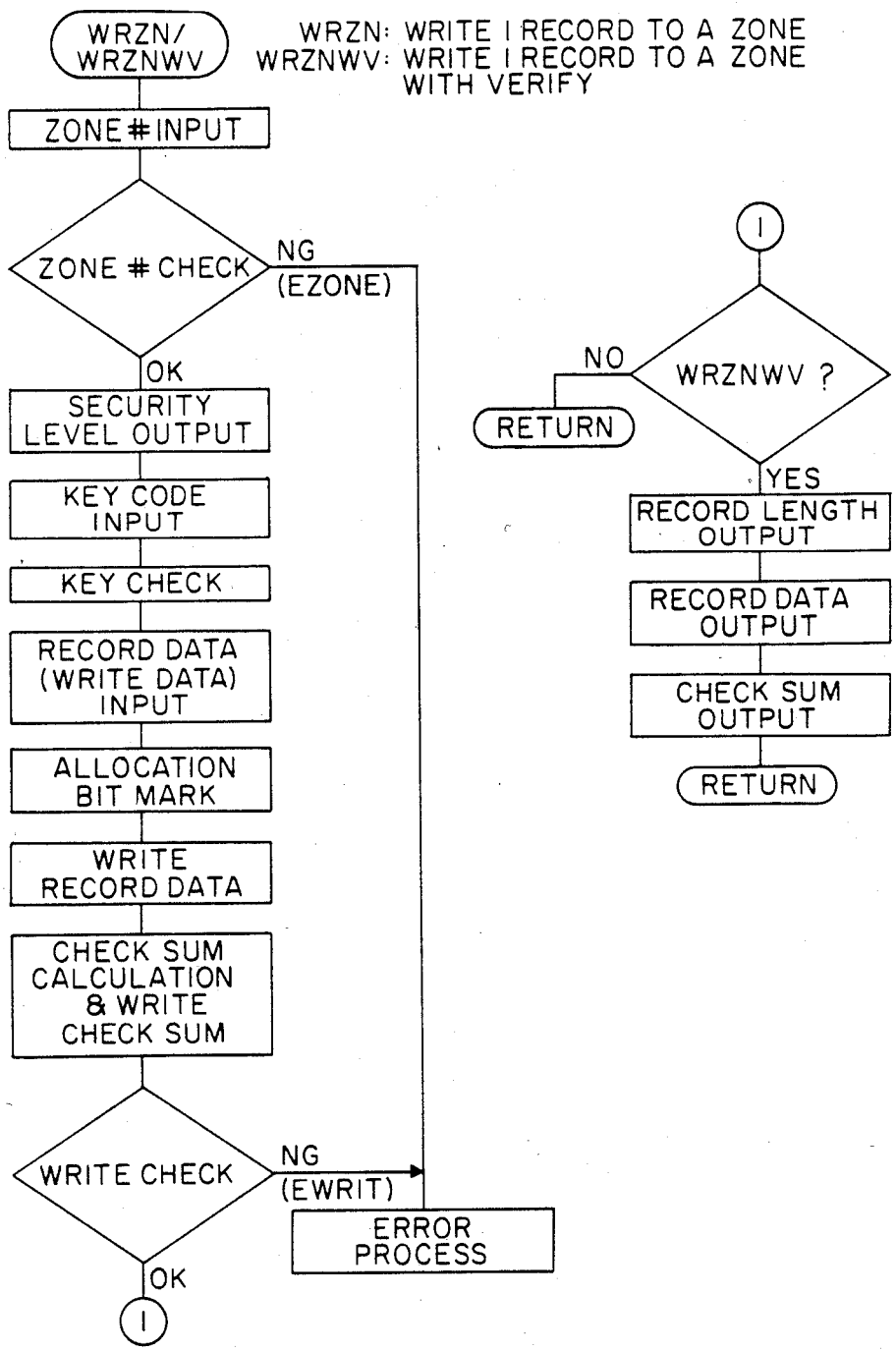
Figure 44:
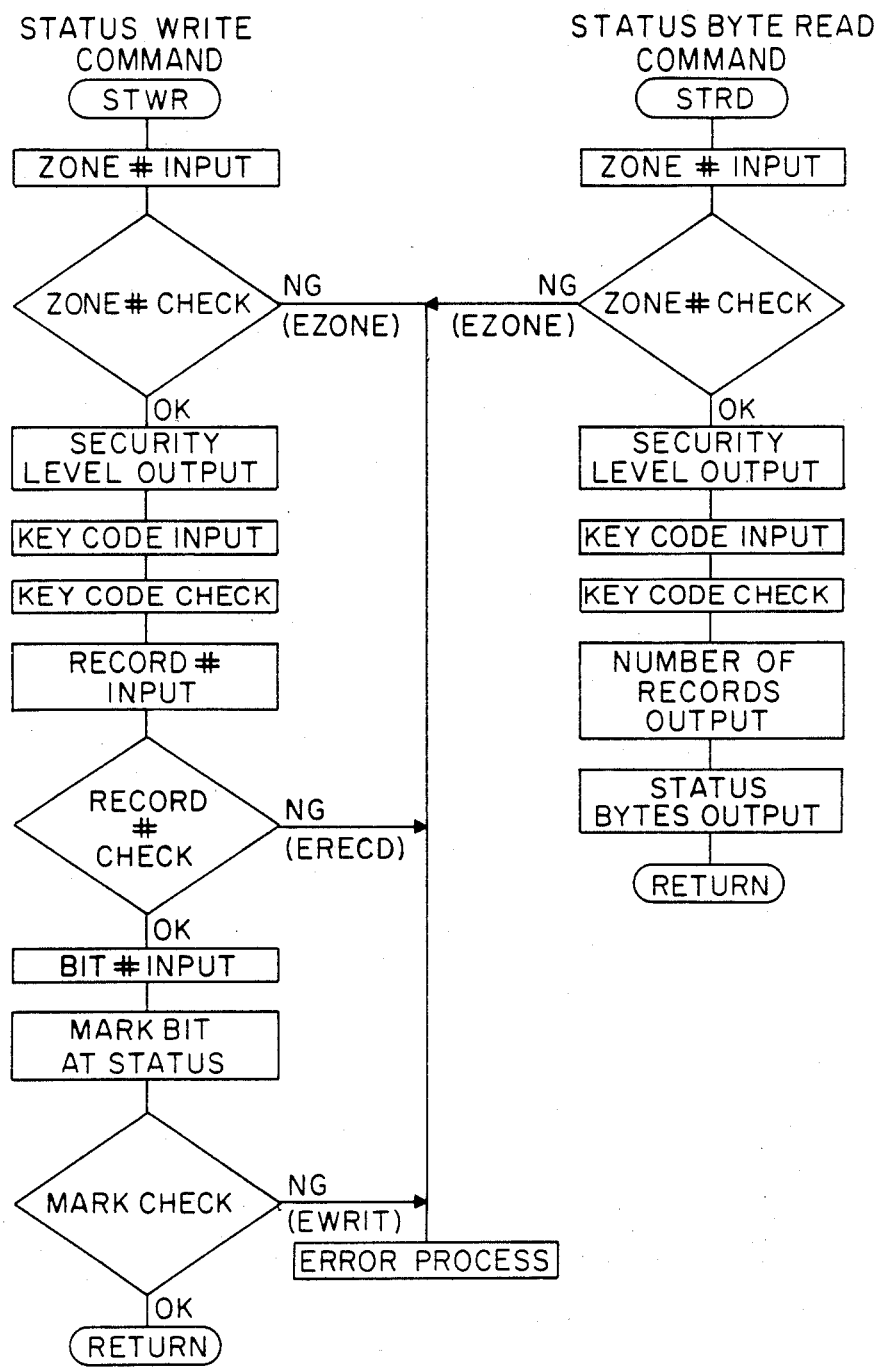
Figure 45:
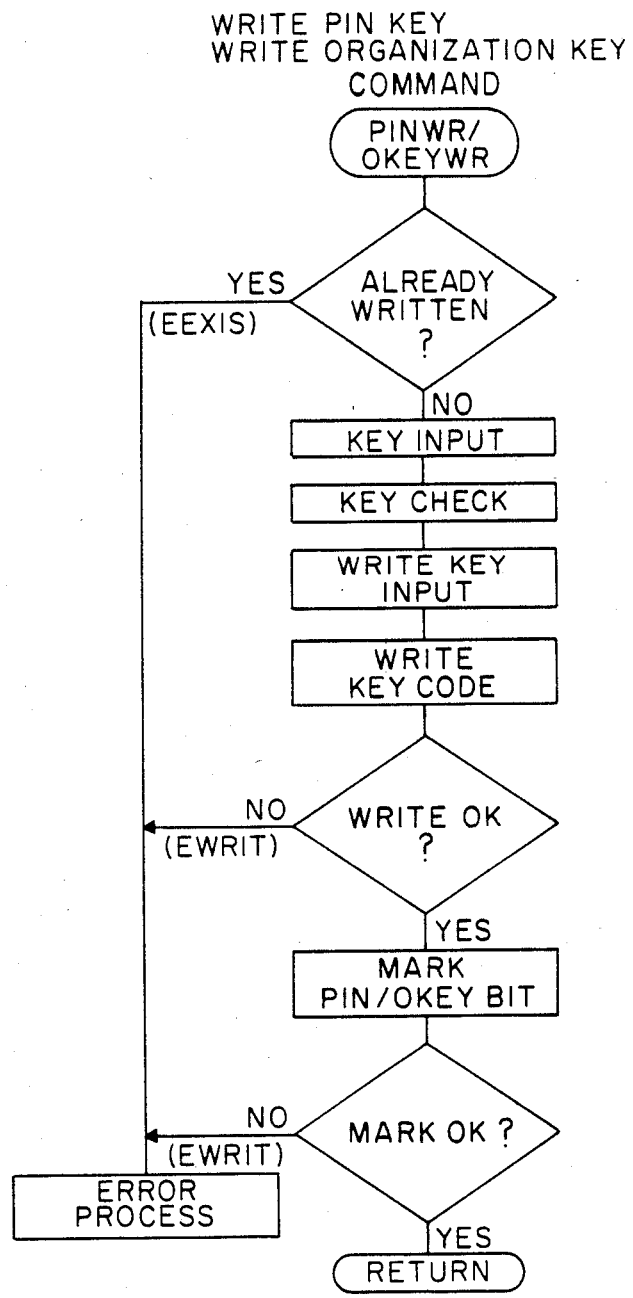
Figure 46:
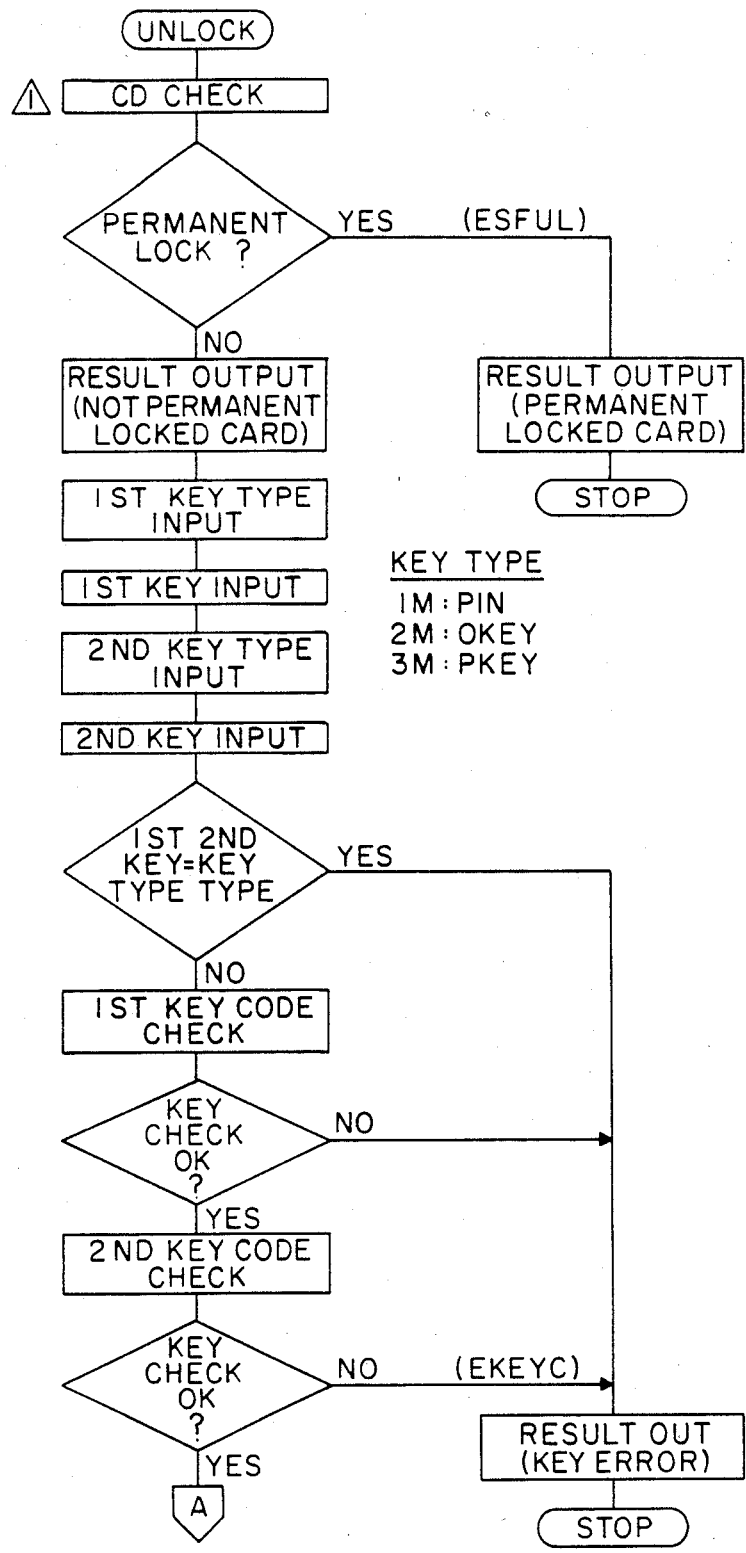
Figure 47:
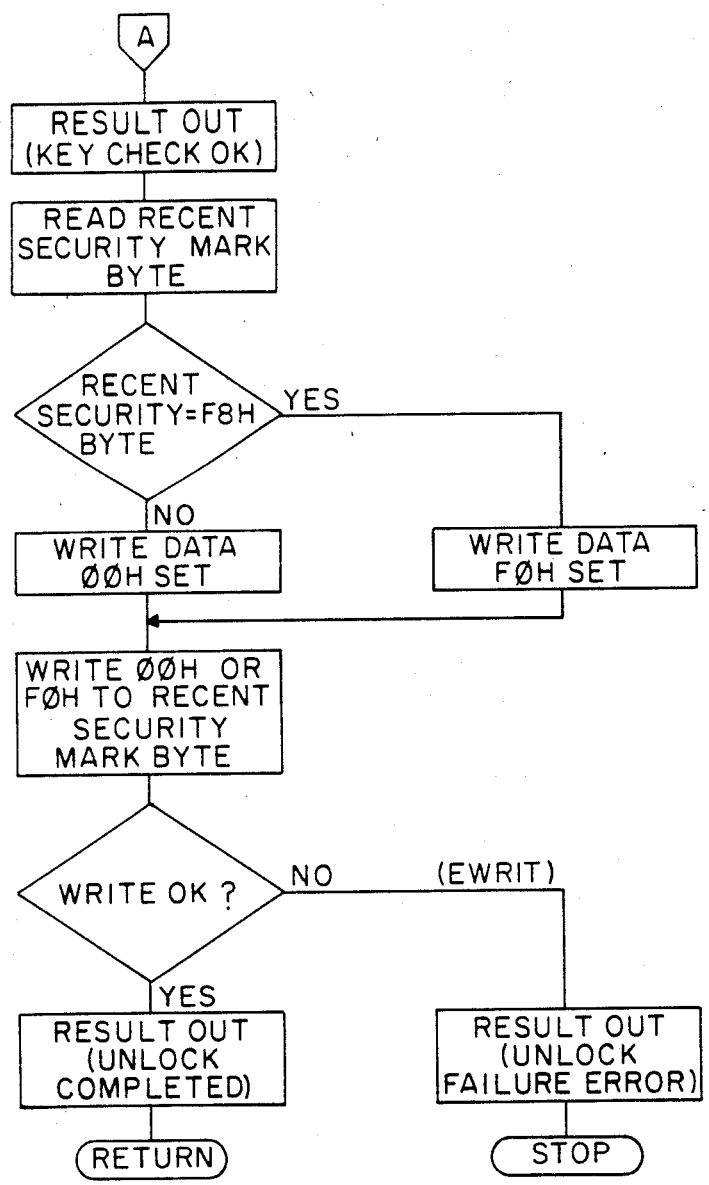
Figure 48:
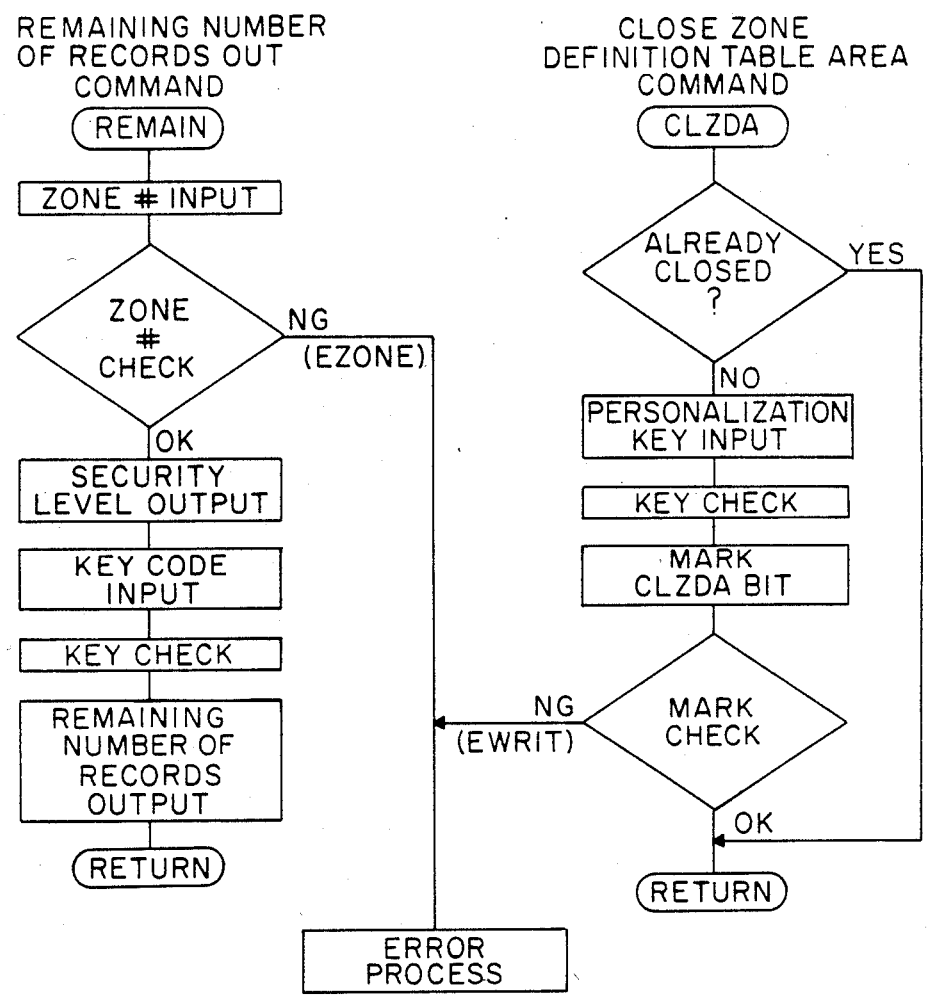
Figure 49:
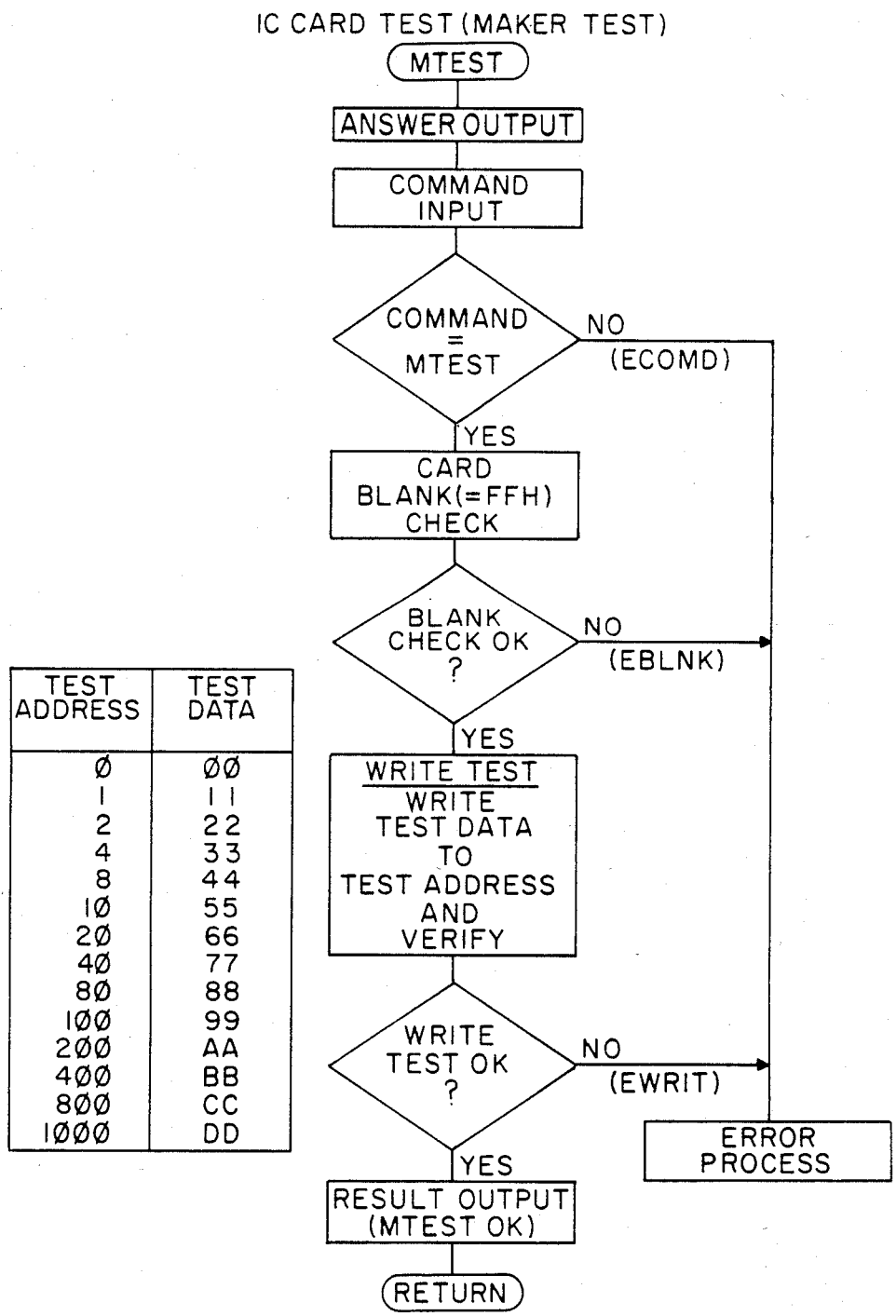
Figures 50, 51:
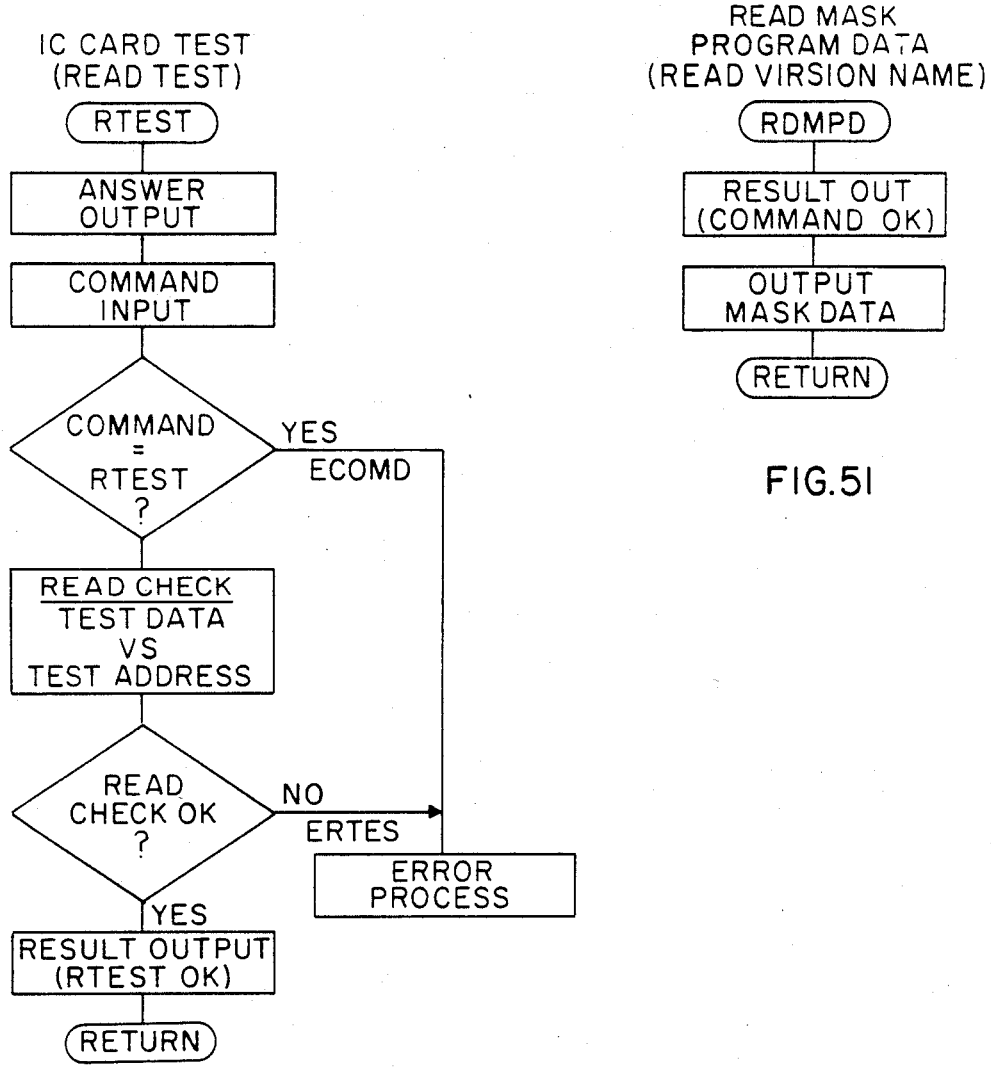
Figure 52:
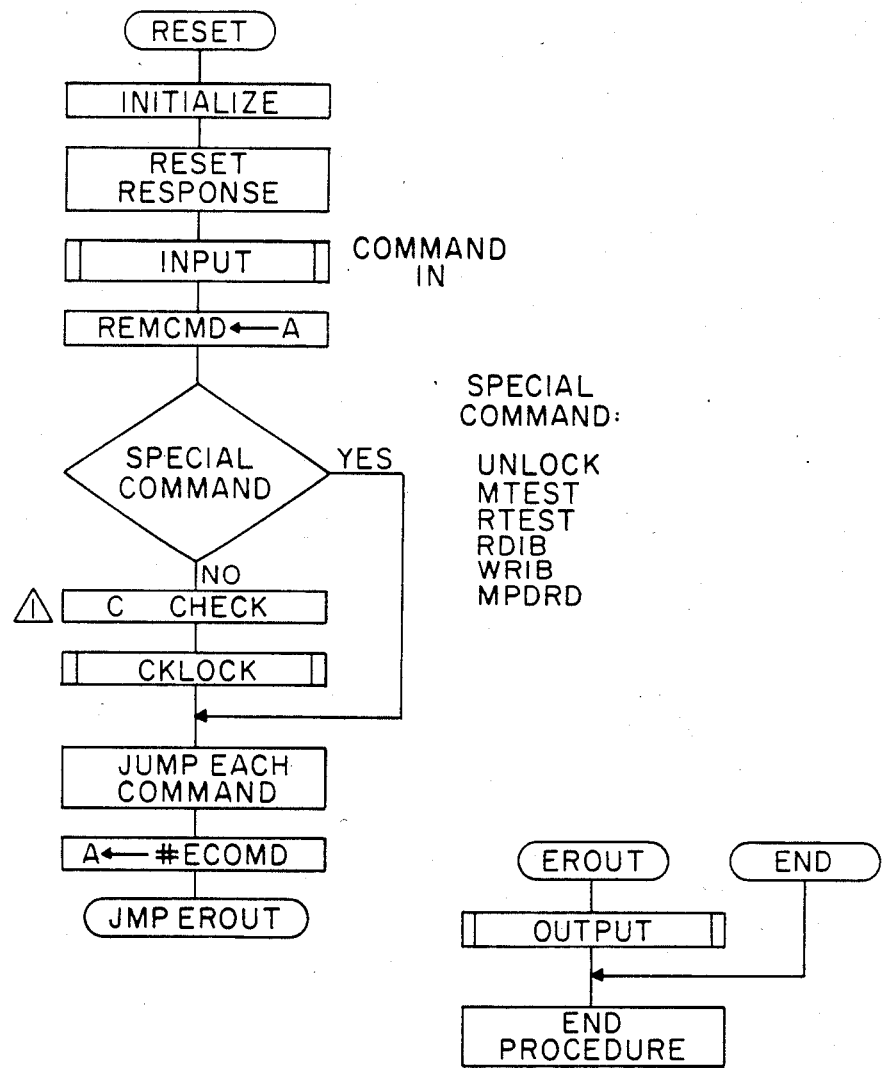
Figure 53:
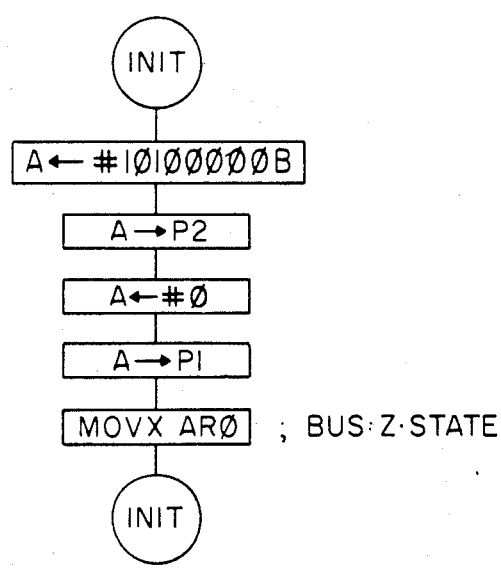
Figure 54:
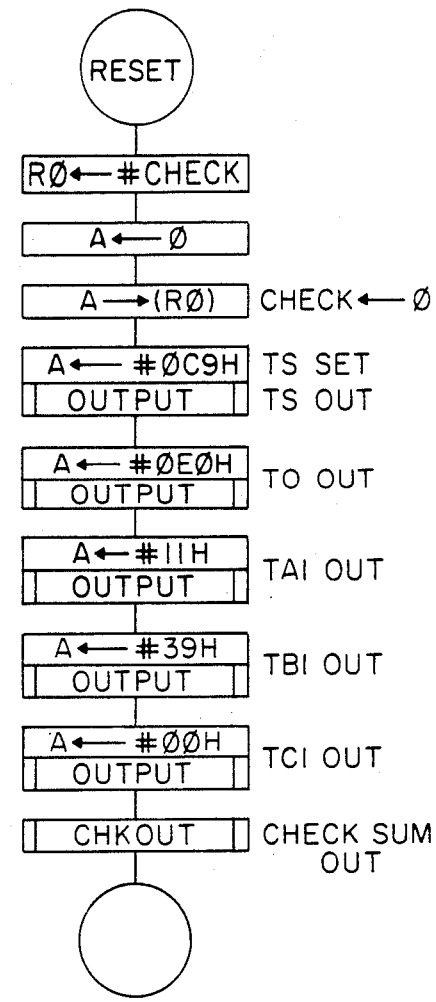
Figure 55:
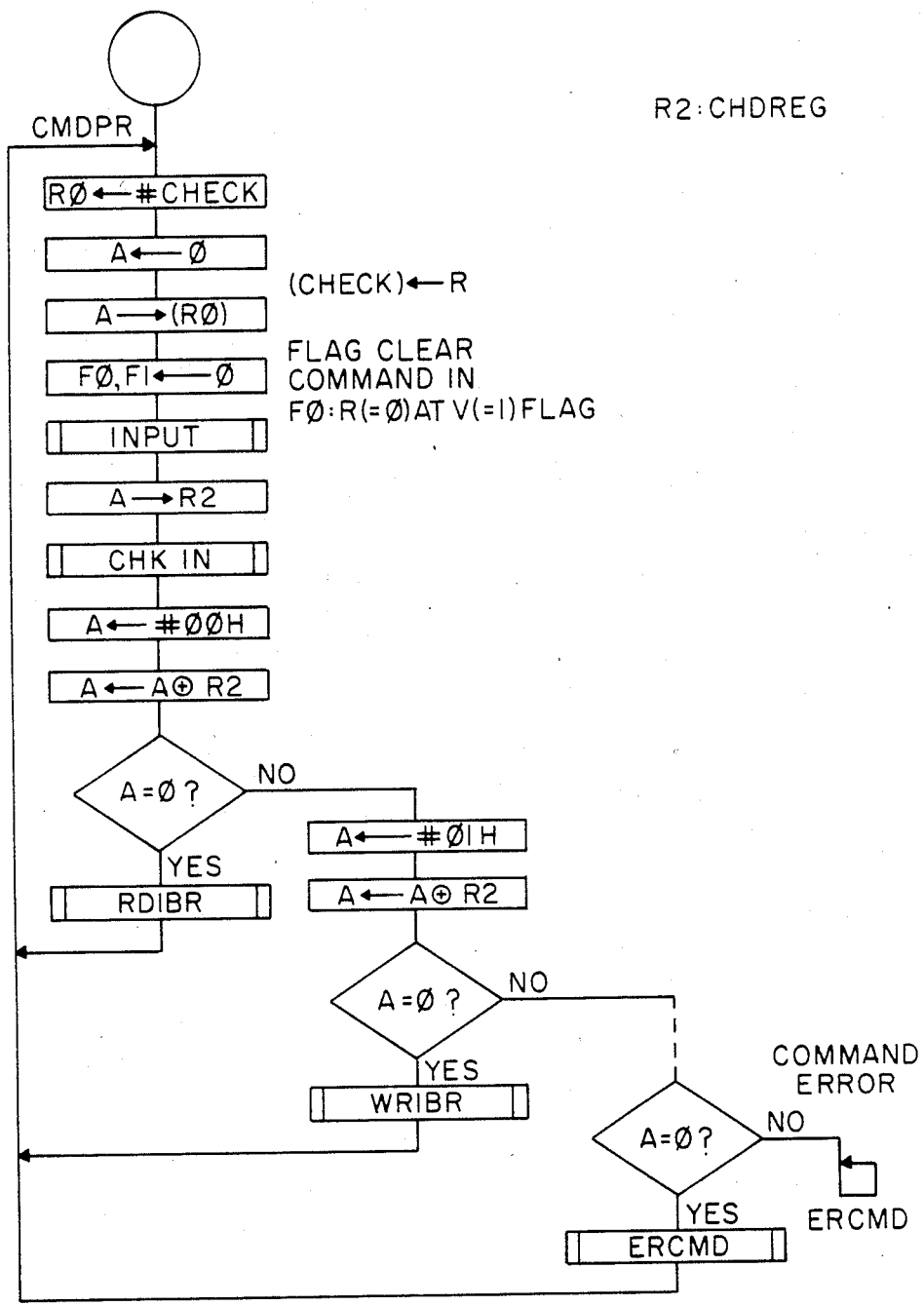
Figure 56A:
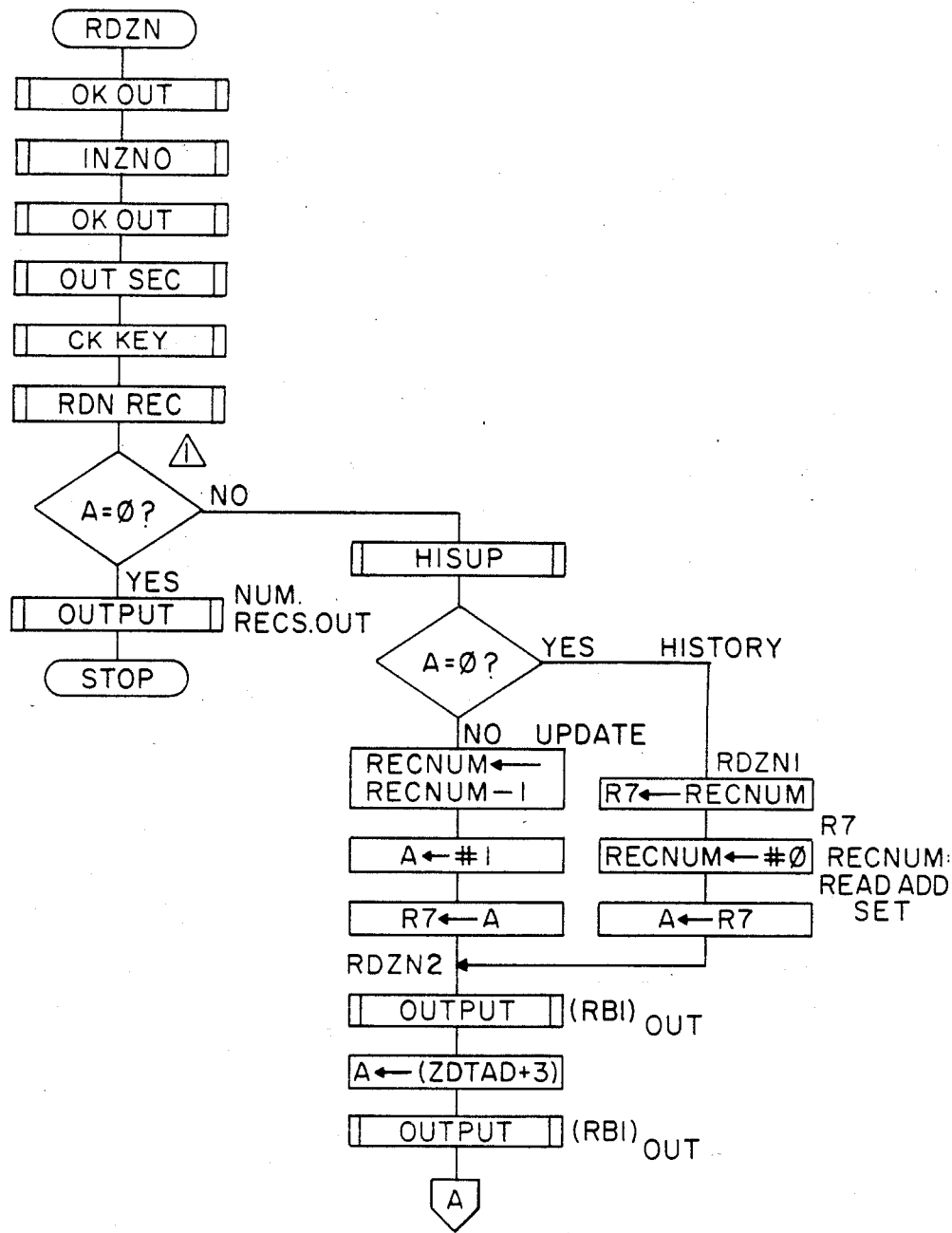
Figure 56B:
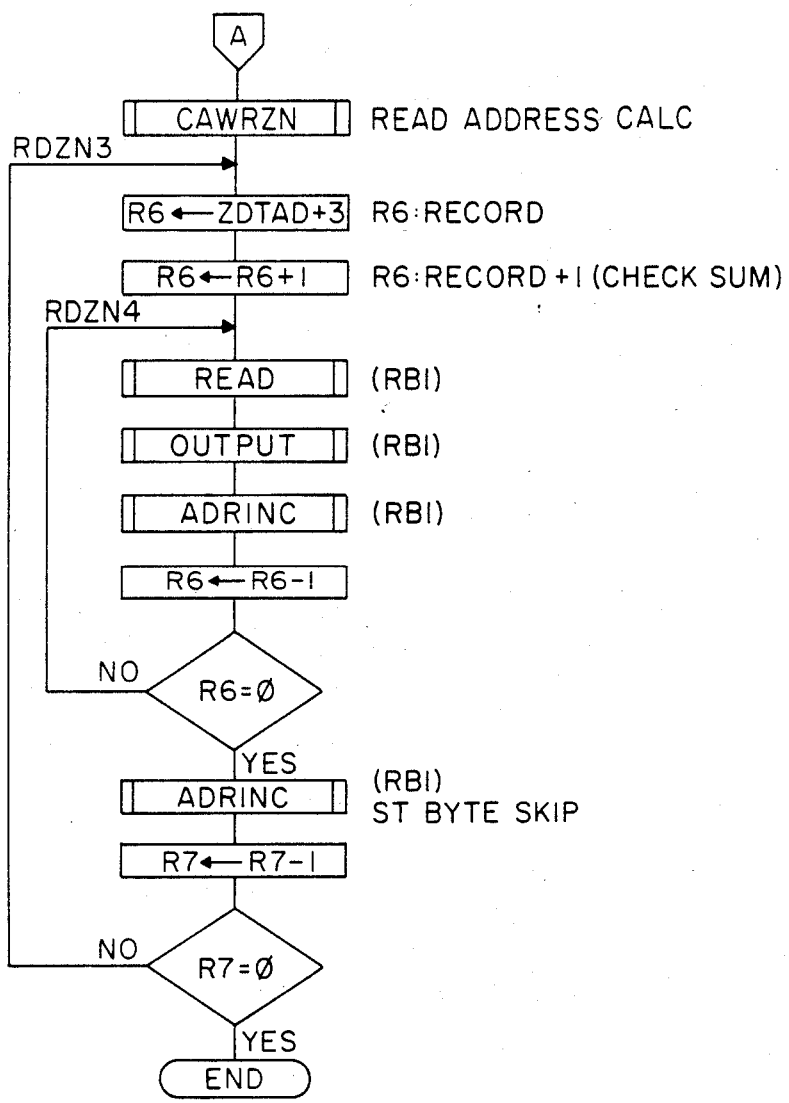
Figure 57A:
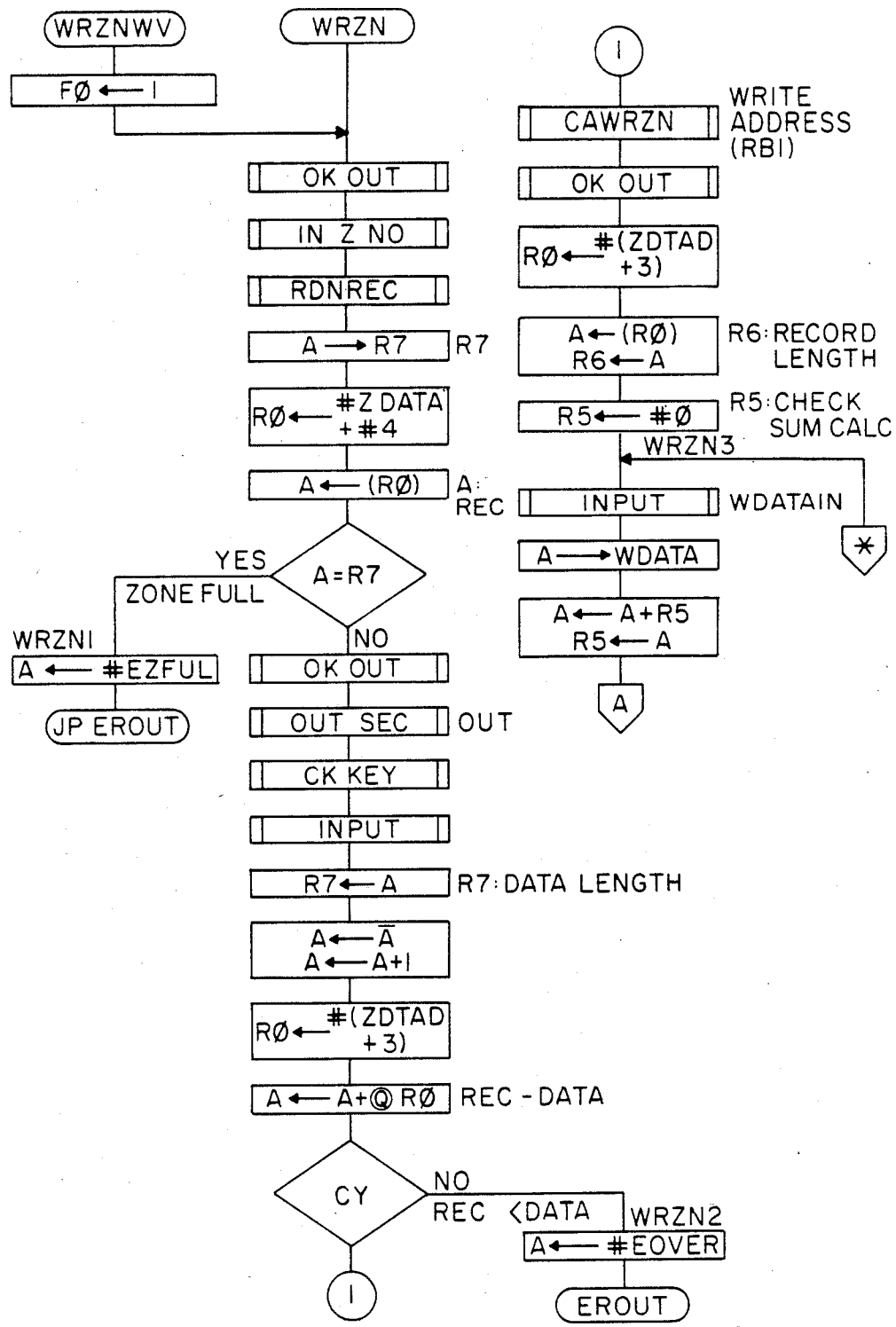
Figure 57C:
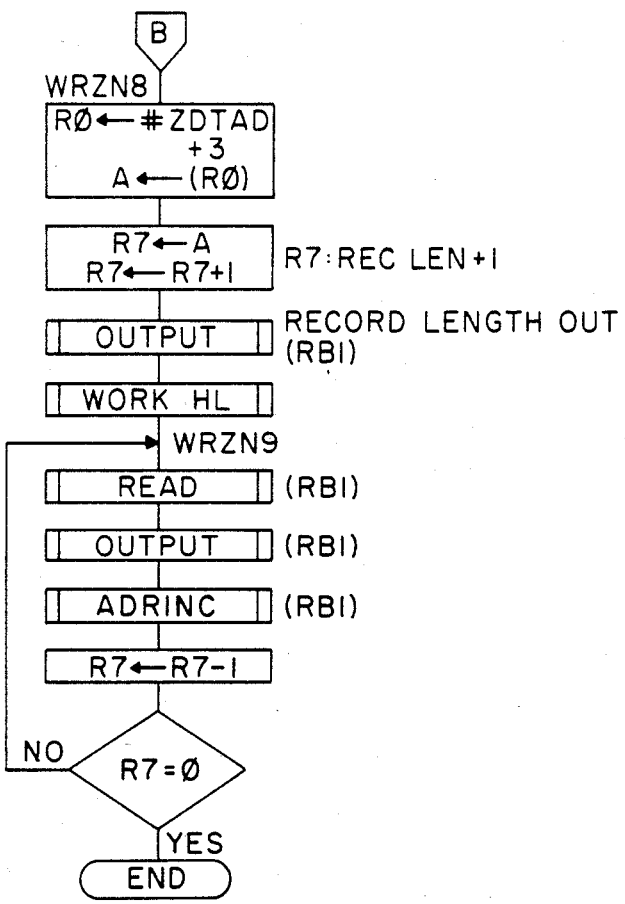
Figure 58:
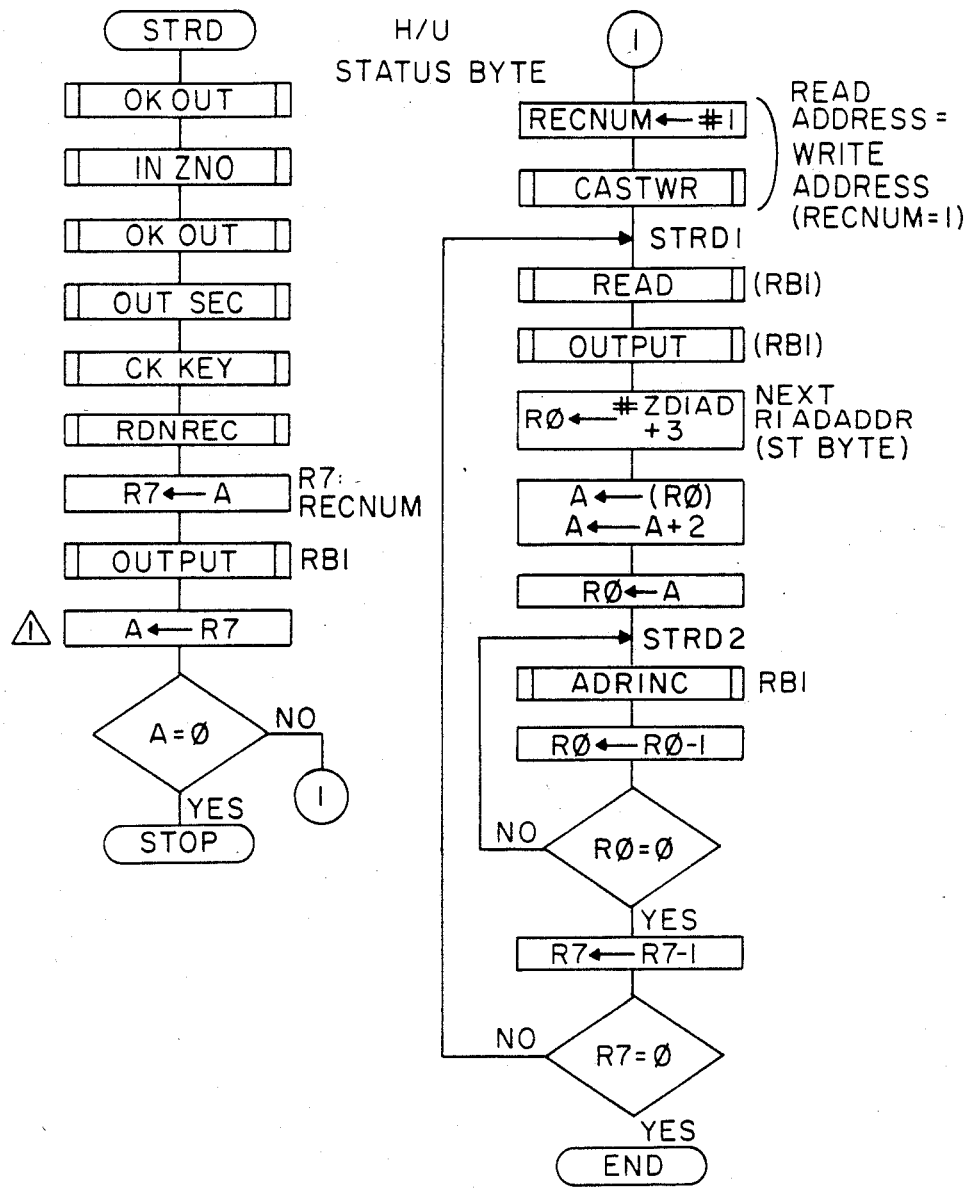
Figure 59A:
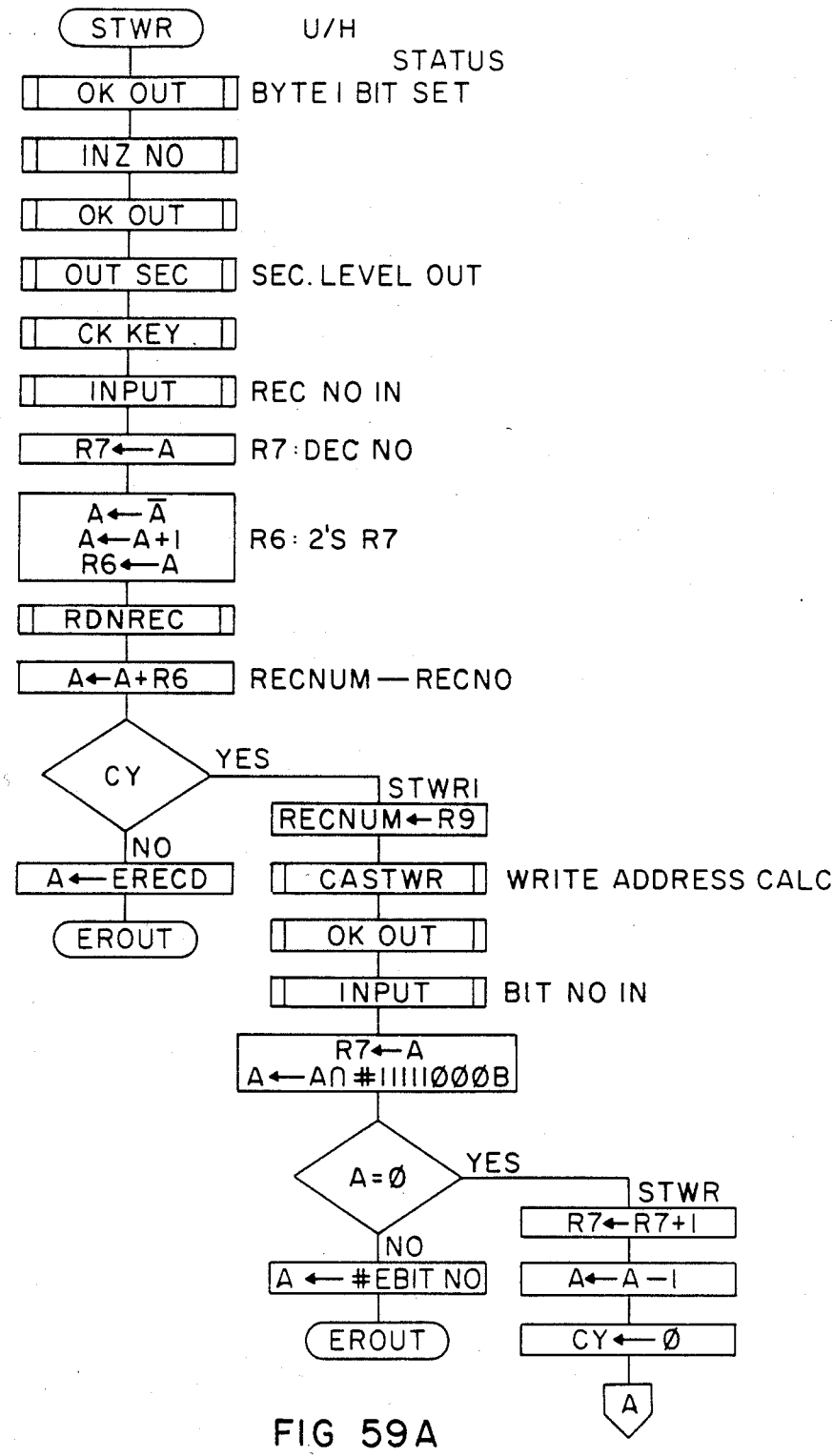
Figures 59B, 60:
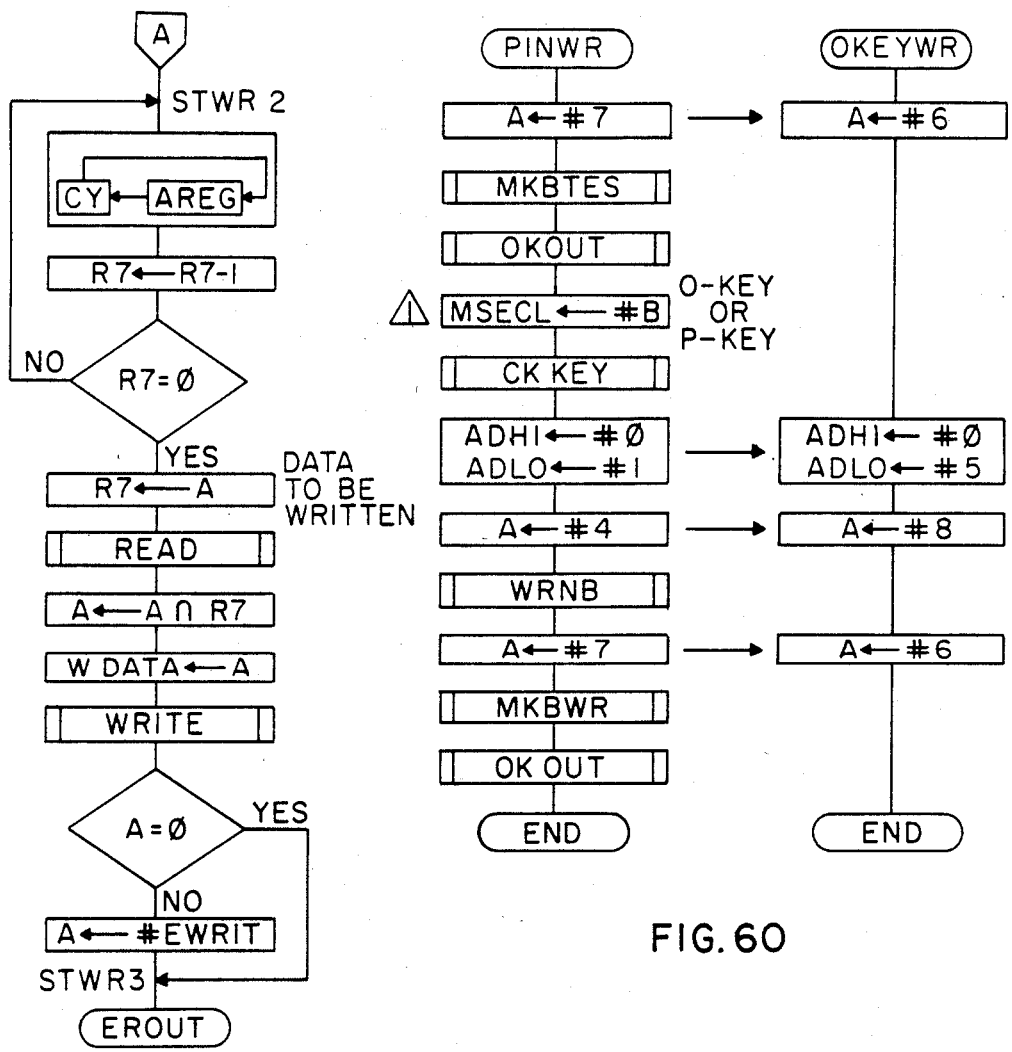
Figures 61, 62:
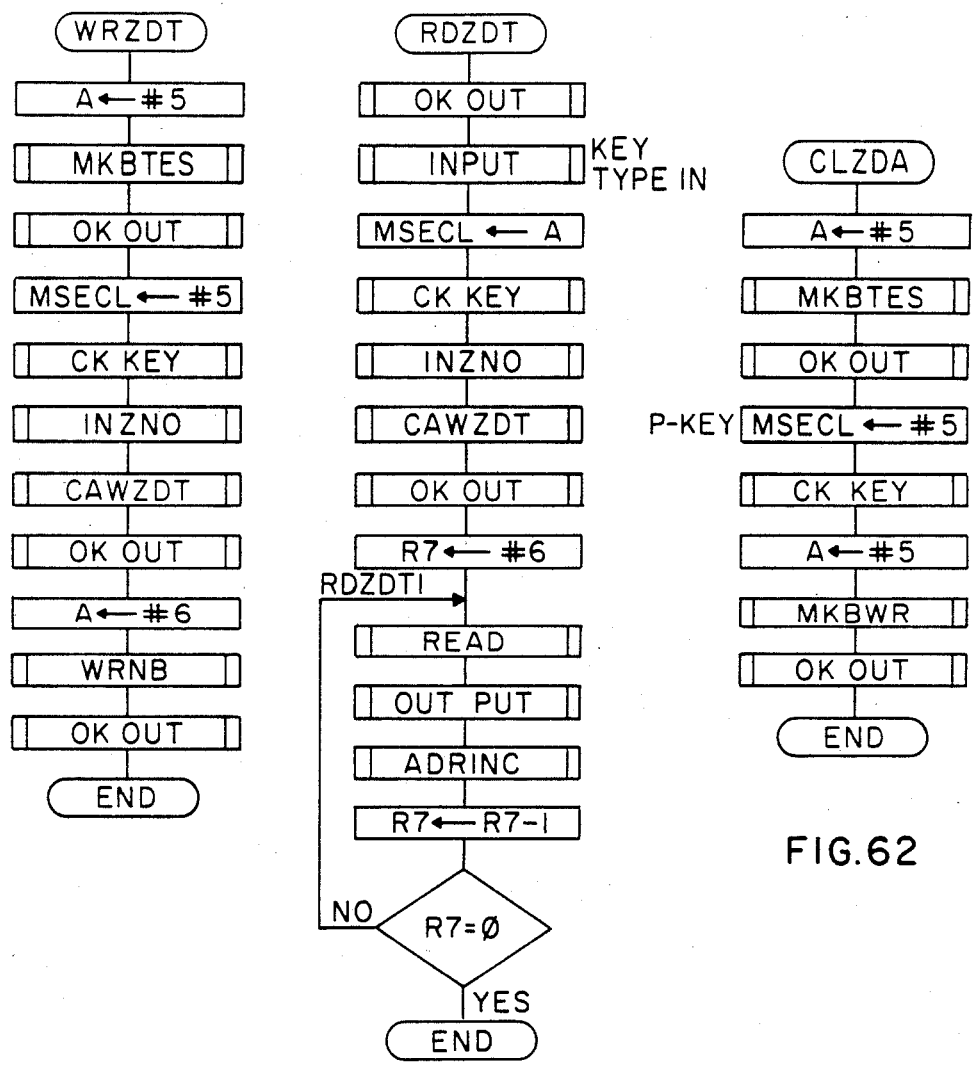
Figure 63:
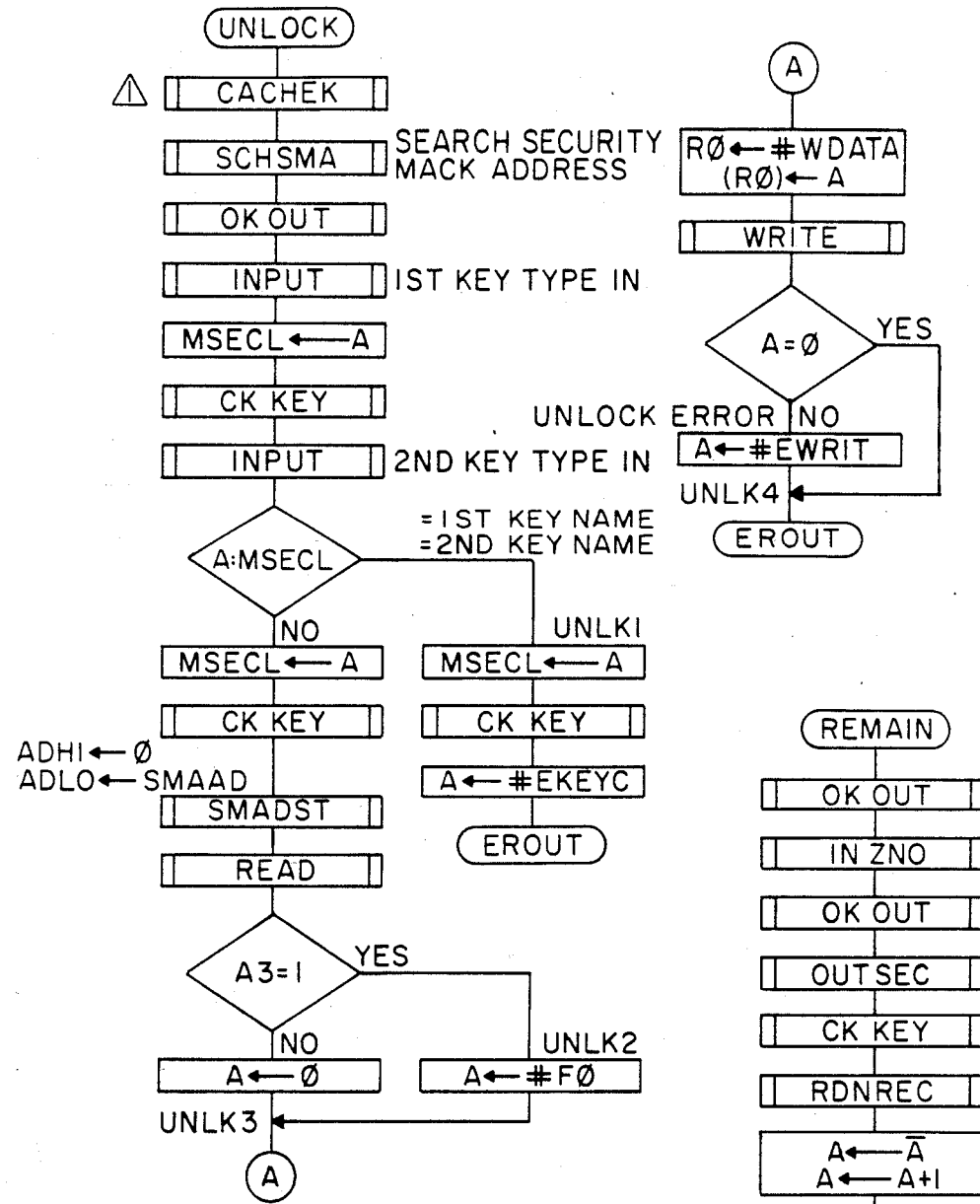
Figure 64:
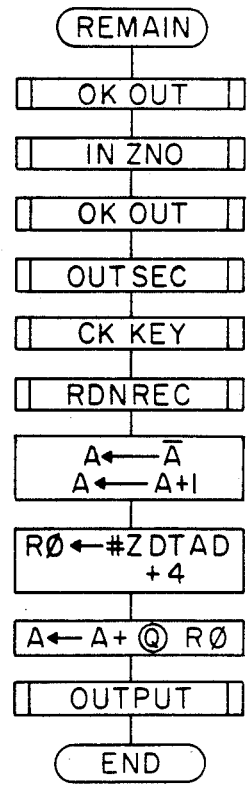
Figure 65A:
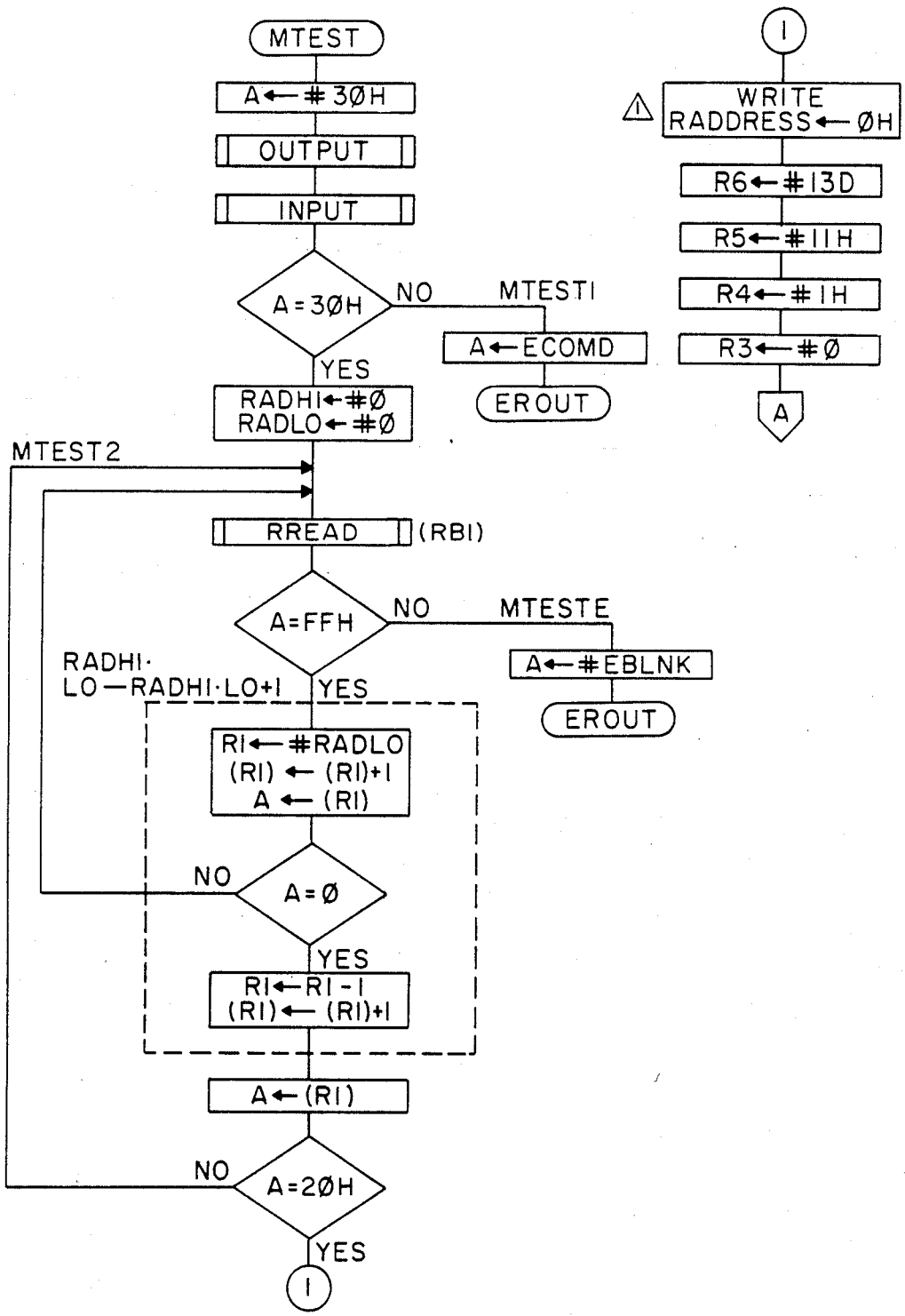
Figure 65B:
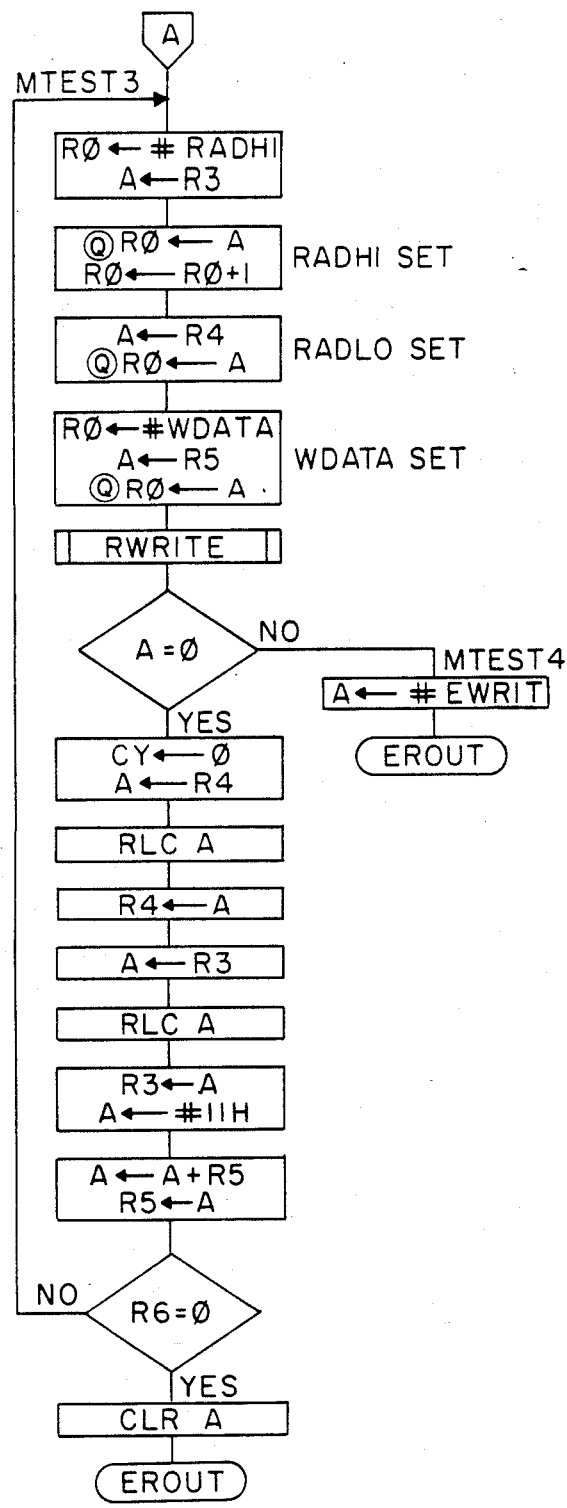
Figure 66A:
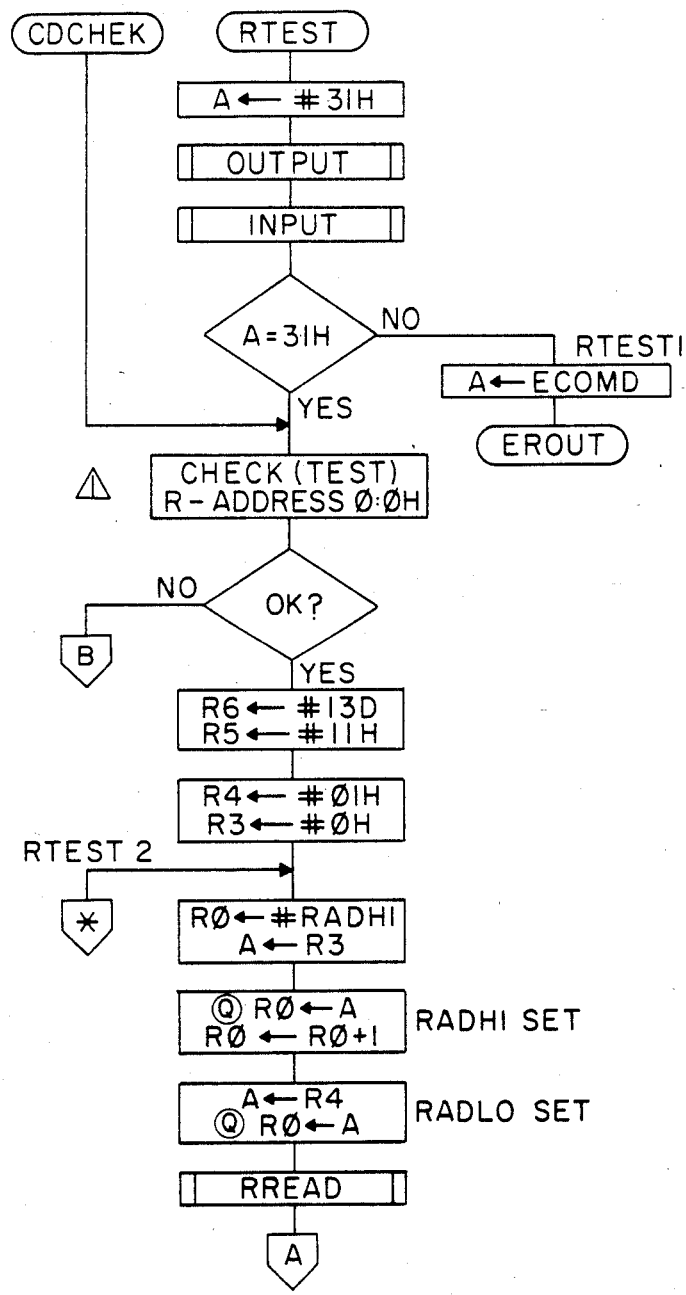
Figures 66B, 67:
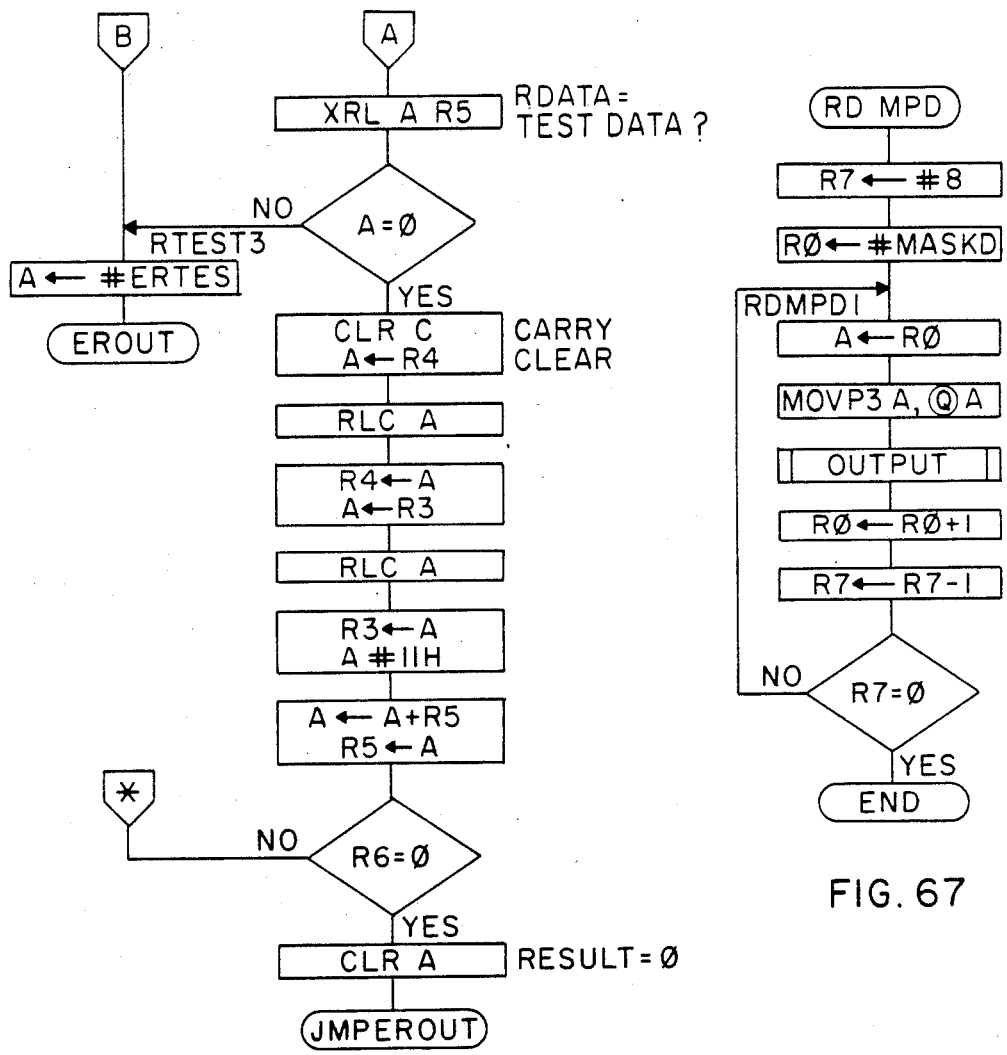
Figure 68:
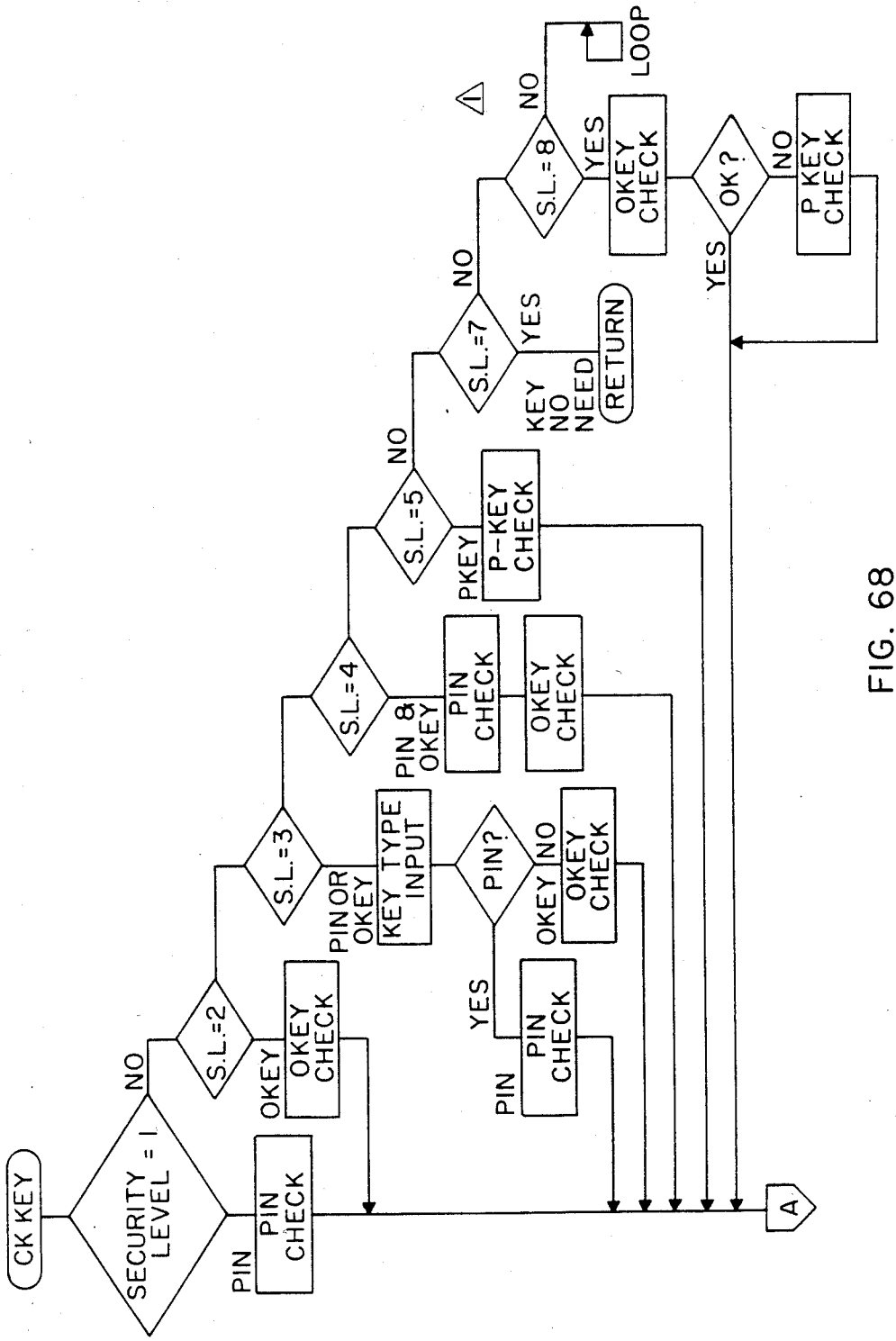
Figure 69A:
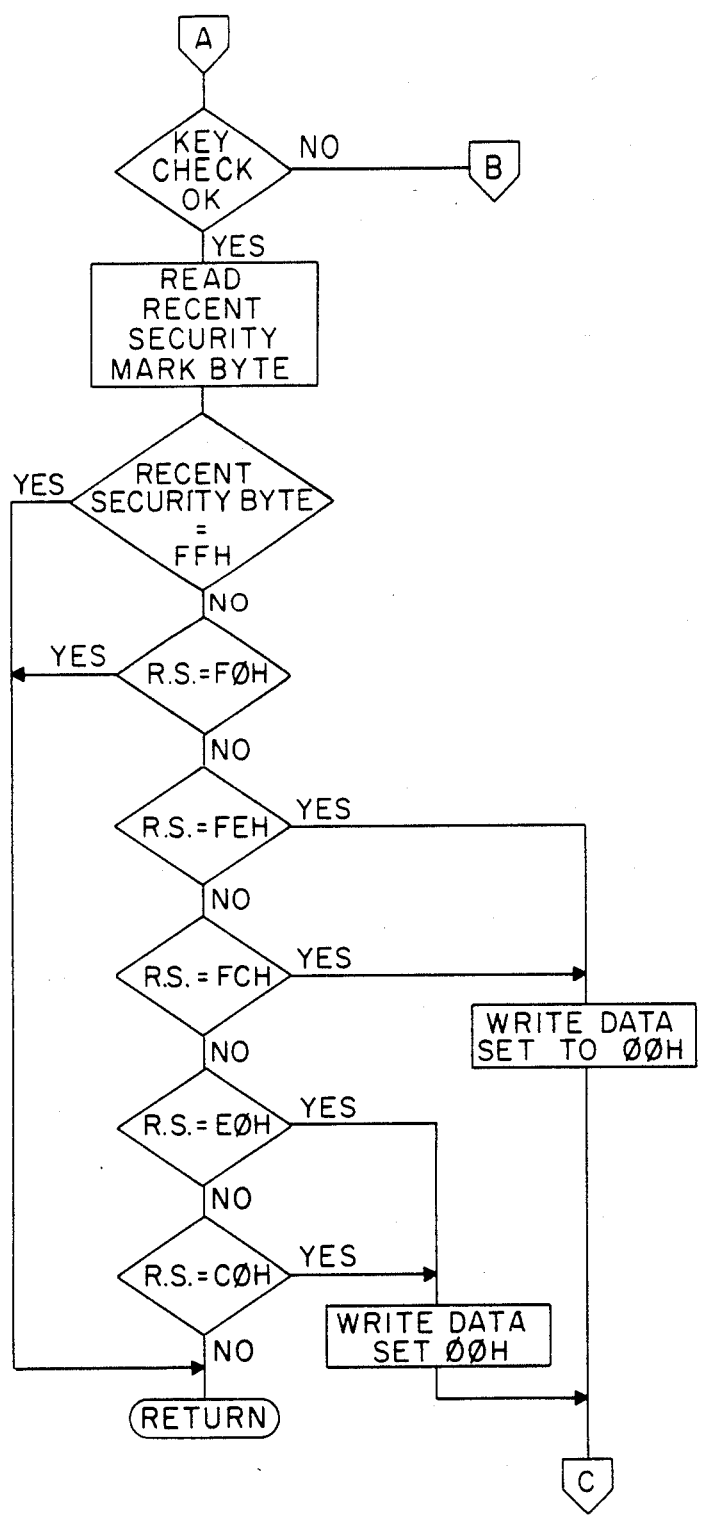
Figure 69B:
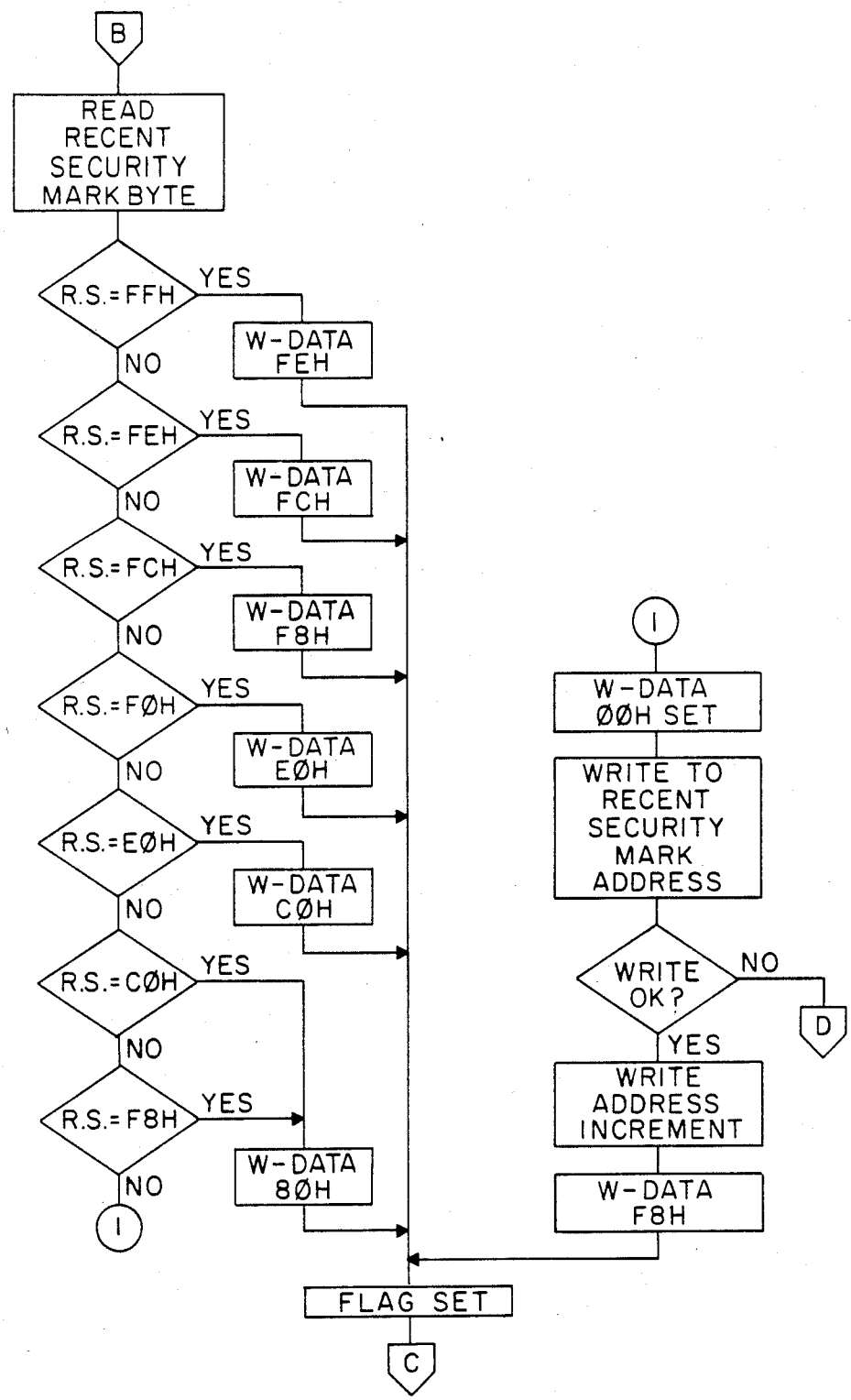
Figure 70:
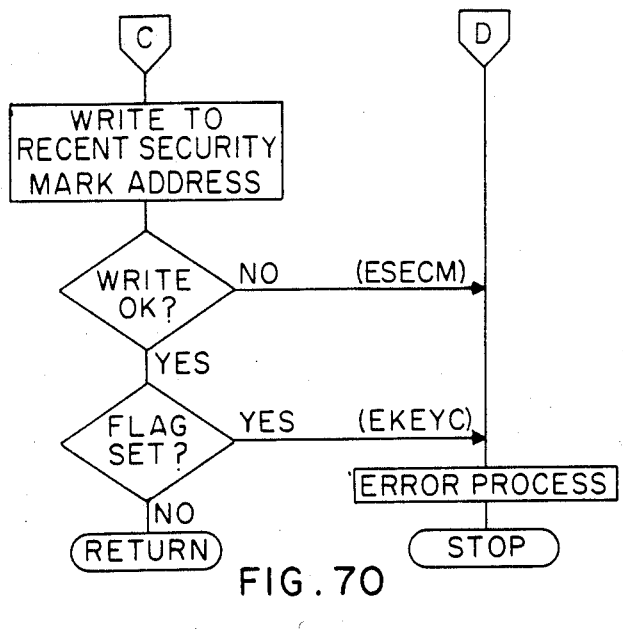
Figure 71:
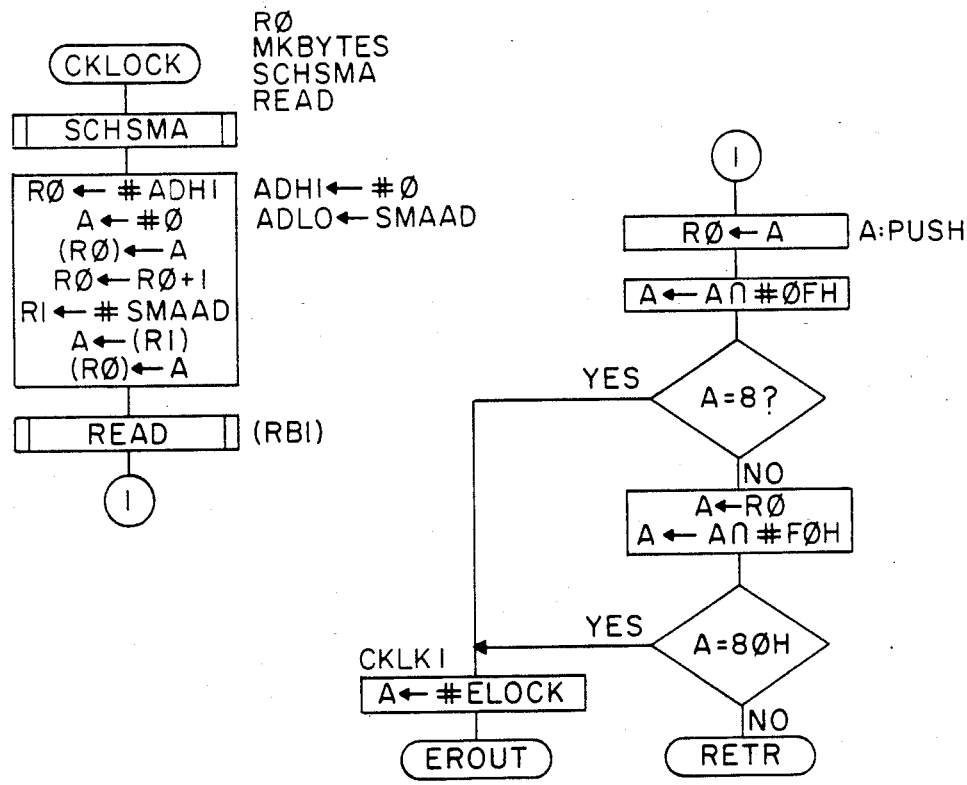
Figure 72:
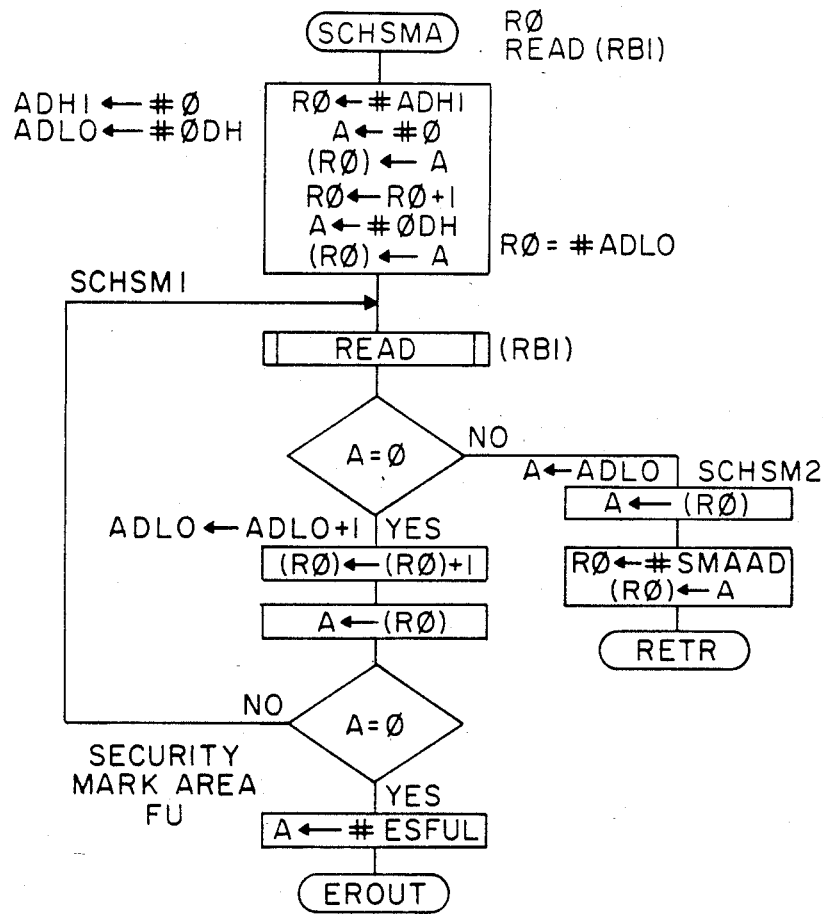
Figure 73:
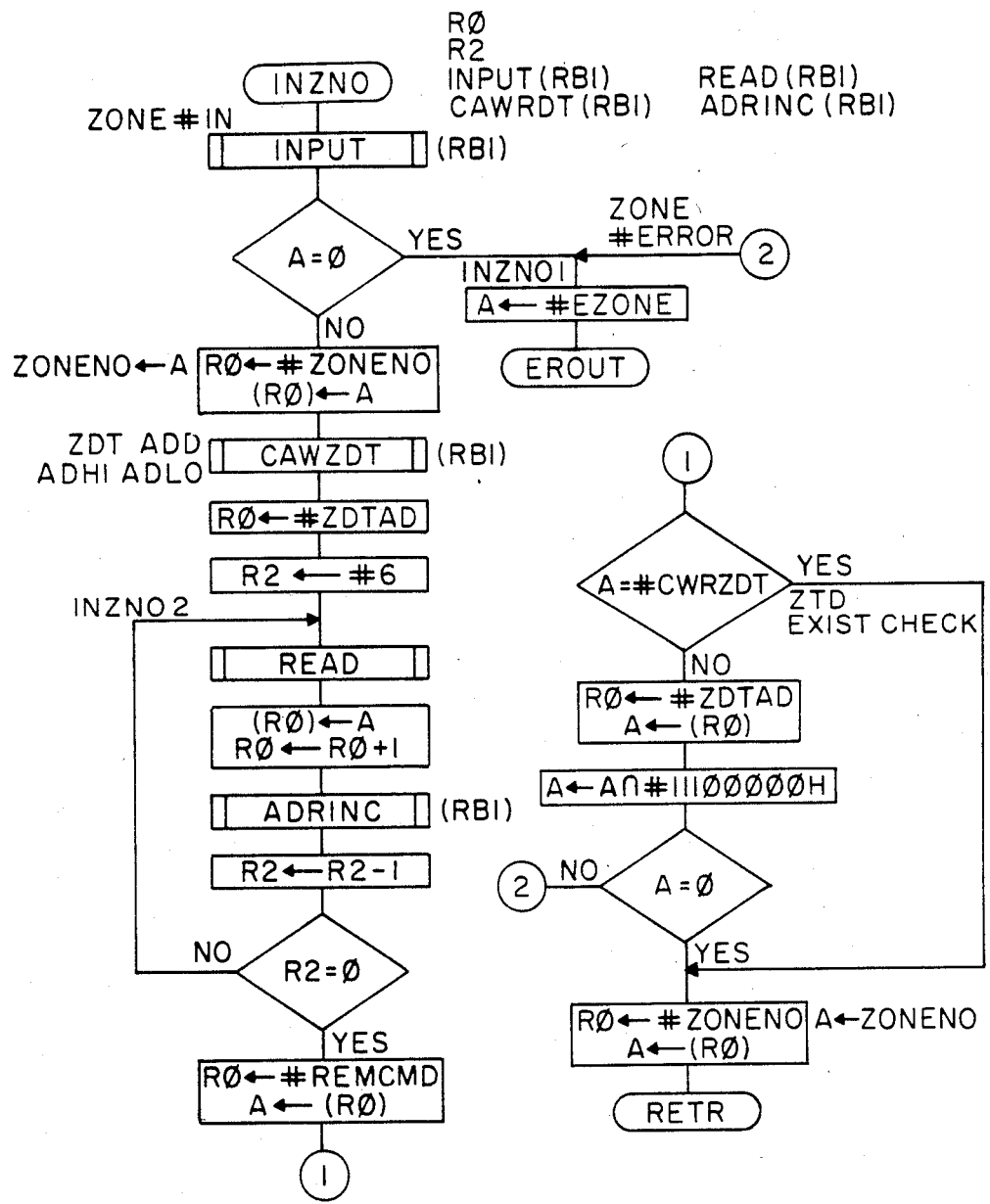
Figure 74:
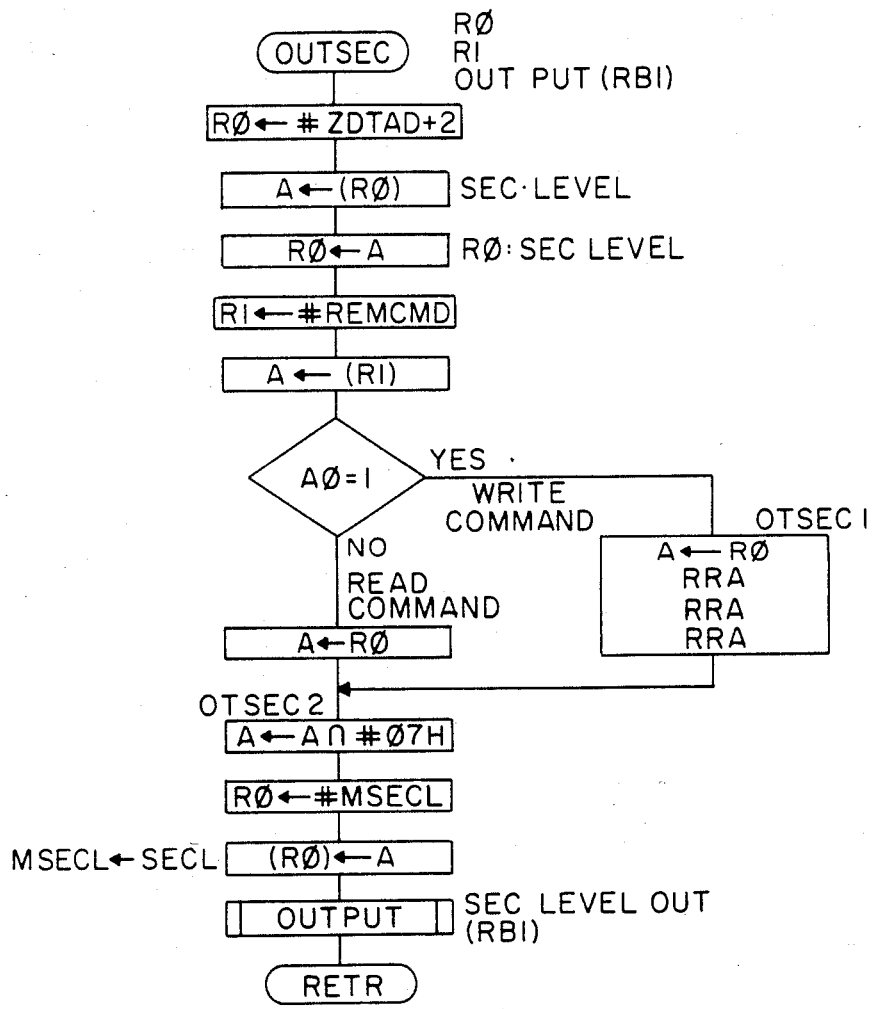
Figure 75A:
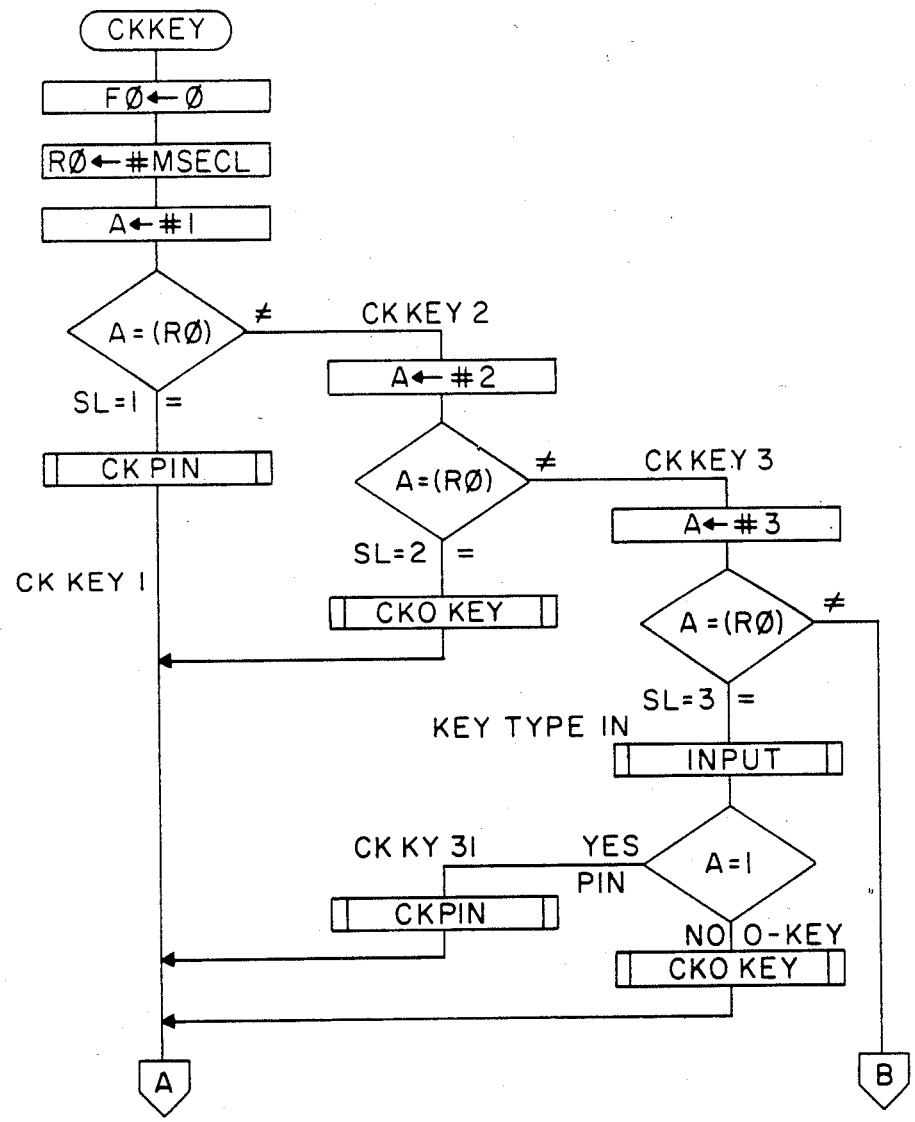
Figure 75B:
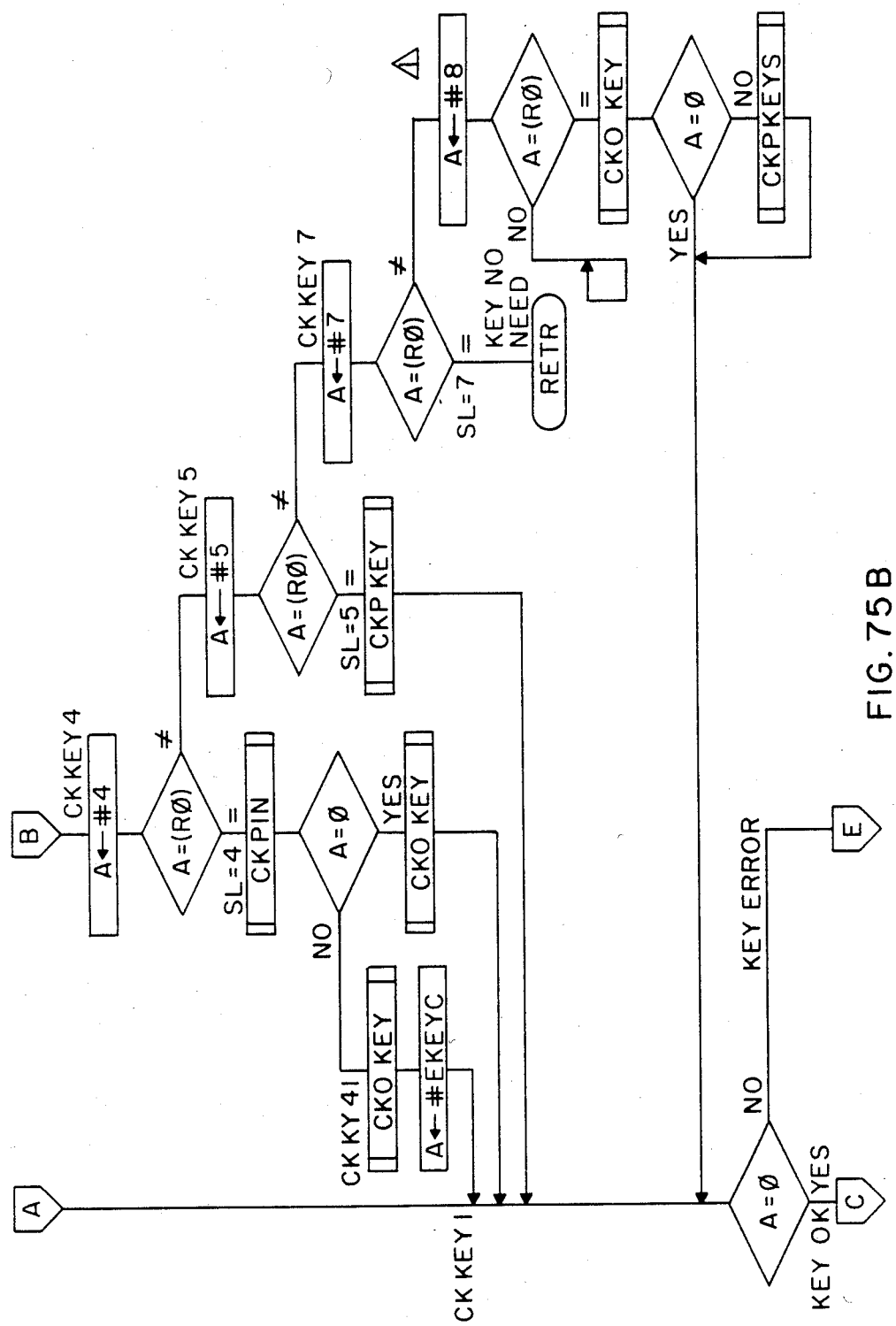
Figure 75C:
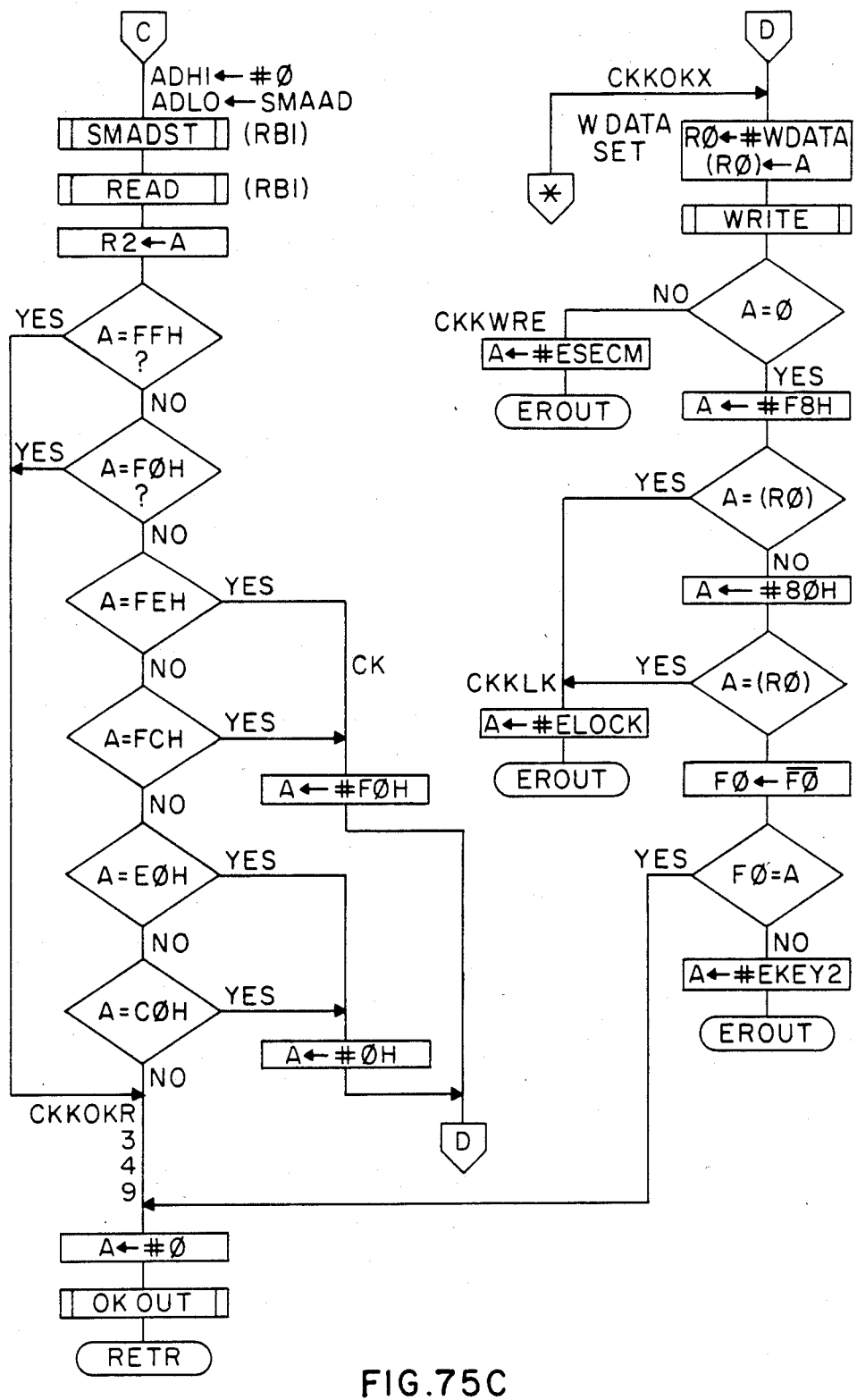
Figure 75D:
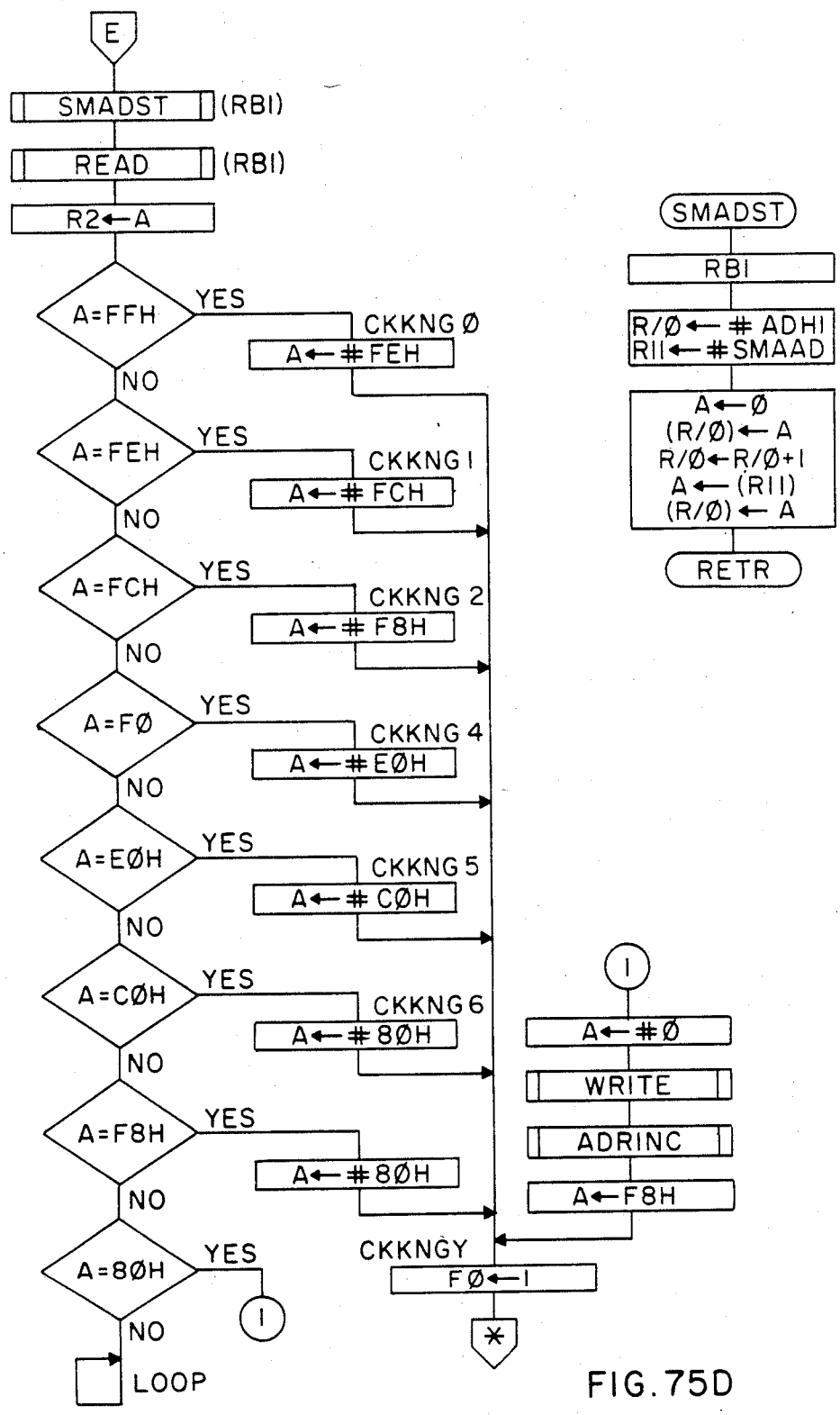
Figure 76:
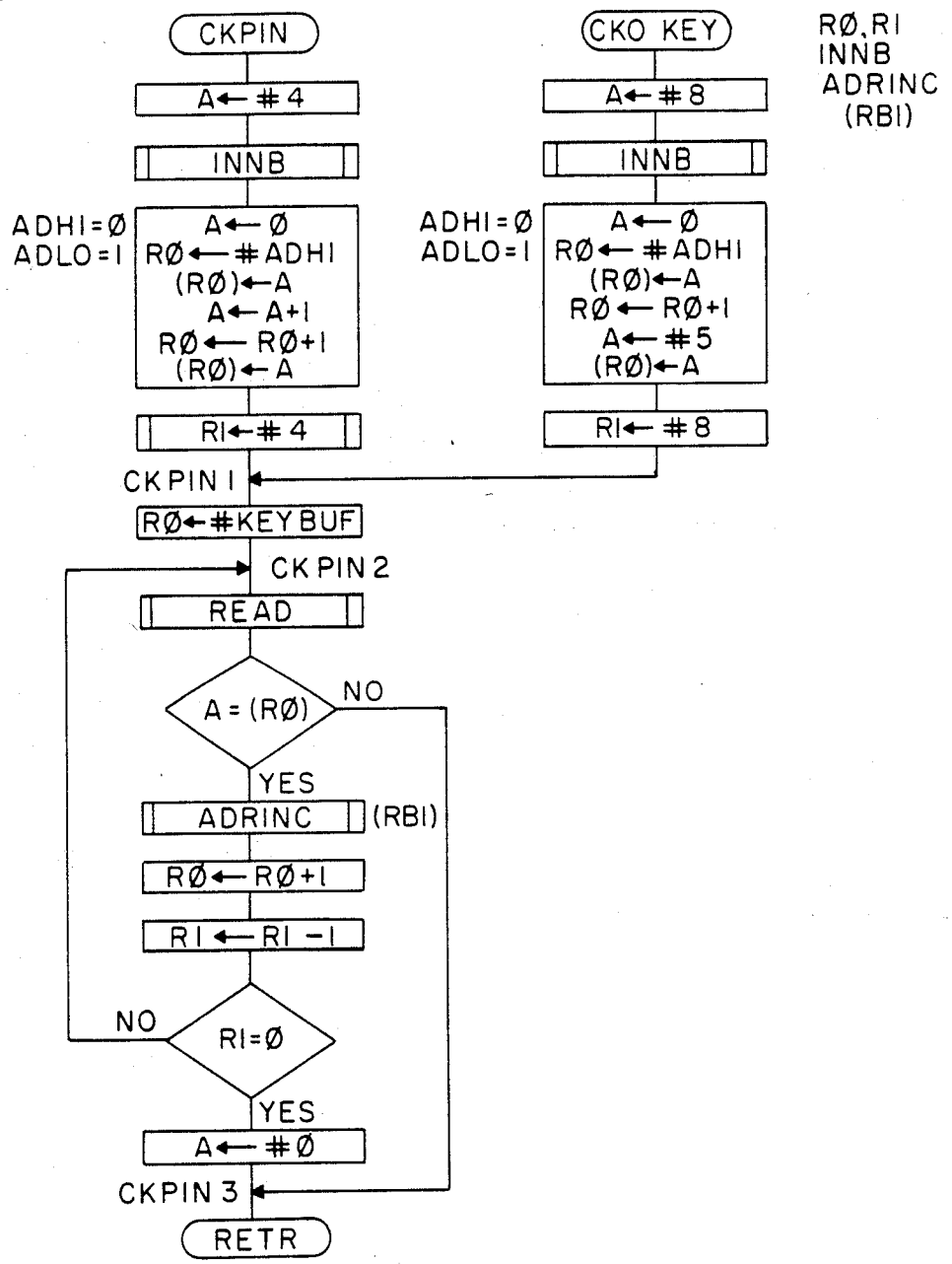
Figure 77:
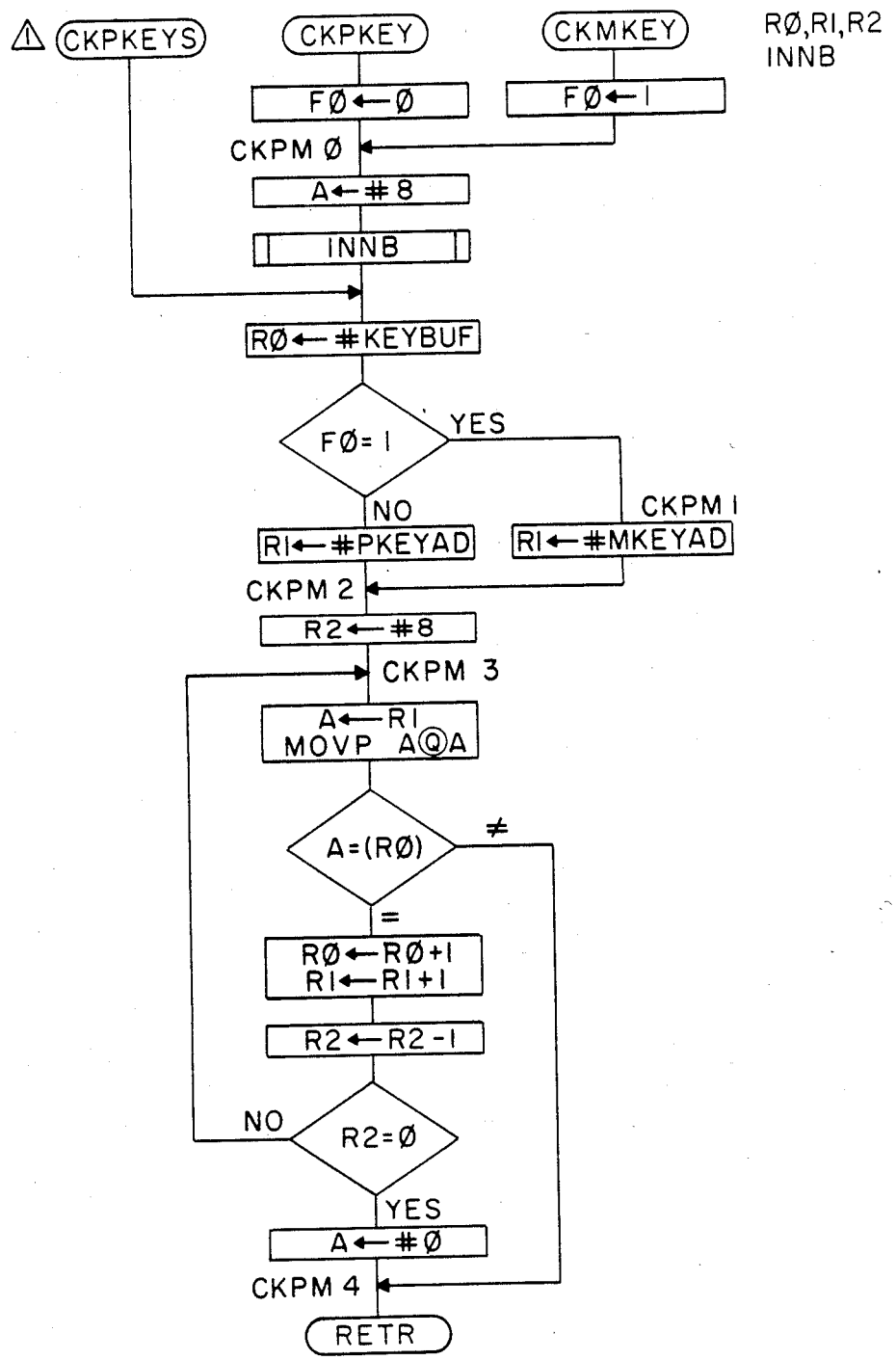
Figure 78:
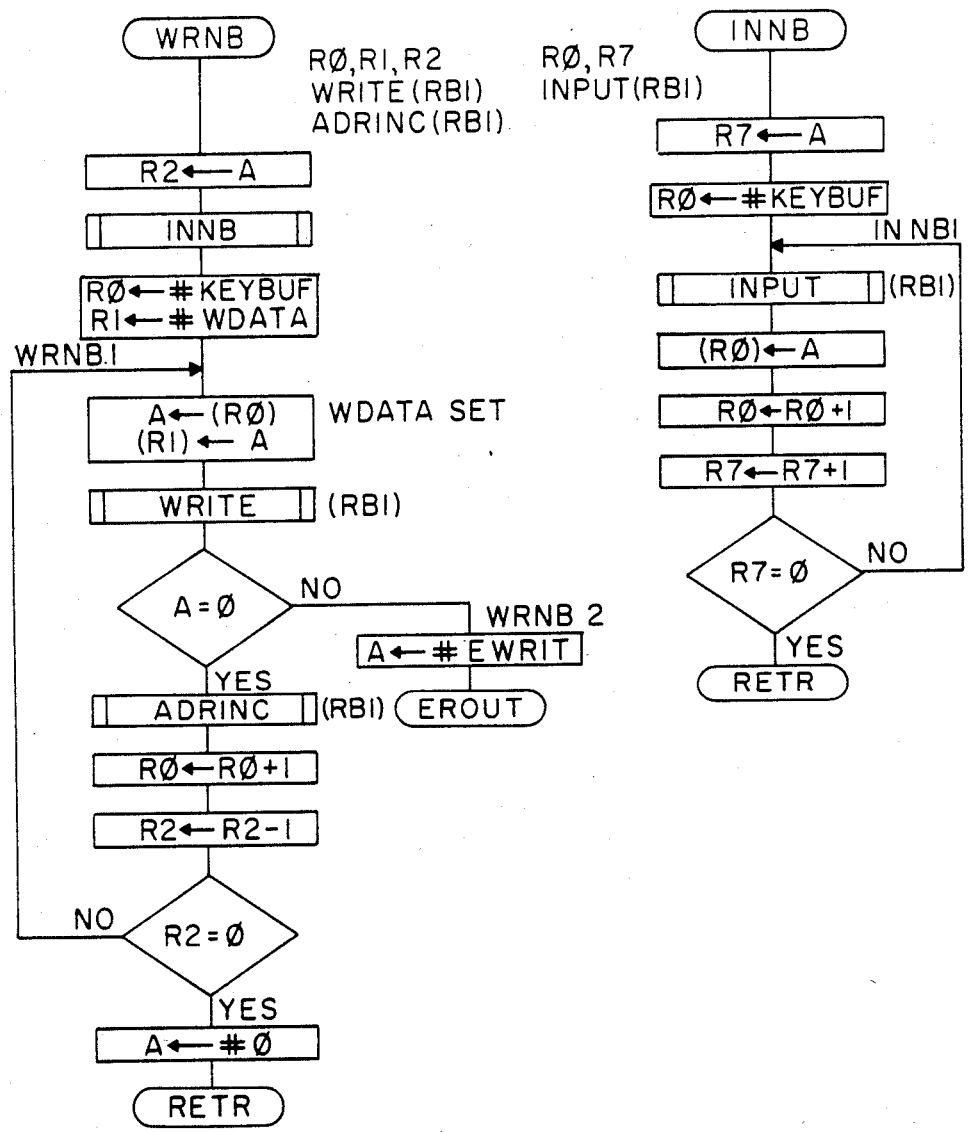
Figure 79:
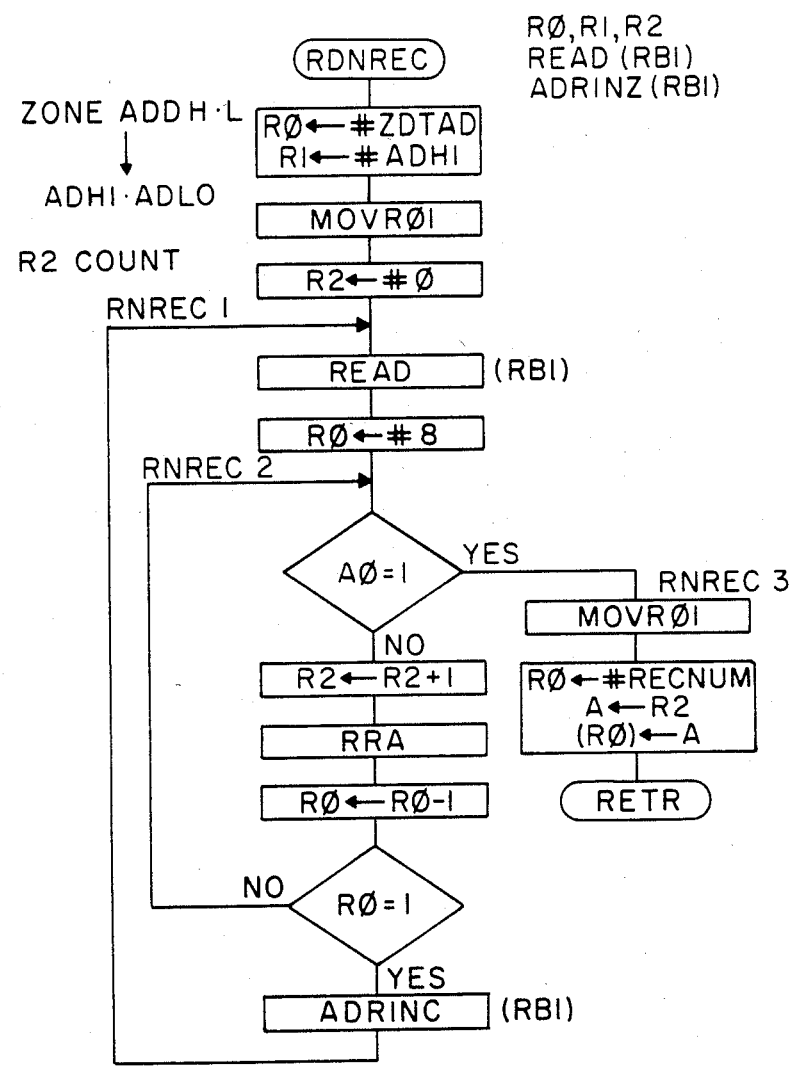
Figure 80:
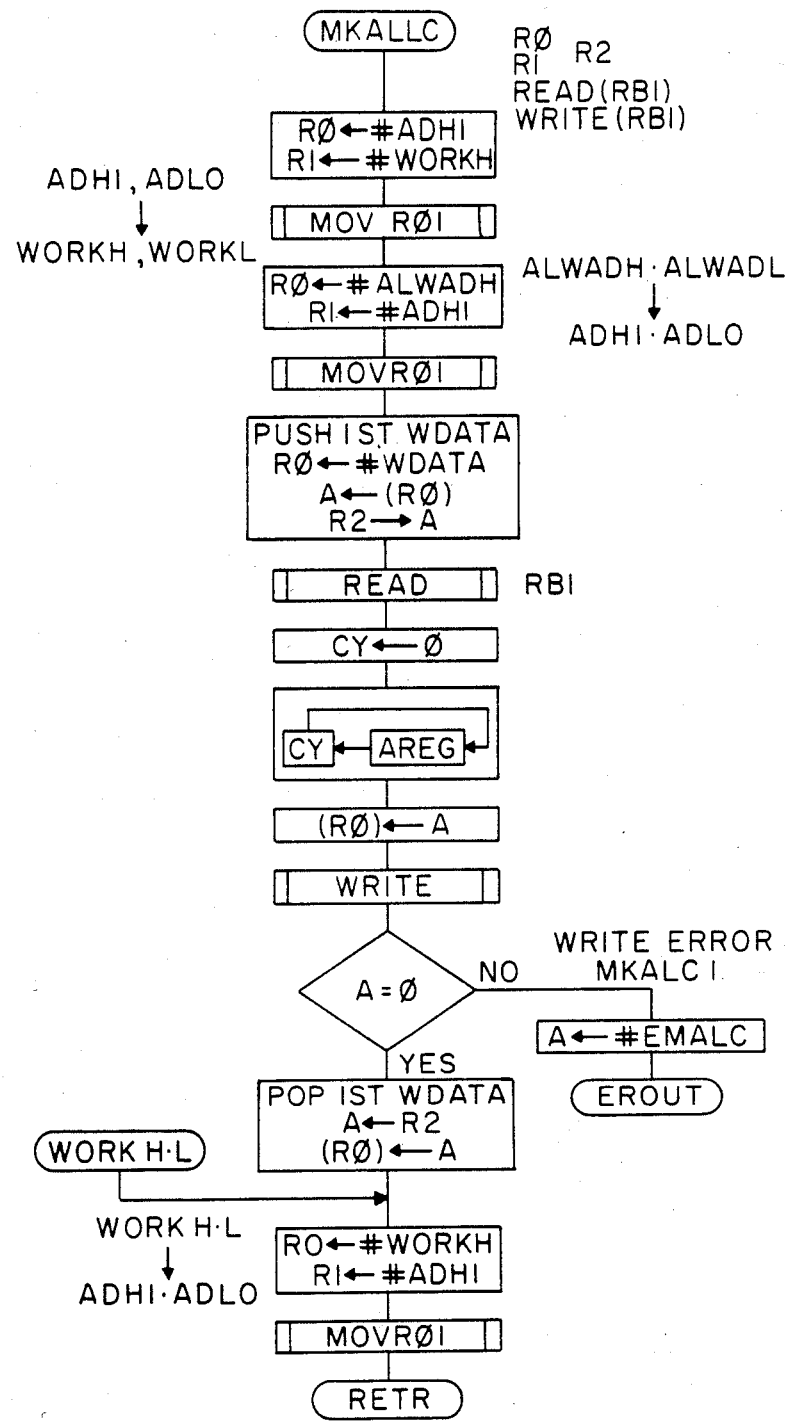
Figure 81:
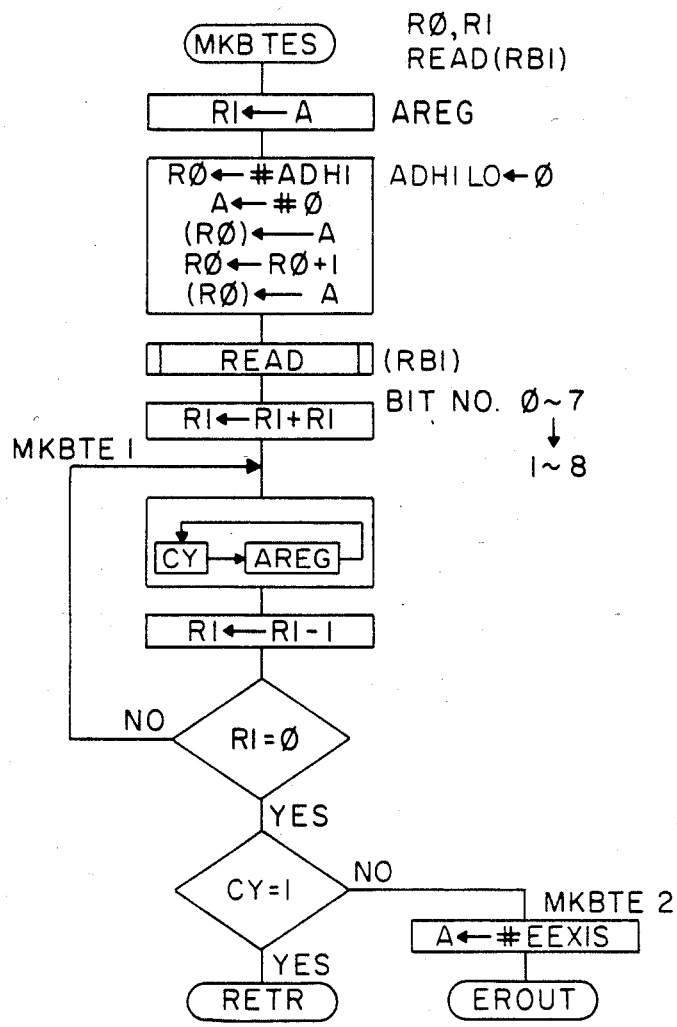
Figure 82:
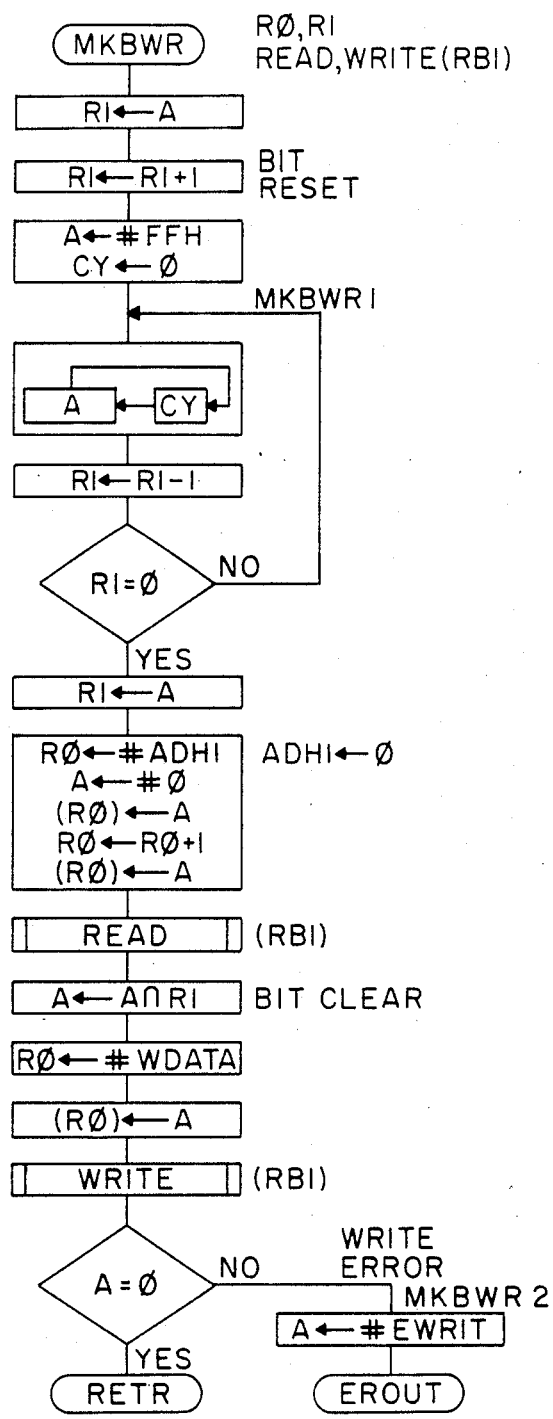
Figure 83:
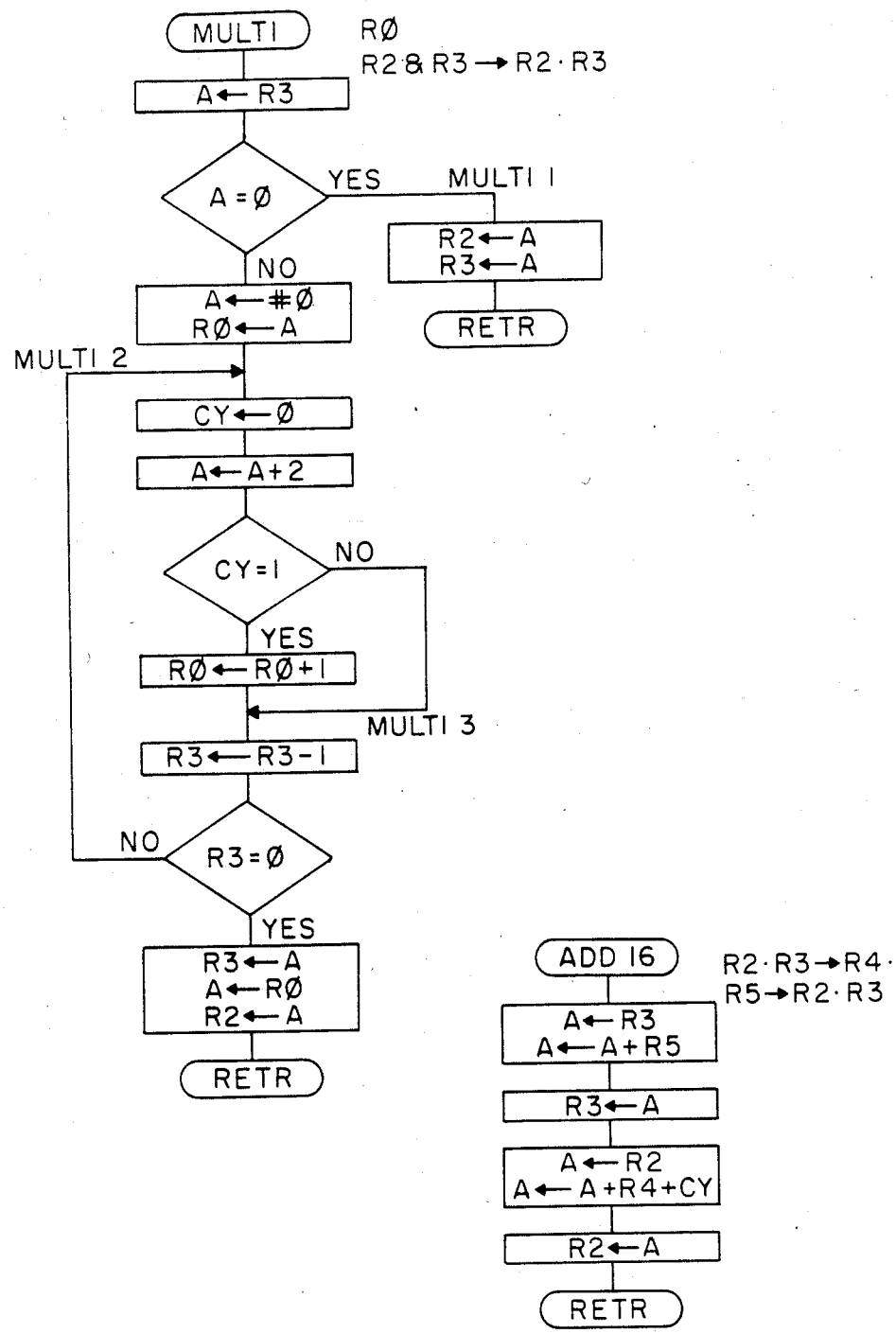
Figure 84:
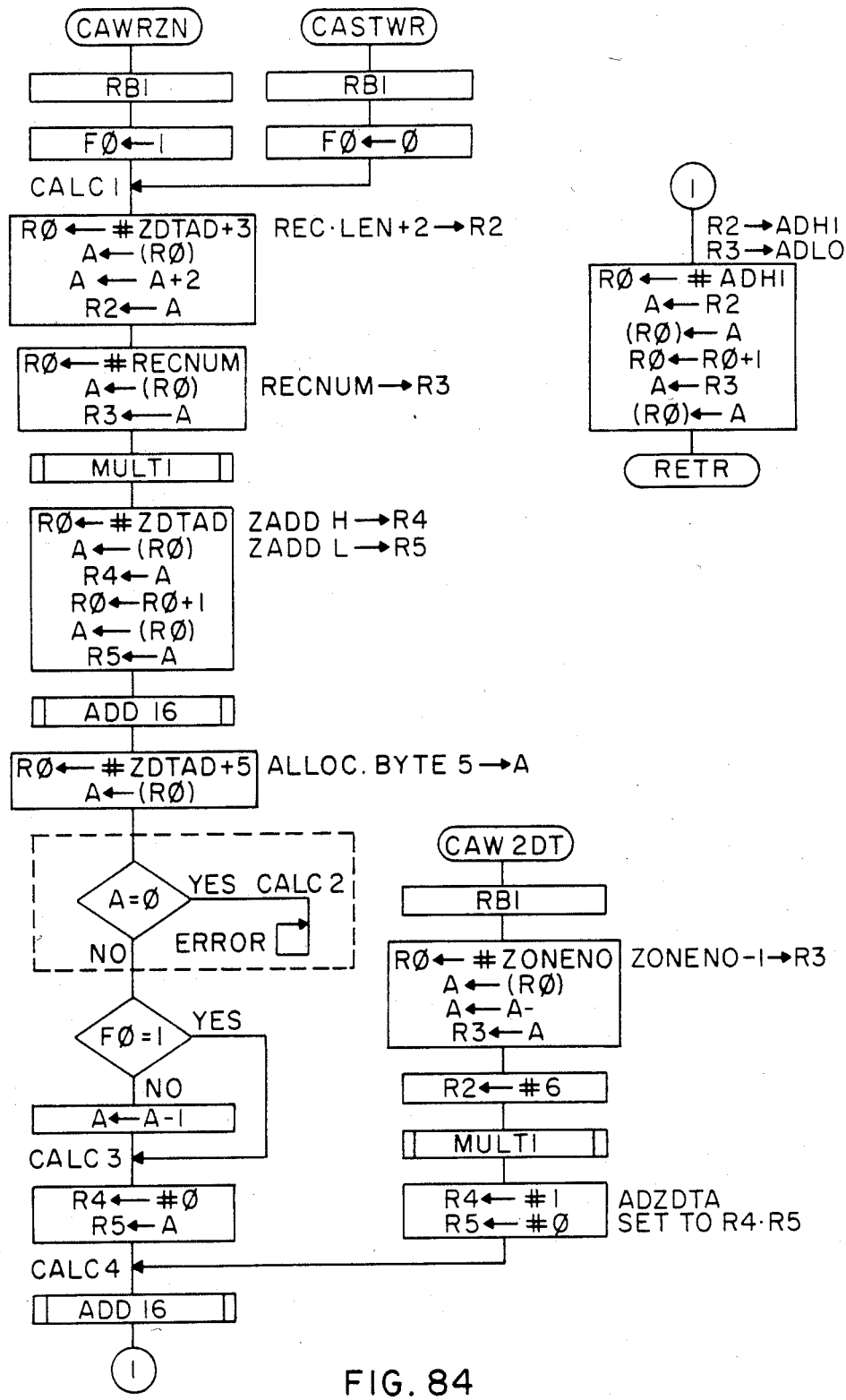
Figure 85:
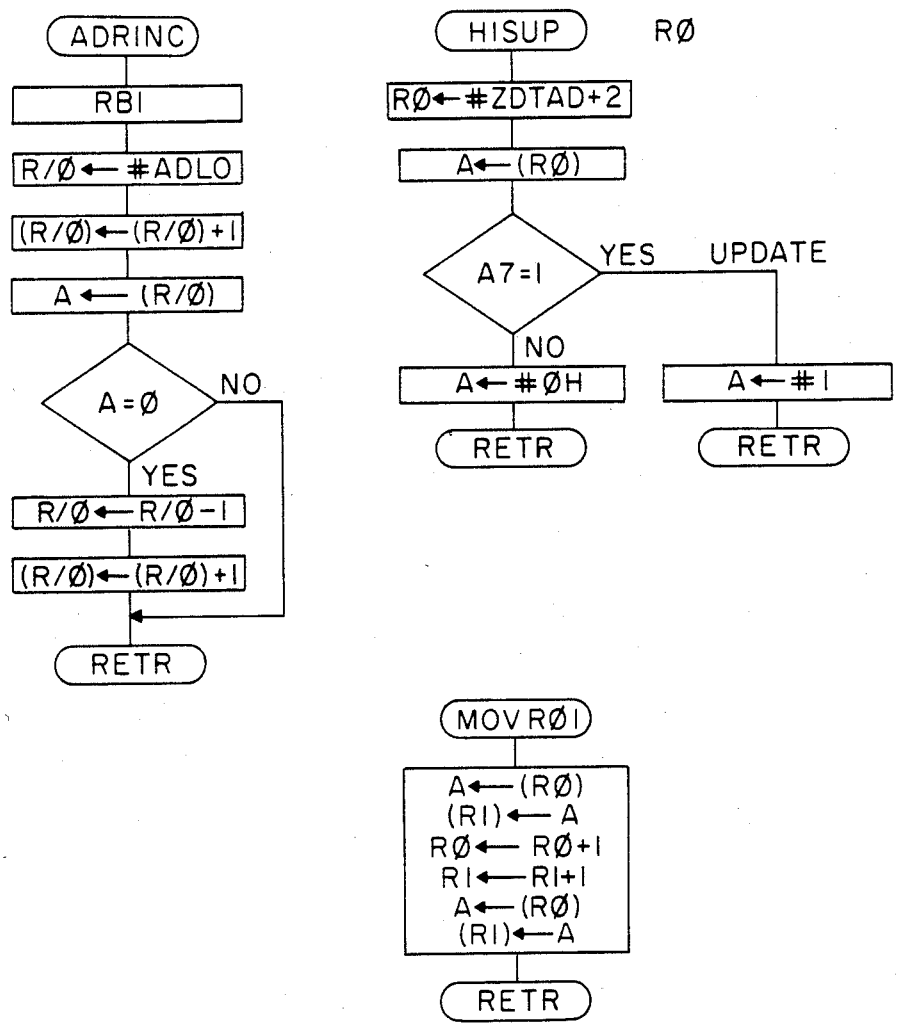
Figure 86:
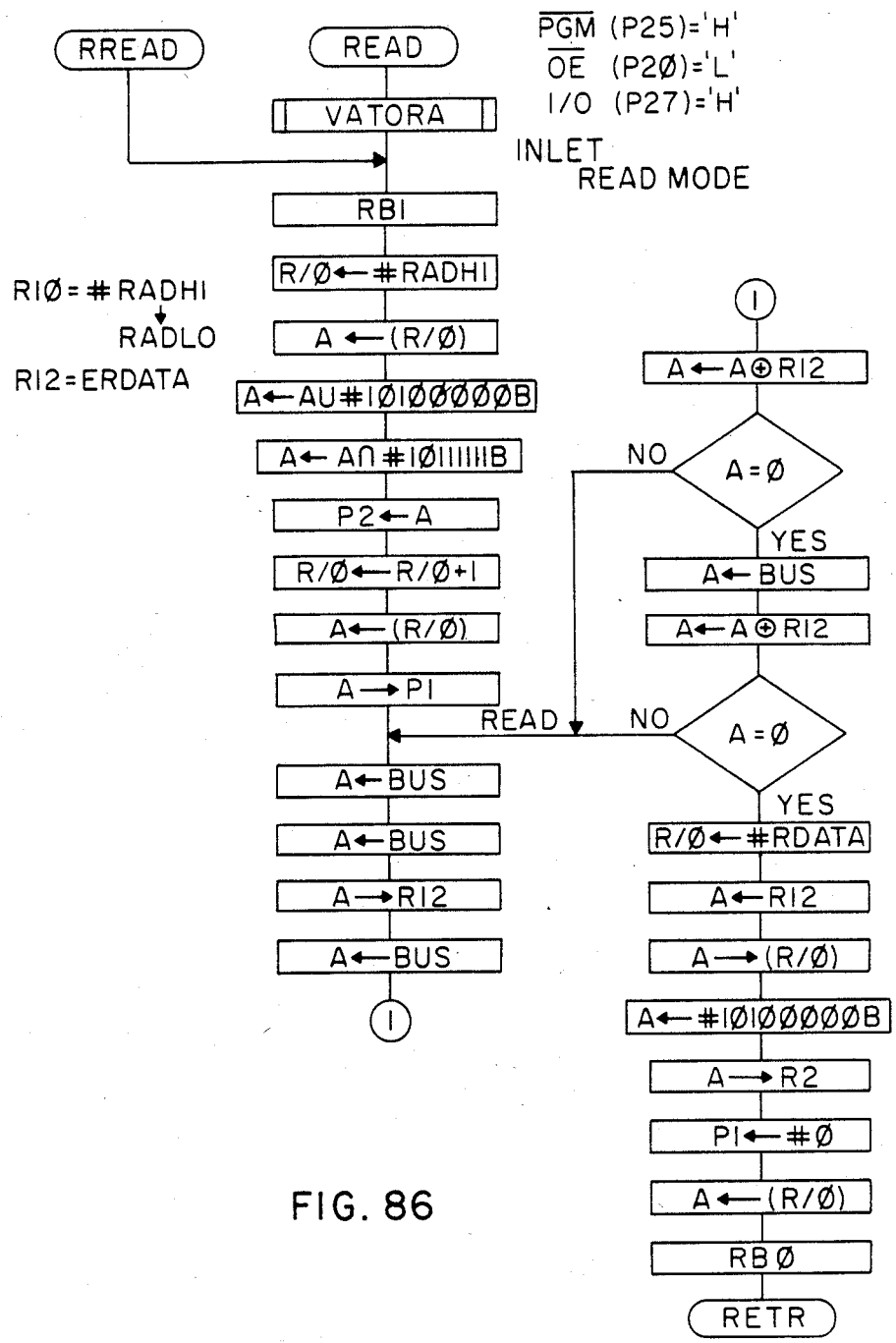
Figure 87A:
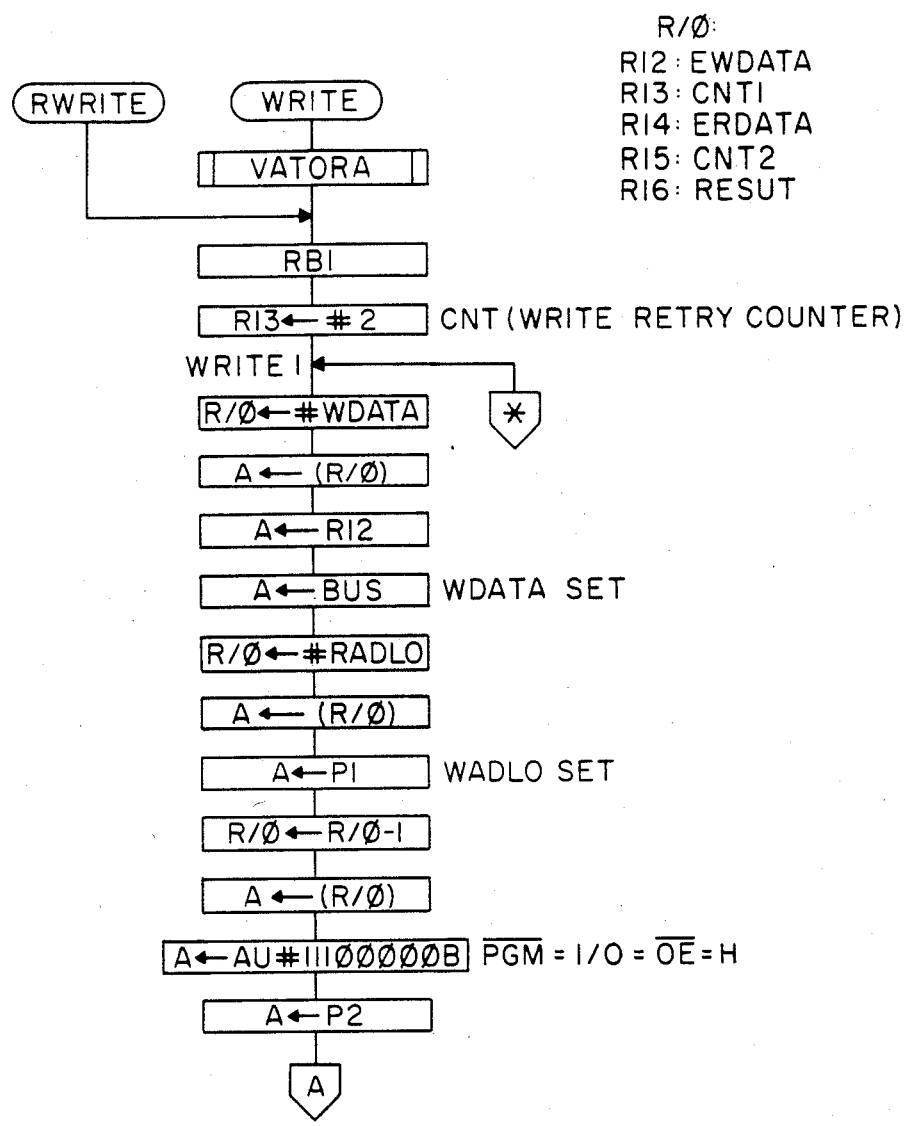
Figure 87B:
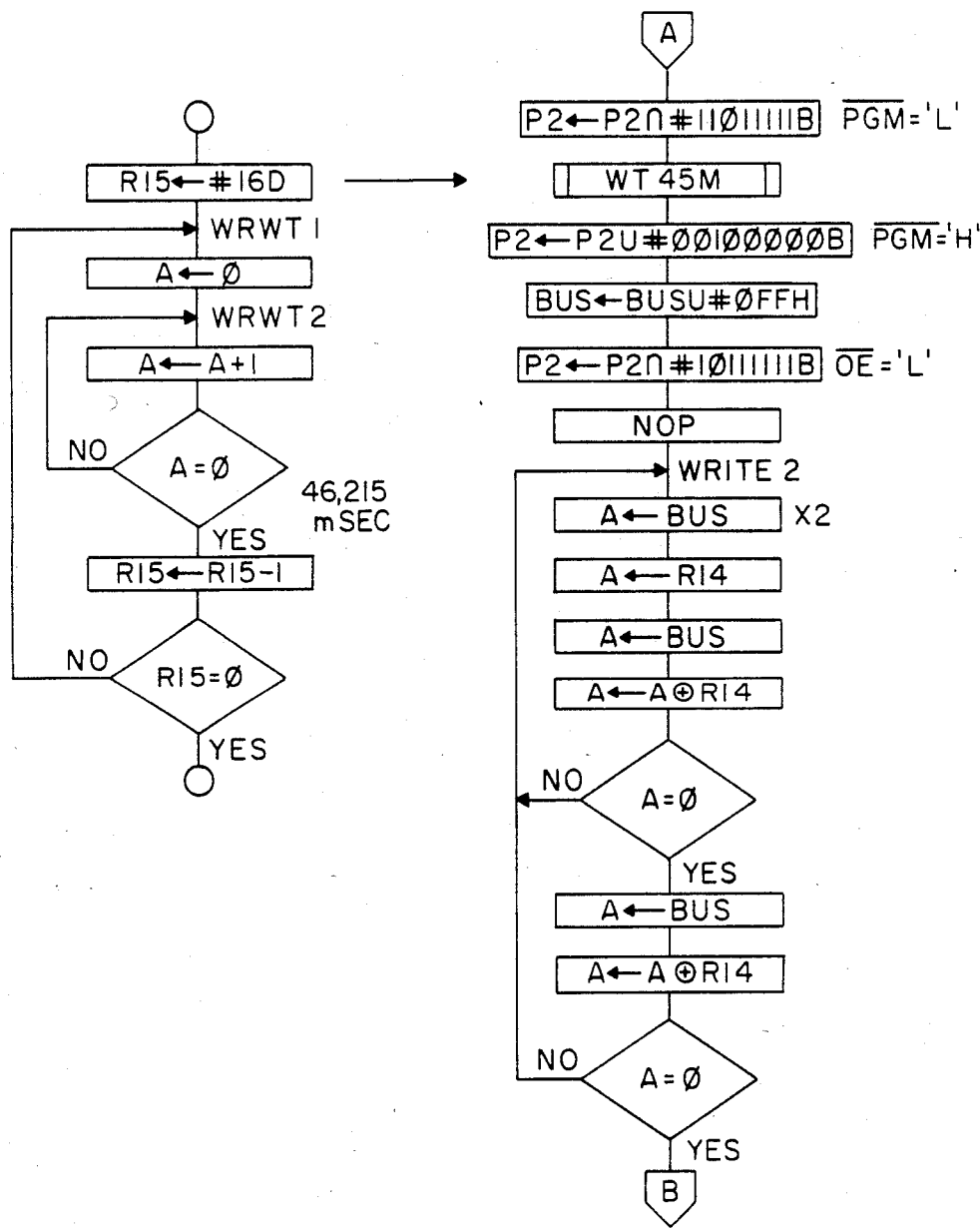
Figure 87C:
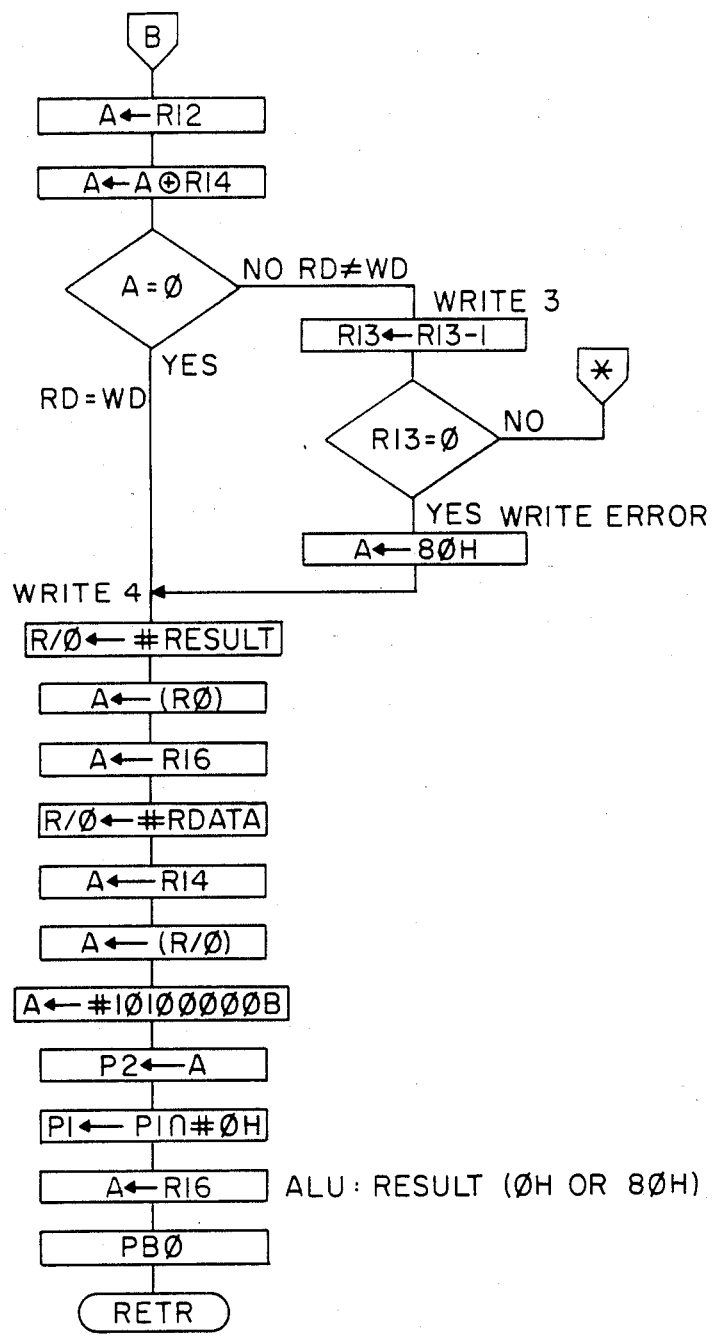
Figure 88A:
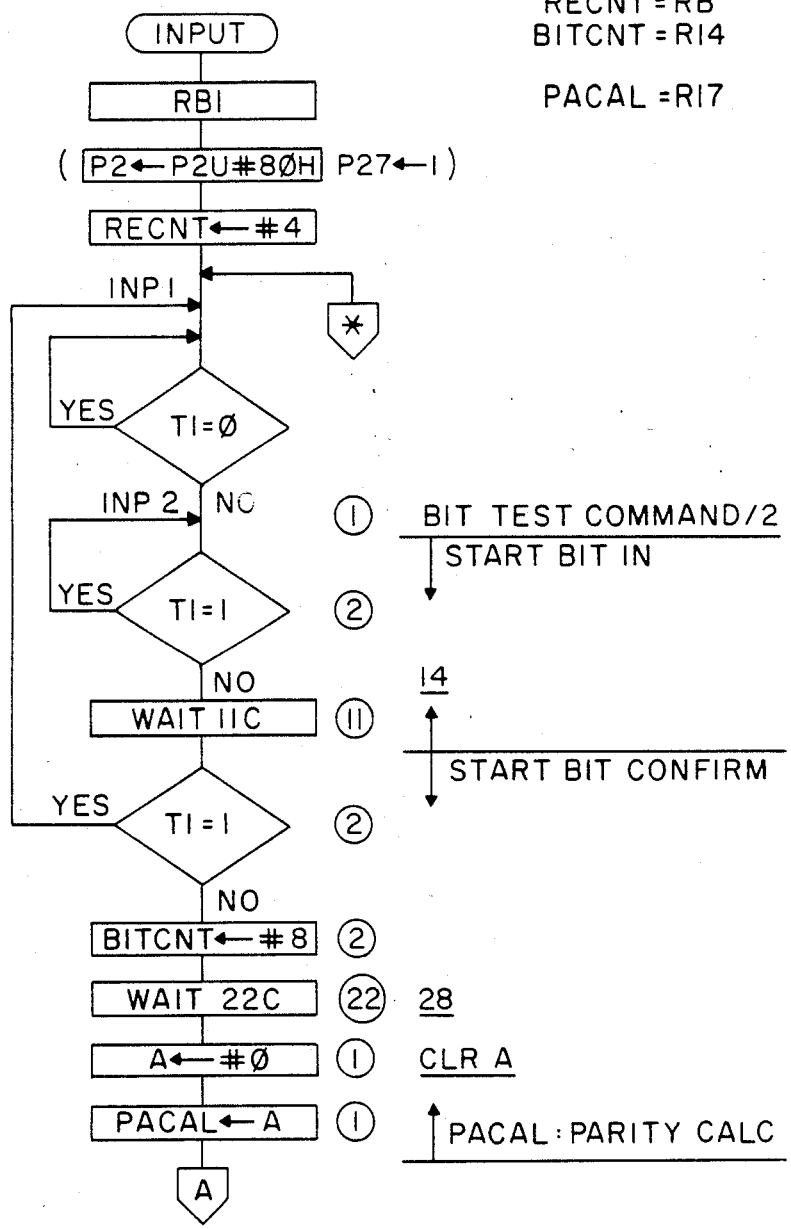
Figure 88B:
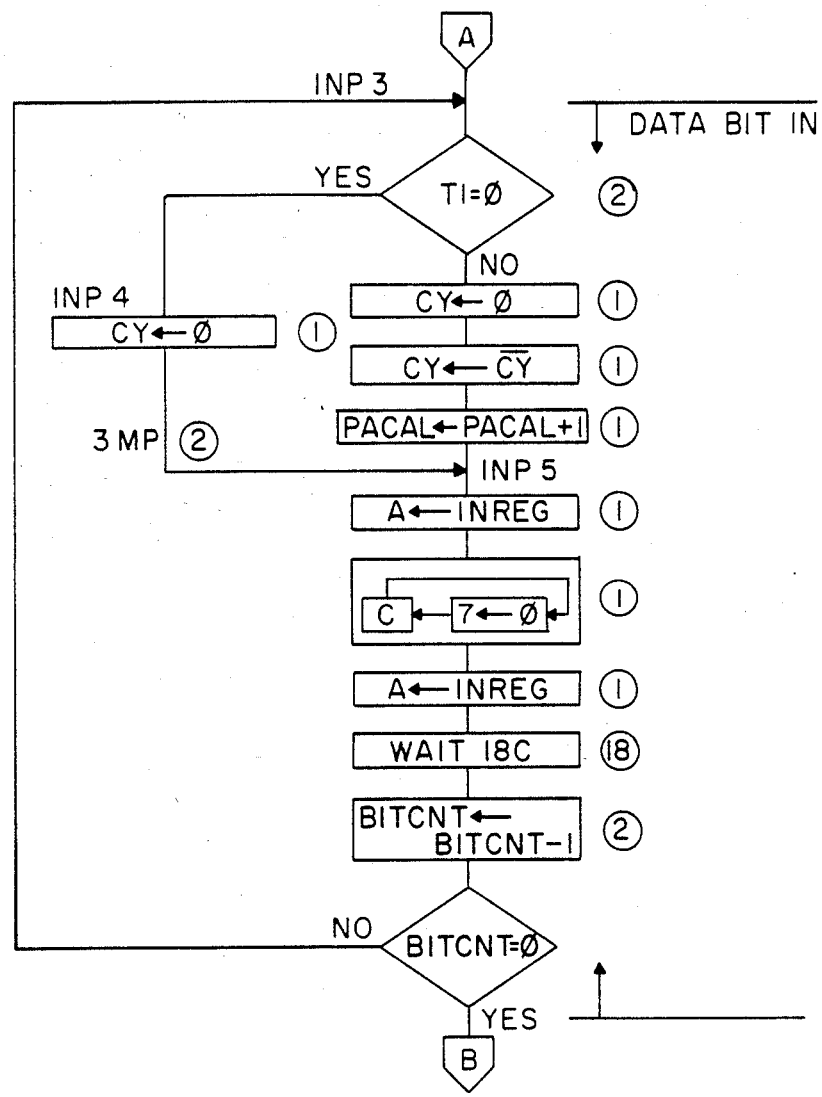
Figure 88C:
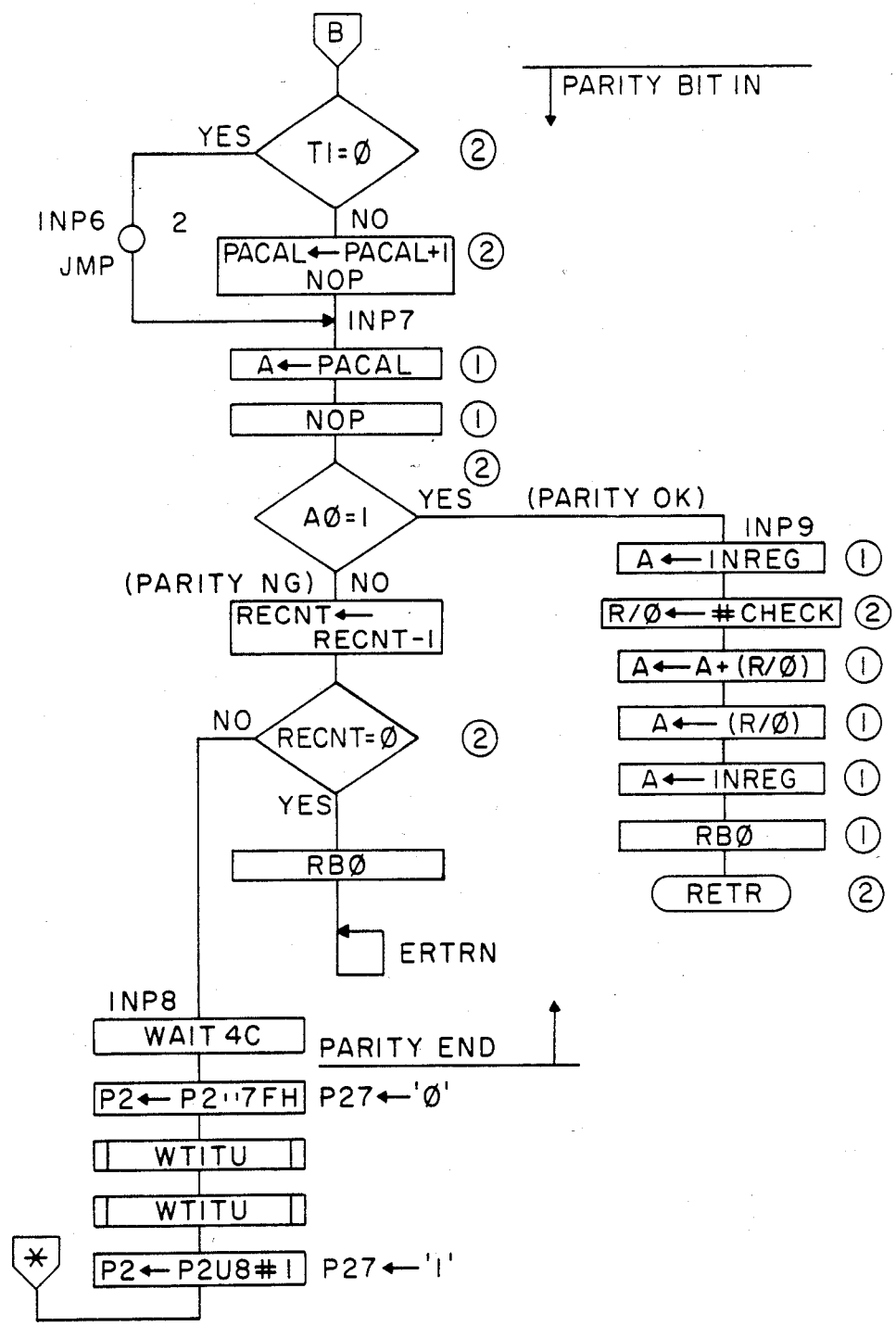
Figure 89A:
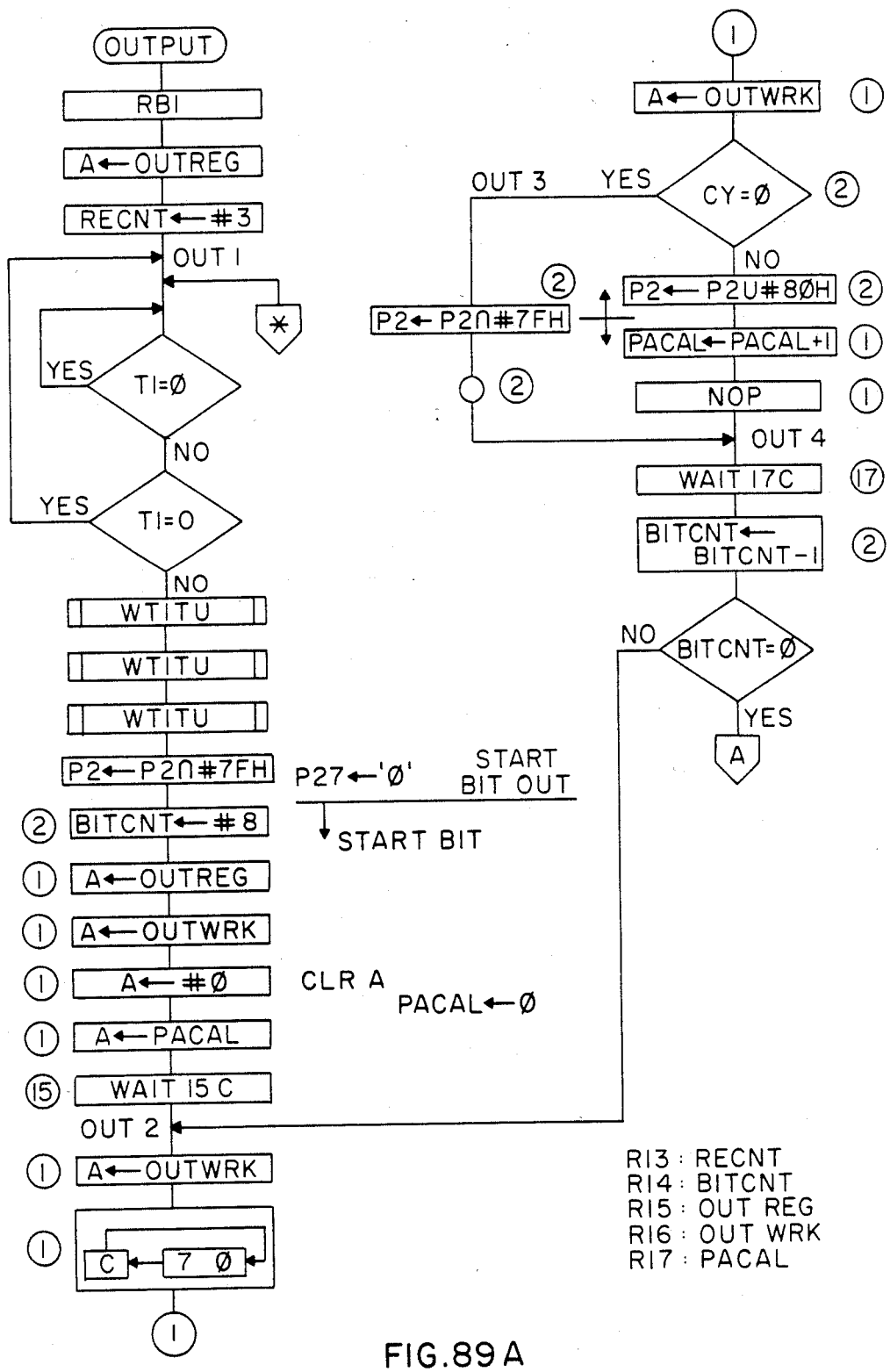
Figure 89B:
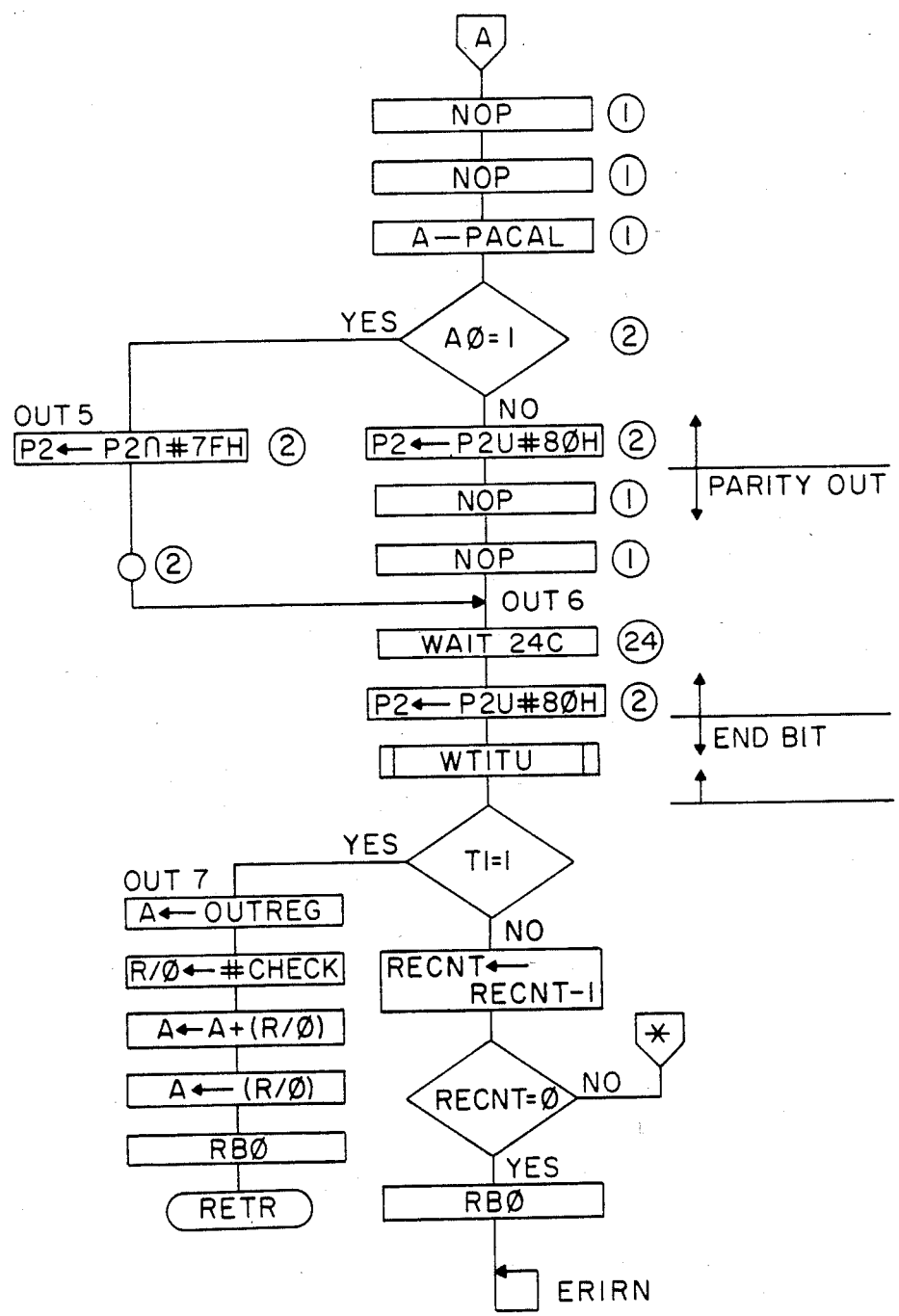
Figure 90:
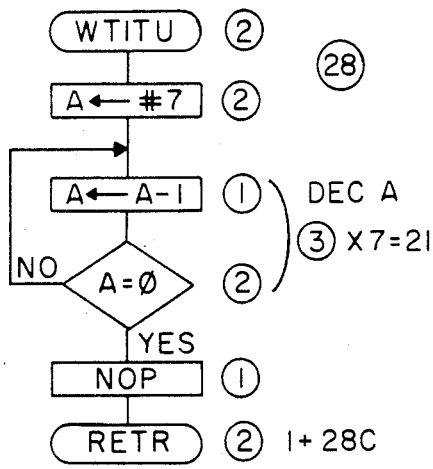
Figure 91A:
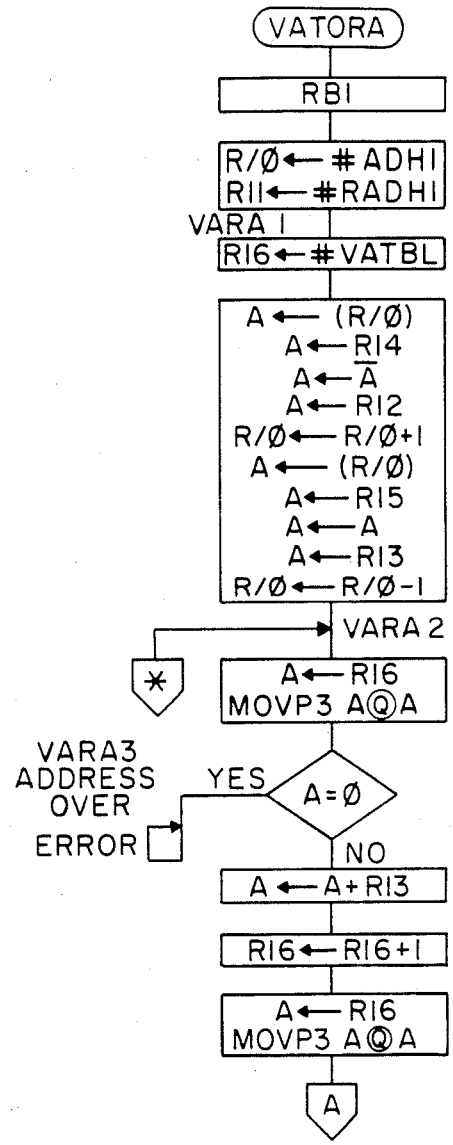
Figure 91B:
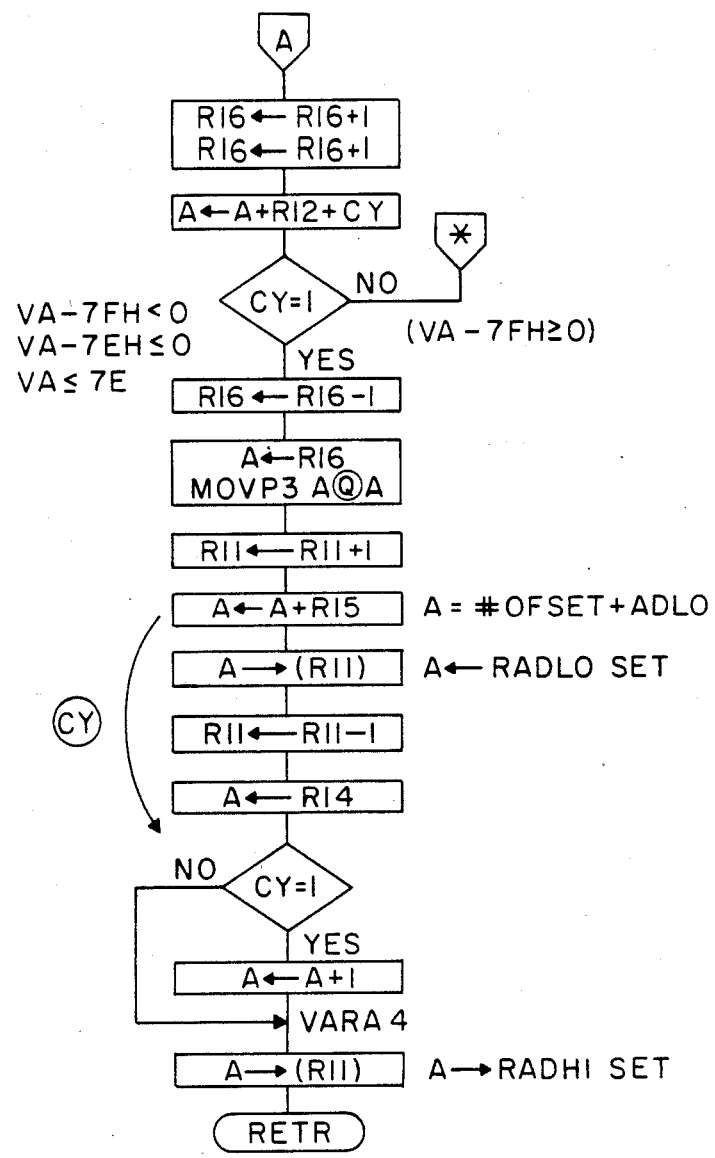
Figure 103B:
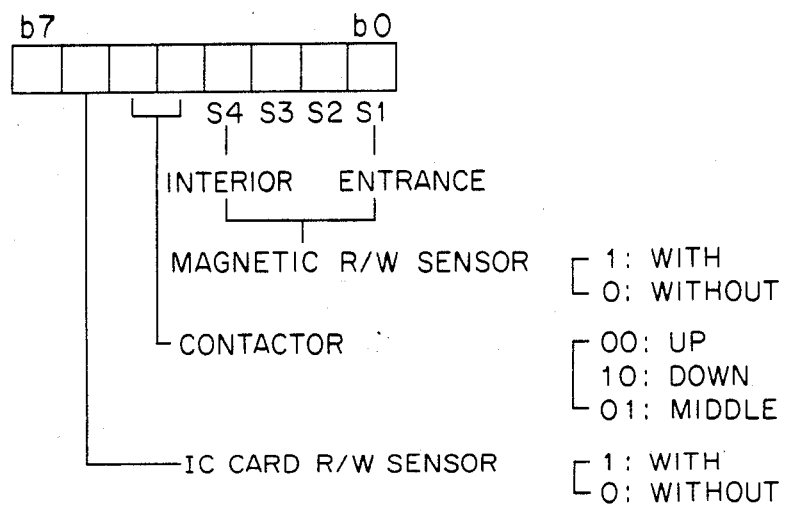
Figure 106B:
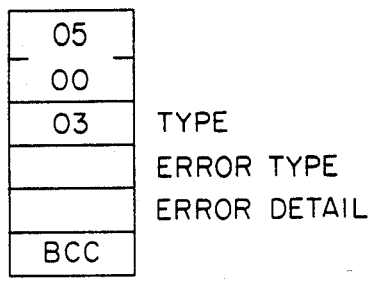

The reader/writer application program illustrated in FIG. 40, operates as follows: After initialization 4001, a unique field (serial number) is read from the control card and stored in the reader/writer for later comparisons, process 4003. Various keys may then be read from protected zones within the control card, e.g., O-key, PIN key and any additional user defined keys, using processes 4004 through 4014, and stored within the reader/writer for later use in accessing the application or user card. It is noted that these keys may also be loaded into the reader/writer memory from the host computer. The commands from the host computer specify what kind(s) of key(s) are required for the specific operation. The reader/writer application program interprets the commands and by using the previously stored keys issues the BIOS commands necessary to accomplish the specified operation. The additional security features of the reader/writer application program come into play at this point. Prior to issuing a command to the user card which requires one or more keys, the reader/writer application program checks the control card serial number, at 4009 to make sure that the control card has not been changed. If it has been changed, the control card serial number and the applicable keys in the reader/writer are set to zero, and an error message is returned to the host computer. Under such conditions, the command to the user card is not carried out. The commands defined by the reader/writer application program are listed in Table E.

As shown in FIG. 14, the user's program area occupies memory locations 1000H to 1FFFH, or from 1000H to 3FFFH if optional ROM2 is used. The memory location in the RAM area at addresses E000H to E0FFH, i.e., 256 bytes, is used as a data buffer and as a stack for the BIOS program, leaving the RAM area from E100H to FFFFH as user memory.

ISSUE SYSTEM COMPONENTS AND OPERATION

The IC cards can be formatted (initialized) and personalized in a number of ways. The terms "formatting" and "initialization" both refer to the writing of the O-key, the zone definition table and, optionally, the PIN key in the IC card memory. The term "personalization" refers to the writing of appropriate data records in the data zones of the IC card memory.

Figures 16, 17:
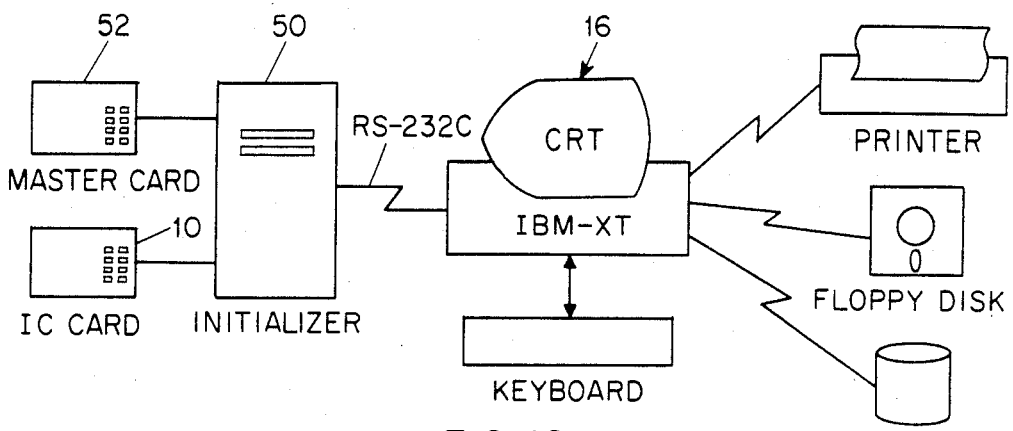
FIG. 16 shows a block diagram of the IC information card initializer system in accordance with the invention.
FIG. 17 shows a memory map depicting the general organization of a master card for the IC information card initializer in accordance with the, invention.

One aspect of the present invention is to format and personalize a large number of IC cards for a particular application on a mass production basis. To accomplish this, an arrangement as shown in FIG. 16 is used which comprises an initializer (I/Z) 50 used in conjunction with a host computer 16. The host computer in the preferred embodiment is an IBM-XT having a CRT, a keyboard, a printer, a 10 MB hard disk, and a one or more double floppy diskette drives. The initializer 50 and the host computer 16 are connected to each other by a RS-232C communications link.

In accordance with the personalization process, the respective data files to be loaded into the IC cards are stored on the hard disk or floppy diskette or some other mass storage medium and are accessed by way of a personal code for each personal data file stored in the mass storage medium. Each IC card to be personalized is provided with a magnetic stripe in accordance with the conventional format and is magnetically encoded with a personal code for addressing a corresponding personal data file in the mass storage medium. The magnetic encoding of the magnetic stripe is carried out using conventional techniques preferably on the second track of the stripe in accordance with the ABA standard or JIS type I, or the first track in accordance with JIS type II.

The initializer 50 has an input slot or an input hopper for accepting cards and a card handler for moving each card automatically through a magnetic stripe reader to electrical contacts in the initializer which make electrical contact to respective IC card contacts C1-C8. Each card is first initialized by writing the O-key, the zone definition table and, optionally, the PIN key in the card memory. Such initialization information and the P-key, which is required before the initialization information can be written into the card memory, have been previously entered into the initializer and are stored in the initializer memory. The initialization information and the P-key are advantageously entered into the initializer by means of a master card, as will be described in further detail herein below.

Following initialization, if the card in the initializer is to be personalized, the personal code on the magnetic stripe is read and transferred to the host computer. In response to receiving the personal code of the card, the computer addresses the corresponding personal data file in the mass storage medium and personalizes the card by writing the data in the file in previously defined zones of the IC card memory. The initialized and personalized cards are then ejected.

In order to operate such a system, master cards 52, one or more IC cards 10, and several data files must be prepared. There are four types of master cards 52, one for each operation of the initializer. All master cards are previously written with information necessary for the respective operation according to a predetermined format. The information written on the master cards includes a different identification code for each operation and a batch number which is necessary for issue control. FIG. 17 is a memory map of a master card 52.

The different operations of the IC card initializer include formatting, (initialization), personalization, unlocking, and formatting (initialization) with personalization.

The files necessary for formatting and personalization include a Z.D.T. (zone definition table) data file and an index file. The Z.D.T. file is used for formatting or for formatting with personalization. If the Z.D.T. data is written in the master card, the Z.D.T. file need not be stored in the memory associated with the host computer.

The index file is used for personalization or for formatting with personalization. The file contains the record length, the field configuration, and field number of the personal data file, the field number being used for the search. Also used for personalization or for formatting with personalization is a zone and field correspondence file in which the correspondence between the zone numbers in the card memory and the fields of the personal data file are defined. Lastly, a personal data file is used for personalization or for formatting and personalization. This file is prepared by the user of the system and consists of fixed length records not including a header and contains a field for record search.

The host computer has a main program to carry out initialization (formatting), personalization, unlocking or both initialization (formatting) and personalization of an IC card. The Z.D.T. data file, the personal data files, the index file and the zone and field correspondence file must all be created before an IC card is initialized and personalized by the main program. The main program also needs a master card on which the required data is written in a certain format.

MAIN PROGRAM

Figure 18:
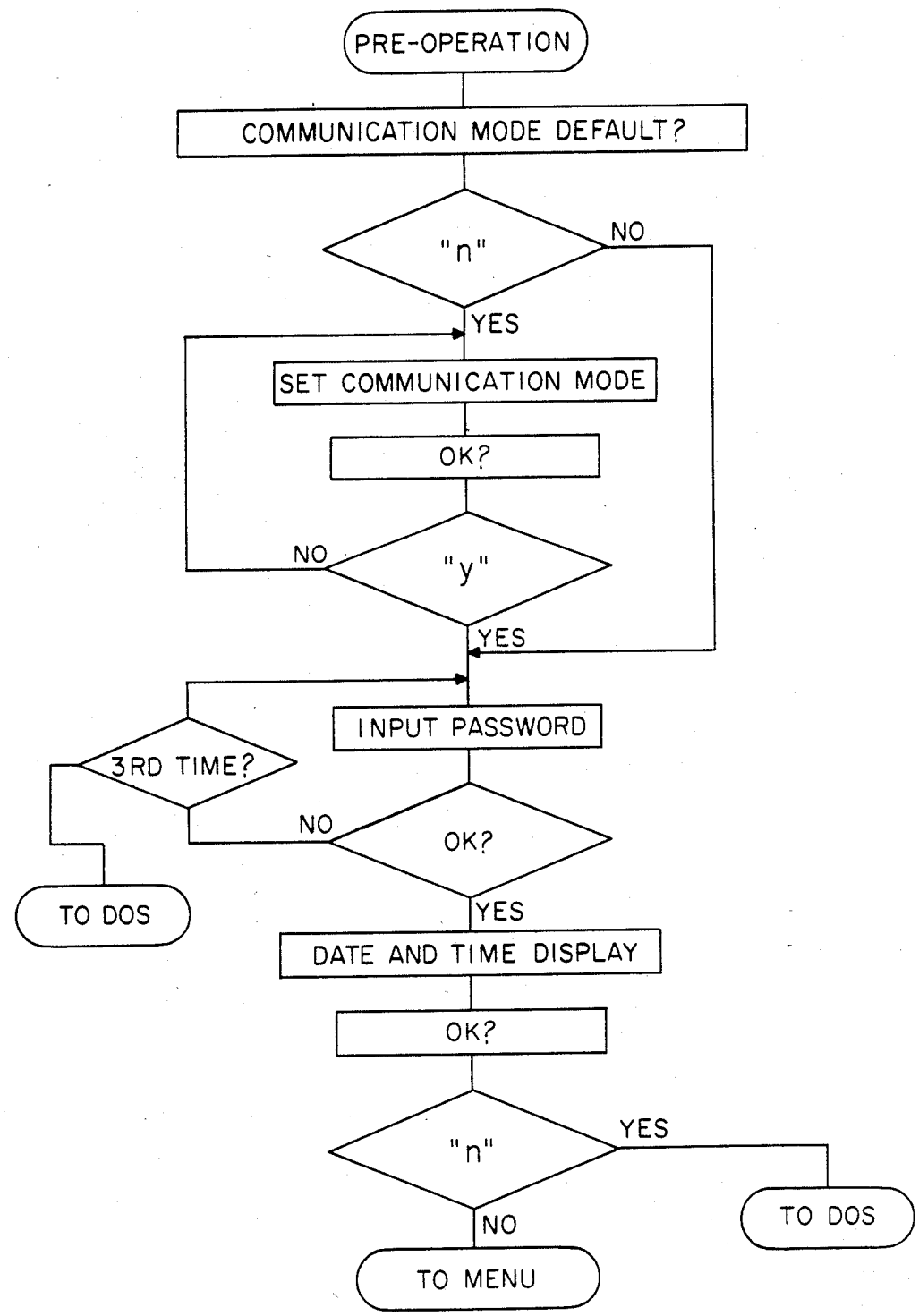
FIGS. 18 through 22 show flow diagrams representing the initializer program flow in accordance with the invention.

FIG. 18 is a flow chart showing the pre-operation portion of the main program. The program first asks the user whether the communication parameters of baud rate, parity, stop bit and byte length should be set to their default values of 9600, none, 2 and 8, respectively. If not, the user then is requested to input other values for these parameters. The pass word is then requested, and if the entered password is satisfactory, the date and time are displayed for verification by the user. If the date and time are not correct, the user should input "n" which causes the program to return the system to DOS to allow the correct date and time to be entered. Once this has been done and the program reinitiated, if needed, the system completes the preoperation. Thereafter the screen displays five menu items of format, personalization, unlock, format with personalization, and end. The user selects which one of the five menu items he desires. The first four menu items are now described.

FORMATTING (INITIALIZATION)

Figure 19:
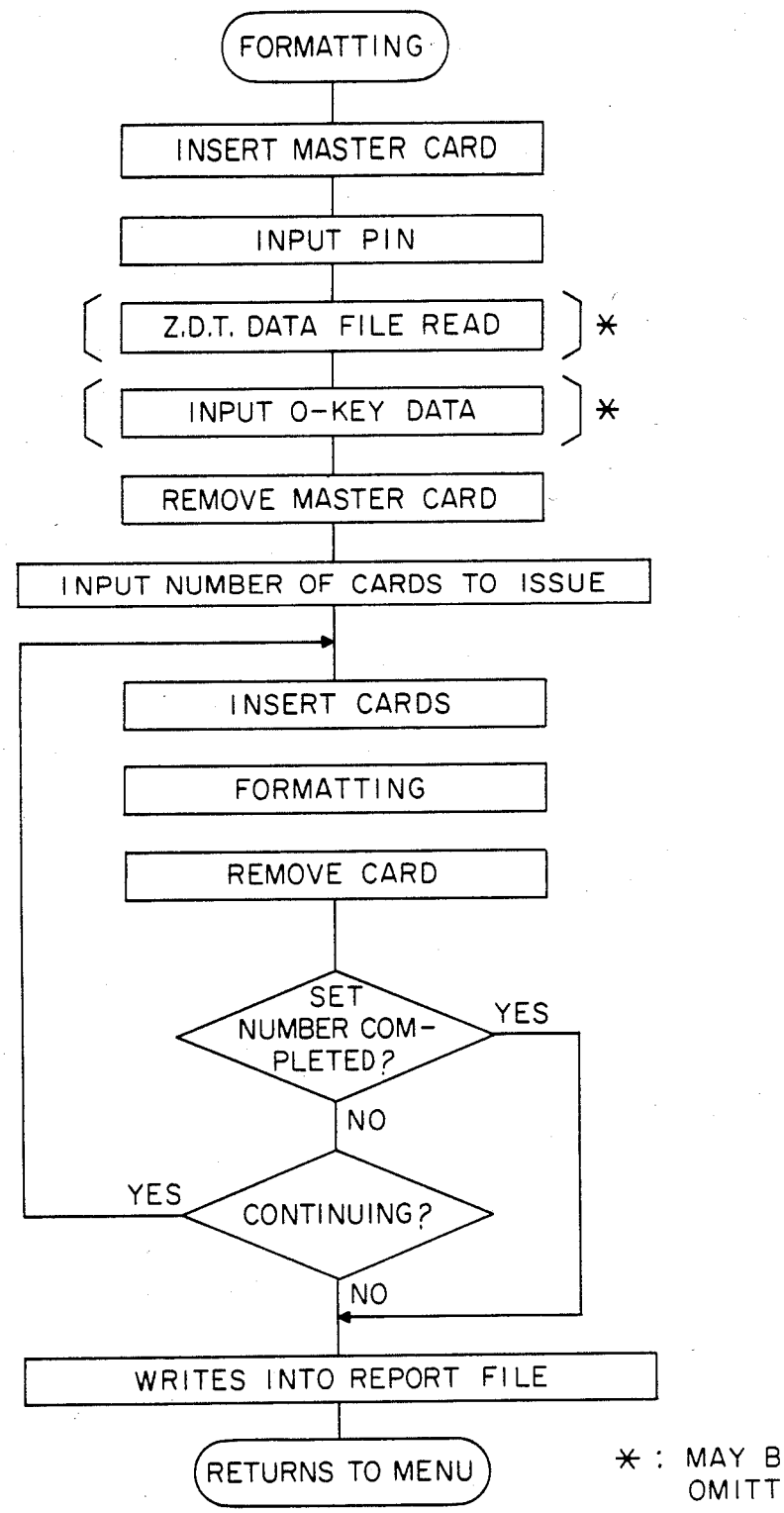

FIG. 19 shows the flow chart for the formatting program. When this menu item is selected, the master card is inserted by the user, and the PIN number for the master card is requested and entered by the user. If the inserted master card contains the ZDT data and the O-key (or a corresponding key for a different embodiment) such data and key are automatically read, and the master card is ejected. The program then asks the user to enter the number of cards which are to be formatted. If the inserted master card does not contain the ZDT data, the system reads the ZDT data file from the memory associated with the host computer. The file contents are then displayed and checked by the user. If the inserted master card does not contain the O-key data, this data is entered from the keyboard by the user. The master card processing is then complete, and the IC cards to be formatted are then inserted into the initializer. Each time a card is formatted, the user is asked whether or not the formatting should continue for the remaining cards or whether the formatting should be terminated. When the desired number of cards have been formatted, the main program returns to the menu.

PERSONALIZATION

Figure 20:
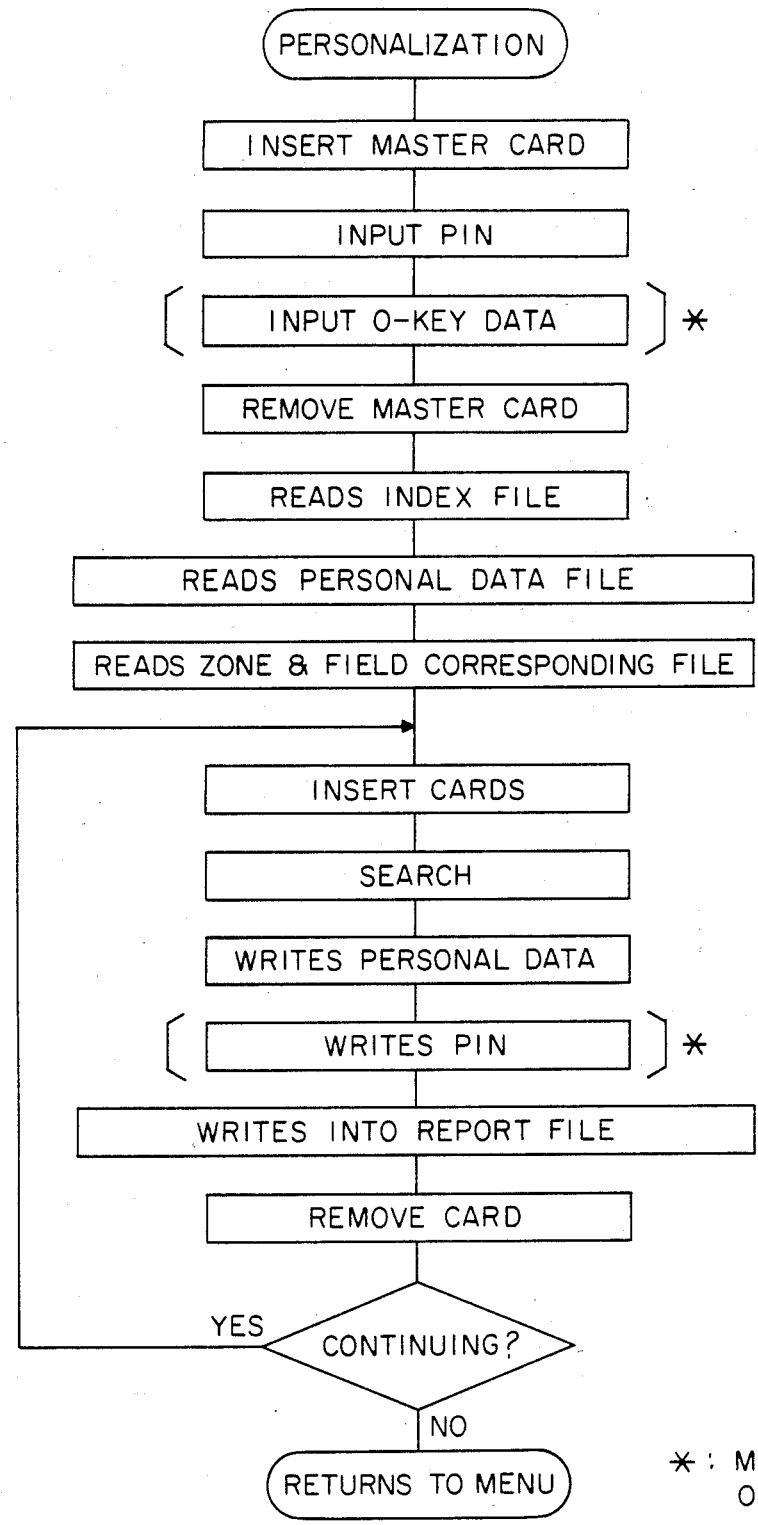

FIG. 20 shows the flow diagram for the personalization program. In accordance with this program, master card insertion is requested, and if the inserted master card is found to be correct, the entry of the PIN number for the master card is requested from the user. If the master card contains the O-key, the system automatically reads the key, and the master card is ejected. However, if the master card does not contain the O-key data, the user must enter this data via the keyboard. The system then reads the three files necessary for personalization, namely: the index file; the personal data file; and the zone and field correspondence file. After the system has read the contents of all the necessary files, it requests the insertion of cards to personalize. The cards inserted into the initializer at this point must have been previously formatted and have the appropriate magnetic data encoded on their magnetic stripes in order to allow the host computer to find the proper personal data file in the mass storage medium.

The IC cards are then fed, one at a time, into the initializer. The initializer reads the magnetic stripe on each card to find the personal code and obtains the personal data file corresponding to that personal code from the mass storage medium and writes the personal data from the file into the IC card memory. At this time the PIN key may also be written into the IC card. The PIN number may also be written into the IC card at a later time by the system user. After each card is personalized, the system requests whether further personalization of the remaining cards should continue. Once all of the cards have been personalized or upon early termination of the personalization process, the main program returns to the menu.

UNLOCK PROCESS

Figure 21:
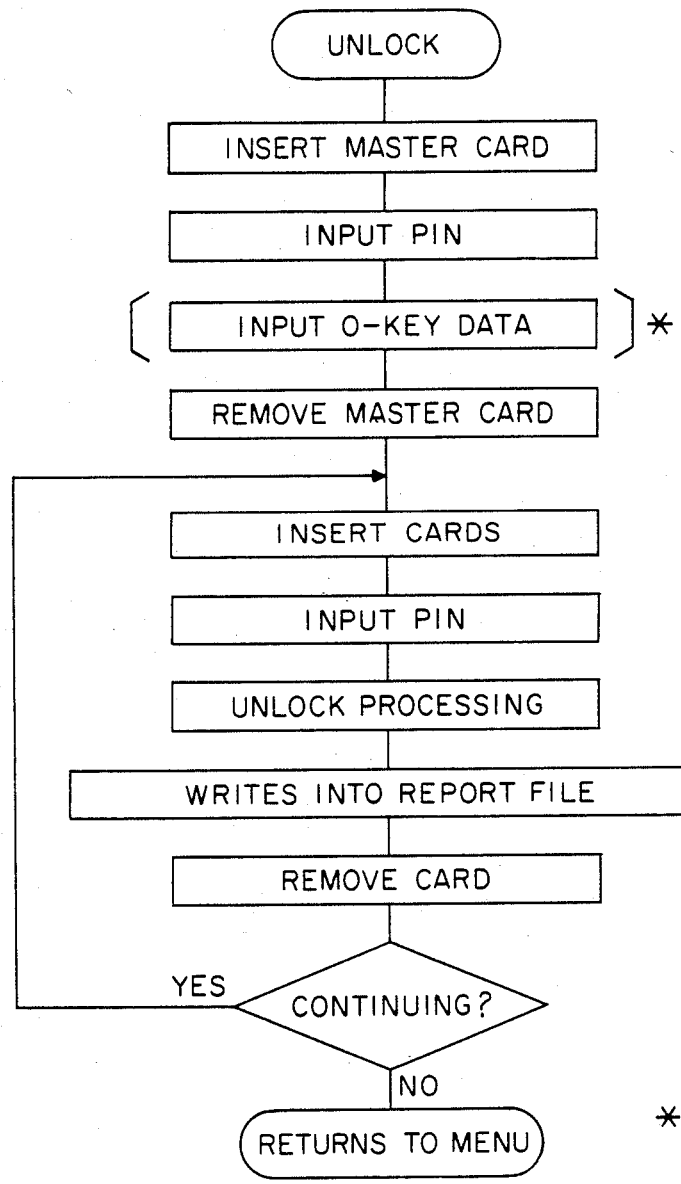

FIG. 21 shows the flow chart procedure for the unlock process. According to this process, the program asks the user to insert the master card and to input the PIN key for the master card. The O-key is then entered by the user from the keyboard of the host computer if the inserted master card does not contain this key. The master card is then removed and the IC cards to be unlocked are then inserted. The individual PIN keys associated with each card are then entered, and the system checks to see whether these PIN numbers are correct. After each card is unlocked (or if unlock is refused because of an improper PIN number), the card is ejected and the user has the option of continuing with further unlocking of the other cards or returning to the menu.

FORMATING AND PERSONALIZATION IN COMBINATION

Figure 22:
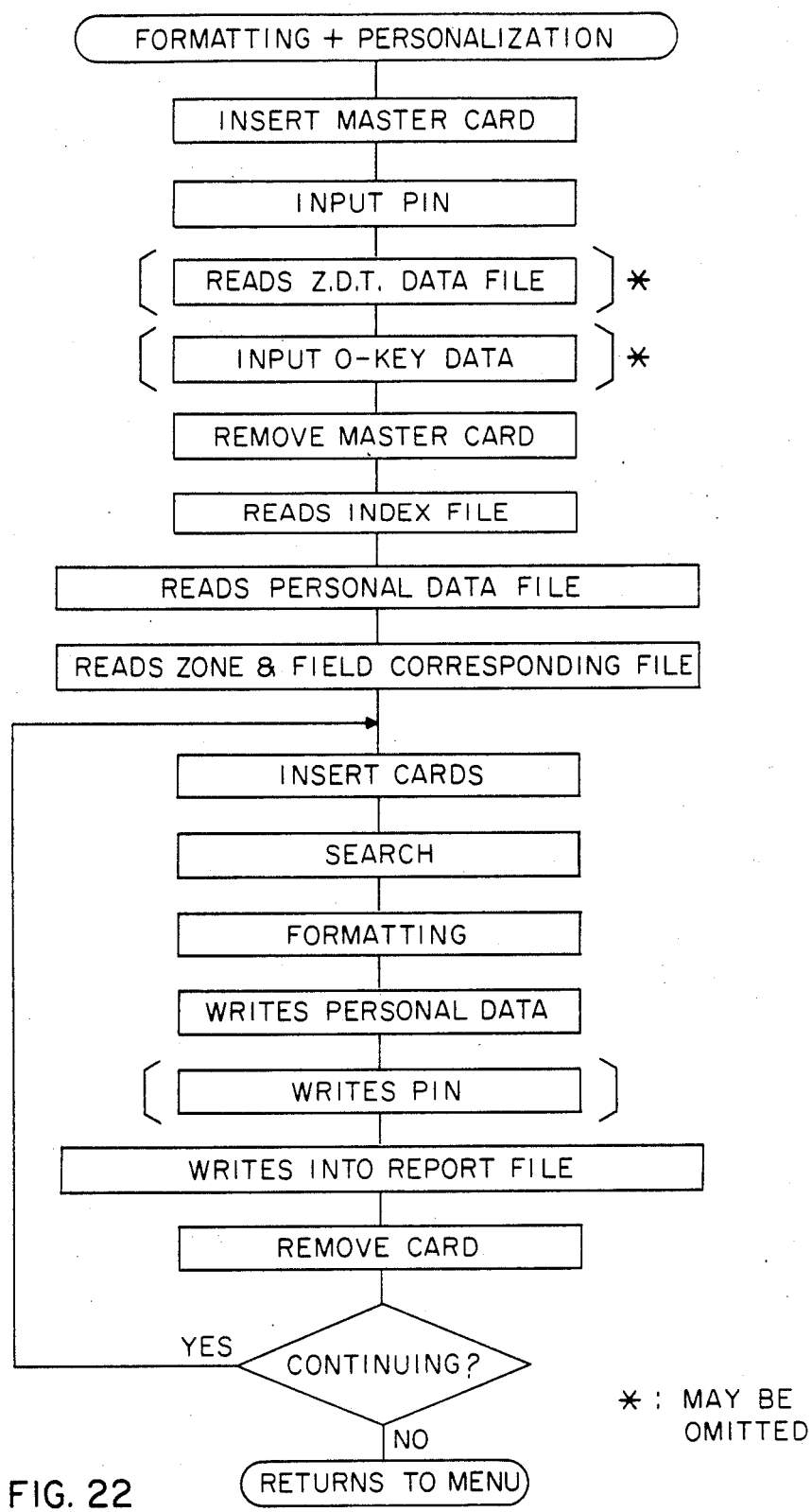
Figure 29:
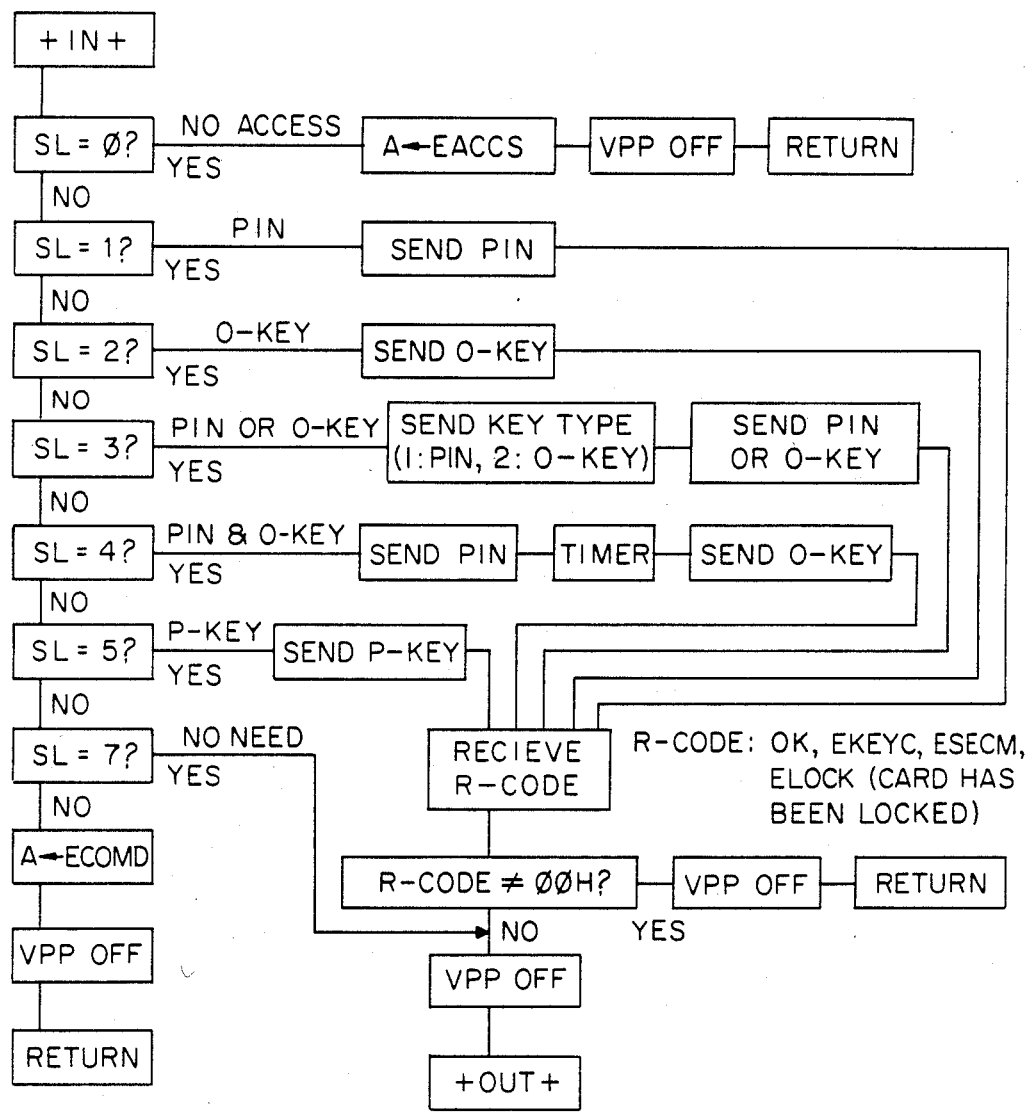
Figure 35:
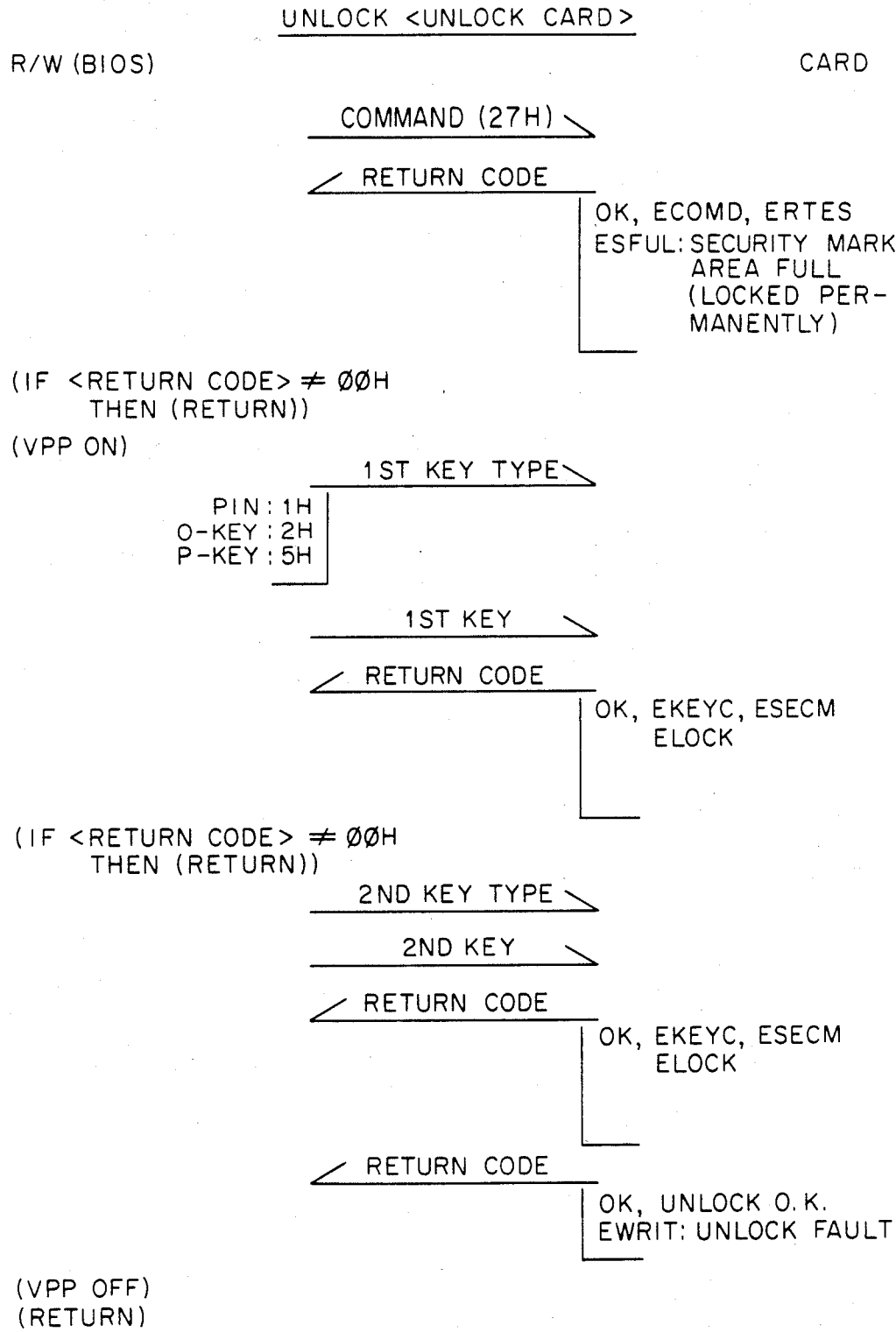

FIG. 22 shows the flow chart for the formatting (initialization) with personalization in combination. This flow chart is essentially a combination of the individual steps from the formatting and personalization flow charts of FIGS. 19 and 20.

OUTPUT FILE

An output file called XREPORT (wherein X may be replaced by F, P, U or C depending upon the type of operation carried out by the initializer, i.e., formatting, personalization, unlocking or formatting and personalization combined) is prepared during initializer operation. All errors made during the operation are recorded in a file called XERROR, wherein X may be replaced by F, P, U or C. All file contents can be checked using conventional file handling means.

INITIALIZER COMMUNICATIONS SPECIFICATION

All communications between the host computer and the initializer are carried in string format comprising two bytes indicating string length, one byte indicating the type of string, bytes of data and one final byte indicating the checksum. The string length is a two byte field indicating the length of the entire string excluding the checksum byte at the end of the string. (The order of the field is the least significant byte first and the most significant byte last.) There are four types of strings, namely, a command string (designated by 01), a data string (02) and information string (03) and a control string (04). The data can be any number of bytes needed corresponding to a string type. The checksum is the sum of all string data just before the checksum and is provided in two's complement format.

The command string format is essentially the same general format as indicated above, except that the data comprises a command code and parameters. The format for the data string is also essentially the same as described above, except that the data includes a field indicating the number of data elements and another field indicating the data length in bytes. The format for the information string is essentially the same as that described above, except that the string length is fixed at 5, and the data includes error type and error detail examples. The format for the control string is also generally the same as that described above, except that the string length is fixed at 4 and the control code is one of three types, namely, 01H indicating ACK, 02H indicating NAK, 03H indicating EOT.

PROGRAM LISTING AND COMMAND CODES

A print listing for the reader/writer basic input/output system (BIOS) in accordance with the invention is included in Appendix I. A listing of the BIOS commands is provided in Table C herein. Table D herein lists these commands and shows the information transferred between the reader/writer and IC card during command execution, as well as the string format.

FIGS. 23 through 39 illustrate the command protocols between the reader/writer and IC card, showing the direction and sequence of command, parameters, return and error codes between the reader/writer and IC card. The commands illustrated in these figures correspond generally to many of the BIOS commands listed on Table C herein.

A print listing of the reader/writer application program, in accordance with the present invention, is also included in Appendix I. The commands used in the reader/writer application program are shown in Table E herein, which also illustrates the protocol used with the commands.

FIGS. 41 through 91B are flow charts of the IC card program, in accordance with the present invention. A print listing of the IC card program, in accordance with the invention, is included in Appendix I.

FIGS. 92 through 108B illustrate the command protocol between the host computer and initializer (I/Z) during the initialization process.

While a particular embodiment of an IC card security system has been shown and described, numerous variations and modifications will readily occur to those skilled in the art. The invention is not intended to be limited to the embodiment illustrated and described but is merely illustrative of the application of the principles of the invention, whose scope is pointed out in the appended claims.

TABLE B

| COMMAND CODE (hex) | NEMONIC | FUNCTION |
|---|---|---|
| 21H | PINWR | PIN Code WRITE |
| 23H | OKEYWR | Organization KEY WRITE |
| 25H | WRZDT | WRiTE Zone Definition Table |
| 26H | CLZDA | CLOSE Zone Definition Table Area |
| 24H | RDZDT | READ Zone Definition Table |
| 10H | RDZONE | READ RECORDS In a Zone |
| 11H | WRZN | WRITE RECORD onto a Zone |
| 13H | WRZNWV | WRITE RECORD onto a Zone with Verify |
| 15H | STWR | Record Status Byte Mark |
| 14H | STRD | Record Status Byte Read a Zone |
| 27H | UNLOCK | UNLOCK the locked Card |
| 28H | REMAIN | READ Number of Remaining Records |
| 30H | MTEST | CARD TEST AT MANUFACTURING |
| 31H | RTEST | CARD READ TEST |
| 42H | RDMPD | READ MASK PROGRAM DATA (NAME) |

TABLE C

BIOS COMMAND LIST
<BIHWT11C>

| COMMAND CODE (hex) | NEMONIC | FUNCTION |
|---|---|---|
| 01H | SELCR1 | Select Card reader #1 |
| 02H | SELCR2 | Select Card reader #2 |
| 03H | BZON | Buzzer on |
| 04H | BZOFF | Buzzer off |
| 05H | SDIN | RS-232C Data input |
| 06H | SDOUT | RS-232C Data output |
| 07H | CDINCK | Card in check |
| 08H | INIT | Initialize IC card reader/writer |
| 09H | CEJCT | Card eject |
| 10H | RDZN | Read a zone |
| 11H | WRZN | Write a zone |
| 13H | WRZNWV | Write a zone with verify |
| 14H | STRD | Read record status byte |
| 15H | STWR | Write record status byte |
| 21H | PINWR | Write Pin code |
| 23H | OKEYWR | Organization key write |
| 24H | RDZDT | Read Zone Definition Table |
| 25H | WRZDT | Write Zone Definition Table |
| 26H | CLZDA | Close Zone Definition Table Area |
| 27H | UNLOCK | security lock cancel |
| 28H | REMAIN | read remaining number of records |
| 30H | MTEST | Card test at manufacturing |
| 31H | RTEST | Card read test (test at using) |

TABLE C-continued

BIOS COMMAND LIST
<BIHWT11C>

| COMMAND CODE (hex) | NEMONIC | FUNCTION |
|---|---|---|
| 42H | RDMPD | Read mask program data | note:
command code and another parameter should be set to A-register and proper registers before BIOS call.

TABLE D

| COMMAND | INPUT | RETURN | | |
|---|---|---|---|---|
| SELCR1 (01H) | nothing | nothing | | |
| SELCR2 (02H) | nothing | nothing | | |
| CDINCK (07H) | nothing | A:return code | | |
| BZON (03H) | nothing | A:return code | | |
| BZOFF (04H) | nothing | A:return code | | |
| INIT (08H) | nothing | A:return code | Select reader #1. Only one time usable at power on. | |
| CEJCT (09H) | nothing | A:return code | | |
| SDIN (05H) | <DE:buffer address> | A:return code<br>C:number of input bytes<br>(including CR,LF code) | DE ↓<br>\| ASCII code \| CR \| LF \|<br>⟵ C bytes ⟶ | |
| SDOUT (06H) | DE:buffer address of output data | A:return code | DE ↓<br>\| ASCII code \| CR \| LF \| | |
| PINWR (21H) | HL:buffer address | A:return code | HL ↓<br>\| P-key,O-key \| Pin \|<br>⟵8⟶ ⟵4⟶ | |
| OKEYWR (23H) | HL:buffer address | A:return code | HL ↓<br>\| P-key \| O-key \|<br>⟵8⟶ ⟵8⟶ | |
| WRZDT (25H) | HL:buffer address<br>B:zone number (01H~FFH) | A:return code | HL ↓<br>\| P-key \| ZDT data \|<br>⟵8⟶ ⟵6⟶ | |
| CLZDA (26H) | HL:buffer address | A:return code | HL ↓<br>\| P-key \|<br>⟵8⟶ | |
| RDZDT (24H)<br>Needs one of 3 keys | B:zone number (01H~FFH)<br>C:key type<br>(1:Pin, 2:O-key, 5:P-key)<br>HL:buffer address<br><IX:buffer address><br>for read data> | A:return code<br>IX:buffer address<br>of read data | INPUT<br>HL ↓<br>\| KEY \|<br>⟵4 or 8⟶ | RETURN<br>IX ↓<br>\| ZDT \|<br>⟵6⟶ |

TABLE D-continued

| COMMAND | INPUT | RETURN | |
|---|---|---|---|
| RDZN (10H) | B:zone number (01H~FFH)<br>C:key type<br>bit0~3:1st key type<br>bit4~7:2nd key type<br>(C reg: \| 7-2nd-4 \| 3-1st-0 \| )<br>type:1H Pin type<br>2H 0-key, 5H P-KEY<br>FH No key<br>HL:buffer address<br>HL → \| 1st key \| 2nd key \|<br><IX:buffer address for read data> | A:return code<br>D:Number of records[N]<br>E:record length[L]<br>IX: read data buffer address | IX → No. 1 record / check byte / No. 2 record / check byte ... No.[N] record / check byte  [L] |
| | 2nd key type and 2nd key are not always necessary.<br>(and for lowest security level the 1st key is not needed either). | | |
| WRZN (11H) | B,C,HL: Same as RDZN command<br>E:data length(L bytes)<br>IY:buffer address of Write data | A:return code | IY → Data to be written  L |
| WRZNWV (13H) | B,C,HL,E,IY: Same as WRZN command | A:return code | |
| STWR (15H) | B,C,HL: Same as RDZN command<br>D:record No. (01H~FFH)<br>E: bit No. (0-7) | A:return code | |
| STRD (14H) | B,C,HL: Same as RDZN command<br><IX:buffer address for status bytes> | A:return code<br>D:number of records(N)<br>IX:buffer address of status bytes | IX → status bytes  N |
| UNLOCK (27H) Needs 2 of 3 keys | C:1st and 2nd key type<br>  1H:Pin<br>  2H:0-key<br>  5H:P-key<br>(C reg: \| 7-2nd-4 \| 3-1st-0 \| )<br>HL:buffer address of key | A:return code | HL → 1st key 2nd key |
| REMAIN (28H) | B,C,HL: Same as RDZN command | A:return code<br>D:number of records remaining a zone | |
| MTEST (30H) | nothing | A:return code(result) | Mfr. use |
| | 1st step: card memory blank check, 2nd step: test write and verify<br>Test write means to write test data on test address (see below table)<br>After MTEST command, card memory is like following:<br>Addr.(hex) 0 1 2 4 8 10 20 40 80 100 200 400 800 1000<br>Data.(hex) 00 22 22 33 44 55 66 77 88 99 AA BB CC DD | | |
| RTEST (31H) | nothing | A:return code(result) | Check test datas on test address |
| RDMPD (42H) | <IX:buffer address for mask program data> | A:return code | IX → mask program data |

TABLE E

Reader/Writer Application Program Commands

| COMMAND | INPUT | OUTPUT | COMMENTS |
|---|---|---|---|
| Read # Transactions left in Zone to write | | | Key must be previously set for the card being accessed. |
| RM | Command | | |
| RMP | Zone # | | |
| RMO | | Return Code | |
| RMB | | # Records left | |
| RME | Command<br>Key Type<br>Key<br>Zone # | Return Code<br># Records left | Key is not preset. |
| Read Zone | | | Key must be previously set |

TABLE E-continued

Reader/Writer Application Program Commands

| COMMAND | INPUT | OUTPUT | COMMENTS |
|---|---|---|---|
| RN | Command | | for the card being accessed. |
| RP | Zone # | | |
| RO | | Return Code | |
| RB | | # of Records | |
| | | Record length | |
| | | Record #1 to | |
| | | Record #n | |
| RE | Command | | Key is not preset. |
| | Key Type | | |
| | Key | | |
| | Zone # | | |
| | | Return Code | |
| | | # Records used | |
| | | Record length | |
| | | Record #1 to | |
| | | Record #n | |
| Write Zone | | | Key must be previously set for the card being accessed. |
| WN | Command | | |
| WP | Zone # | | |
| WO | Data | | |
| WB | | Return Code | |
| WE | Command | | Key is not preset. |
| | Key Type | | |
| | Key | | |
| | Zone # | | |
| | Data | | |
| | | Return Code | |
| Write Zone w/Verify | | | Key must be previously set for the card being accessed. |
| VN | Command | | |
| VP | Zone # | | |
| VO | Data | | |
| VB | | Return Code | |
| VE | Command | | Key is not preset. |
| | Key Type | | |
| | Key | | |
| | Zone # | | |
| | Data | | |
| | | Return Code | |
| Read Zone Definition | | | Key must be previously set for the card being accessed. |
| ZN | Command | | |
| ZP | Zone # | | |
| ZO | | Return Code | |
| ZB | | Zone Definition Bytes | |
| ZE | Command | | Key is not preset. |
| | Key Type | | |
| | Key | | |
| | Zone # | | |
| | | Return Code | |
| | | Zone Definition Bytes | |
| Card in Check | | | R/W returns Error Code if Card not in |
| CD | Command | | |
| | | Return Code | |
| Select Card Module | | | NO return code |
| C1 | | | |
| C2 | Command | | |
| Card Eject | | | Eject Card from selected module |
| CE | Command | | |
| | | Return Code | |
| Card Application Check | | | Application Type is in Zone 1 - No security |
| CA | Command | | |
| | | Return Code | |
| | | Application Info | |
| Get Key from Host | | | Gets the key and stores it for later use - for the logged card |
| GP | Command | | |
| GO | Key | | |
| | | Return Code | |
| Get Key from Control Card | | | Gets the key and stores it for later use - for card one only Pin for control card must be previously set (from host) |
| GCP | Command | | |
| GCO | | Return Code | |
| GC1 | | | |
| GC2 | | | |
| GC3 | | | |
| GC4 | | | |
| GC5 | | | |
| Test the Card | | | Simple read test routine |
| TR | Command | | |
| | | Return Code | |
| Status Byte Read | | | Key must be previously set for the card being accessed. |
| SR | Command | | |
| SRP | Zone # | | |
| SRO | | Return Code | |
| SRB | | # of Records | |
| | | Stat byte #1 to | |
| | | Stat byte #n | |
| SRE | Command | | Key is not preset. |
| | Key Type | | |
| | Key | | |
| | Zone # | | |
| | | Return Code | |
| | | # Records used | |
| | | Stat byte #1 to | |
| | | Stat byte #n | |
| Status Byte Write | | | Key must be previously set for the card being accessed. |
| SWN | Command | | |
| SWP | Zone # | | |
| SWO | Record # | | |
| SWB | Bit # (0-7) | | |
| | | Return Code | |
| SWE | Command | | Key is not preset. |
| | Key Type | | |
| | Key | | |
| | Zone # | | |
| | Record # | | |
| | Bit # (0-7) | | |
| | | Return Code | |
| Report Version R/W | | | Returns the version of the EPROM in the R/W |
| VRS | Command | | |
| | | Version Info | |
| Unlock Locked | | | Unlocks card that has been locked by security PIN and O-Key must be preset before use |
| UN | Command | | |
| | | Return Code | |
| Buzzer Control | | | Turns buzzer on (BN) or off (BF) for logged Card Module |
| BN | Command | | |
| BF | | Return Code | |
| Report Version Card | | | Returns the version of the program in the Card |
| DR | Command | | |
| | | Return Code | |
| | | Version Info | |
| Write PIN in | | | Writes the PIN into the card for security use |
| KP | Command | | |
| | O-Key | | |

TABLE E-continued

Reader/Writer Application Program Commands

| COMMAND | INPUT | OUTPUT | COMMENTS |
| --- | --- | --- | --- |
| | PIN (to be written) | Return Code | |

GENERAL INFORMATION:
All commands, and parameters sent to the card, if any for the particular command, are terminated by an ASCII Carriage Return - Line Feed pair of characters. Additionally, all data transmissions from the Reader/Writer are also terminated by an ASCII Carriage Return - Line Feed pair of characters.
All commands which require a key to operate (unless there is a choice of keys available) require that the key be previously set for the R/W - either from the host or from the control card. The E (Either) option requires the key type and key be entered from the host program.

TABLE F

Command codes are:
00H: NOP
01H: Card in
02H: Card out
03H: Write magnetic data
04H: Read magnetic data
05H: Contactor down
06H: Contactor up
07H: Write a zone
08H: Read a zone with data
09H: Read a zone without data
0AH: Formatting
0BH: Unlock
0CH: Check sensor
0DH: On each output device
0EH: Off each output device
0FH: Transmit data
10H: Write PIN

We claim:

1. An IC information card comprising:
input/output means in the card for receiving at least data, commands and keycodes and for providing at least data;
nonvolatile read/write memory means within the card, the memory means having a multiplicity of addressable bit storage locations;
first means within the card responsive to a first command, zone definition data and an entered keycode received by the input/output means for comparing the entered keycode with a first keycode stored in the card and for writing the zone definition data in a first region of the memory means only if the received keycode matches the first keycode, the zone definition data comprising one or more zone definition words each corresponding to a respective data zone in a second region of the memory means, each zone definition word specifying at least the starting address of the corresponding data zone and the size of the corresponding data zone.

2. An IC information card according to claim 1, wherein the card further comprises second means within the card responsive to a second command, keycode data comprising one or more additional keycodes and an entered keycode received by the input/output means for comparing the entered keycode with the first keycode and for writing the keycode data in a third region of the memory means only if the entered keycode matches the first keycode, and wherein each zone definition word further specifies either no keycode or one or more of the first keycode and the additional keycode or keycodes as being required to be received by the input/output means in order to read data from the corresponding zone and either no keycode or one or more of the first keycode and the additional keycode or keycodes as being required to be received by the input/output means in order to write data in the corresponding data zone.

3. An IC information card according to claim 2, wherein the card further comprises third means within the card responsive to the input/output means receiving a read command, a code specifying a particular one of the data zones from which data is to be read and any entered keycode or keycodes, for comparing any entered keycode or keycodes with any keycode or keycodes specified as being required to read data in the particular data zone and for providing data from the particular zone to the input/output means if the entered keycode or keycodes match the keycode or keycodes specified as being required to read data from the particular data zone or if no keycode is specified as being required to read data from the particular data zone, and wherein the card further comprises fourth means within the card responsive to the input/output means receiving a write command, a code specifying a selected one of the data zones in which data is to be written, data to be written in the selected zone and any entered keycode or keycodes, for comparing any entered keycode or keycodes with any keycode or keycodes specified as being required to write data in the selected data zone and for writing the received data in the selected data zone if the entered keycode or keycodes match the keycode or keycodes specified as being required to write data in the selected data zone or if no keycode is specified as being required to write data in the selected data zone.

4. An IC information card according to claim 3, wherein data is stored in each data zone as successively located data records and each zone definition word further specifies the maximum number of data records that can be stored in the corresponding zone, the length of the data in each data record in the corresponding zone and a zone allocation area in the memory means for storing data indicative of the location of the next data record to be stored in the corresponding zone.

5. An IC information card according to claim 4, wherein the zone allocation area is located in the corresponding zone and contains one or more successively ordered bit positions each associated with a respective data record position in the zone, each bit position of the zone allocation area containing a first or a second binary state depending upon whether or not the data record position associated with that bit position contains a data record, respectively, and wherein the fourth means is further responsive to the contents of the zone allocation area of the selected zone for writing a data record in the selected zone in the data record position therein that is associated with the lowest order bit position of the zone allocation area therein containing the second binary state and for writing a first binary state in that lowest order bit position containing the second binary state.

6. An IC information card according to claim 4, wherein each data record stored in a data zone includes a checksum byte and a second status byte indicative of the validity of the data in the data record.

7. An IC information card according to claim 4, wherein each zone definition word further specifies whether the data provided to the input/output means by the third means in response to a read command and a code specifying data to be read from the corresponding zone is only the last data record to be written in the corresponding zone or all data records that are stored in the corresponding zone in the order in which such data records are written in the corresponding zone.

8. An IC information card according to claim 3, wherein the third region of the memory means further contains a plurality of successively ordered lock status words, including a first and a last lock status word, each lock status word having a predetermined number of successively ordered bit positions, including a first and a last bit position, each bit position of each lock status word being initially in a second binary state, and wherein the card further comprises fifth means within the card responsive to a failure of an entered keycode to match a keycode stored in the card, as a result of a keycode comparison made by the first, second, third or fourth means, for writing a first binary state in the lowest order bit position that is in the second binary state of the lowest order lock status word in which the highest order bit position is in the second binary state, the fifth means being responsive to a match of an entered keycode with a keycode stored in the card occurring directly after a failure of an entered keycode to match a keycode stored in the card, as a result of a comparison made by the first, second, third or fourth means, for writing a first binary state in the highest order bit position of the lock status word in which a first binary state was written by the fifth means in response to the directly preceding failure of an entered keycode to match a keycode stored in the card, and wherein the card further comprises sixth means within the card responsive to a lock status word having all but its highest order bit position in the first binary state for placing the card in a locked state in which at least reading and writing access to the first and second regions of the memory means are prevented, and seventh means within the card responsive to an unlock command and one or more entered keycodes for comparing the entered keycode or keycodes with preselected keycode or keycodes stored in the card and for writing a first binary state in the highest order bit position of the lock status word having all but the highest order bit position in the first binary state to release the card from the locked state, if the entered keycode or keycodes match the preselected keycode or keycodes.

9. An IC information card according to claim 8, wherein the first, second, third, fourth, fifth, sixth and seventh means are included in an appropriately programmed microprocessor operatively coupled to the input/output means and the memory means includes a programmable read-only memory operatively coupled to the microprocessor.

10. An IC information card system comprising:
a first and second IC information card each having:
(a) input/output means in the card for receiving at least data, commands and keycodes and for providing at least data,
(b) means storing a first keycode,
(c) nonvolatile memory means within the card having a first region for storing one or more keycodes and a second region segmented into a plurality of data zones, each one of the data zones being defined to require either no keycode or a specified one or more of the first keycode and the keycode or keycodes stored in the first region to be entered into the card in order to read data in that data zone and to require either no keycode or a specified one or more of the first keycode and the keycode or keycodes stored in the first region to be entered into the card in order to write data in that data zone,
(d) first means within the card responsive to the input/output means receiving a read command, a code specifying a particular one of the data zones in which data is to be read and any entered keycode or keycodes, for comparing any entered keycode or keycodes with any keycode or keycodes specified as being required to read data in the particular data zone and for providing data from the particular zone to the input/output means if the entered keycode or keycodes match the keycode or keycodes specified as being required to read data in the particular data zone or if no keycode is specified as being required to read data from the particular data zone, and
(e) second means within the card responsive to the input/output means receiving a write command, a code specifying a selected one of the data zones in which data is to be written, data to be written into the selected zone and any entered keycode or keycodes, for comparing any entered keycode or keycodes with any keycode or keycodes specified as being required to write data in the selected data zone and for writing the received data in the selected zone if the entered keycode or keycodes match the keycode or keycodes specified as being required to write data in the selected data zone or if no keycode is specified as being required to write data in the selected zone, wherein the memory means of the first card includes one or more data zones each storing a respective one or a combination of the first keycode and the keycode or keycodes stored in the first region of the memory means of the second card; and IC card reader/writer means having:
(a) a first and a second port for receiving the first and second cards, respectively, and for coupling to the input/output means thereof,
(b) coupling means for receiving at least commands, data and keycodes and for providing at least data,
(c) reader/writer memory means,
(d) first means responsive to the coupling means receiving a command to read the second card, a code specifying a particular zone in the second card in which data is to be read and any keycode or keycodes to be entered in the first card, for providing to the input/output means of the first card one or more read commands together with a code or codes specifying the data zone or zones of the memory means of the first card where the keycode or keycodes required to read data in the particular zone of the second card are stored and any keycode or keycodes received by the coupling means, for transferring such required keycode or keycodes to the reader/writer memory means if the keycode or keycodes received by the coupling means match the respective keycode or keycodes that are required to read the one or more data zones of the memory means of the first card or if no keycodes are required to read such data zones, for providing to the input/output means of the second card the read command, a code specifying the particular data zone and the keycode or keycodes for reading data in the particular zone transferred from the memory means of the first card to the reader/writer memory means, and for transferring any data provided by the input/output means of the second card to the reader/writer memory means, and (e) second means responsive to the coupling means receiving a command to write to the second card, a code specifying a selected zone in the second card in which data is to be written, data to be written in the selected zone and any keycode or keycodes to be entered in the first card for providing to the input/output means of the first card one or more read commands together with a code or codes specifying the data zone or zones of the memory means of the first card where the keycode or keycodes required to write data in the selected zone of the second card are stored and any keycode or keycodes received by the coupling means, for transferring such required keycode or keycodes to the reader/writer memory means if the keycode or keycodes received by the coupling means match the respective keycode or keycodes that are required to read the one or more data zones of the memory means of the first card or if no keycodes are required to read such data zones, and for providing to the input/output means of the second card the write command, a code specifying the selected zone, the data to be written in the selected zone and the keycode or keycodes required for writing data in the selected zone transferred from the memory means of the first card to the reader/writer memory.

11. IC information card system according to claim 10, wherein the memory means of the first card includes a first data zone containing an identification code for the card and wherein the reader/writer means further comprises third means for reading the first zone of the memory means of the first card following initial coupling of the first card to the reader/writer means and transferring the identification code therein to the reader/writer memory means and for reading the first zone of the memory means of the first card each time the coupling means receives a command to read the second card or command to write to the second card and comparing the contents read therein with the identification code stored in the reader/writer memory means, the third means preventing at least reading and writing of the memory means of the second card if the contents of the first data zone of the memory means of the first card fails to match the identification code stored in the reader/writer memory means.

12. An initialization system for IC information cards each including first means within the card responsive to a first command, zone definition data and an entered keycode received by the input/output means for comparing the entered keycode with a first keycode stored in the card for writing the zone definition data in a first region of the memory means only if the received keycode matches the first keycode, the zone definition data comprising one or more zone definition words each corresponding to a respective data zone in a second region of the memory means, each zone definition word specifying at least the starting address of the corresponding data zone and the size of the corresponding data zone, and second means within the card responsive to a second command, keycode data comprising one or more additional keycodes and an entered keycode received by the input/output means for comparing the entered keycode with the first keycode and for writing the keycode data in a third region of the memory means only if the entered keycode matches the first keycode, and wherein each zone definition word further specifies that either no keycode or one or more of the first keycode and the additional keycode or keycodes are required to be received by the input/output means in order to read data from the corresponding zone and either no keycode or one or more of the first keycode and the additional keycode or keycodes are required to be received by the input/output means in order to write data in the corresponding data zone, the system comprising:

input means for receiving one of the cards at a time to be initialized and for coupling to the input/output means of the card received thereby;

initializer memory means for storing the first keycode, appropriate zone definition data and additional keycode or keycodes;

first initializer means for writing the zone definition data stored in the initializer memory means to the first region of the memory means of the card received by the input means using the first command, and the first keycode stored in the initializer memory means; and second initializer means for writing the additional keycode or keycodes stored in the initializer memory to the third region of the memory means of the card received by the input means using the second command, and the first keycode stored in the initializer memory means.

13. An IC information card initializer system according to claim 12, wherein the first keycode, the zone definition data and the additional keycodes are stored in a master card which is received by the input means before receiving the first one of the cards to be initialized and the system further comprises third initializer means for transferring the first keycode, the zone definition data and the additional keycode or keycodes from the master card to the initializer memory means.

14. An IC information card initialization system according to claim 12, wherein the system further comprises automatic feeder means for receiving a multiplicity of the cards to be initialized and for feeding the cards one at a time to the input means and automatic receiving means for receiving a card after the zone definition data and the additional keycode or keycodes have been written into the memory means thereof.

15. An IC information card initialization system according to claim 12, wherein the card further includes third means within the card responsive to a write command, a code specifying a selected one of the data zones in which data is to be written, data to be written in the selected zone and any entered keycode or keycodes received by the input/output means for comparing any entered keycode or keycodes with any keycode or keycodes specified as being required to write data in the selected data zone and for writing the received data in the selected data zone if the entered keycode or keycodes match the keycode or keycodes specified as being required to write data in the selected data zone or if no keycode is specified as being required to write data in the selected data zone, and second memory means for storing a file identification code, and wherein the system further comprises:

means for reading the second memory means for obtaining the file identification code of a card received by the input means;

mass storage means for storing a multiplicity of data files each associated with a respective file identification number, each data file having a plurality of data segments corresponding to respective data zones of a card as defined by the zone definition data written into the card by the first initializer means;

third initializer means responsive to the file identification code obtained by the means for reading the second memory means for searching the data files in the mass storage means for the data file associated with that file identification code; and fourth initializer means for writing the segments of the associated data file into corresponding data zones of memory means of the card received by the input means using the write command and appropriate keycode or keycodes, if any, required for writing data in each corresponding data zone.

16. An IC information card initialization system according to claim 15 wherein the second memory means of the card is a magnetic stripe on the card and the means for reading the second memory means is a magnetic stripe reader.

17. In an IC information card containing a nonvolatile memory means having a multiplicity of addressable bit storage locations, a method for segmenting a data storage region of the memory means into a plurality of data zones, each having assignable attributes including an assignable security access level, the method comprising the steps of:

defining first, second and third regions in the memory means, the third region being the data storage region;

requiring the entry in the card of at least a first keycode for writing in the first and second regions of the memory means;

writing one or more keycodes in the first region of the memory means by entering the first keycode and any additional required keycodes; and writing zone definition data in the second region of the memory means by entering the first keycode and any additional keycodes, the zone definition data comprising one or more zone definition words each corresponding to a respective data zone in the third region of the memory means, each zone definition word specifying at least the starting address of the corresponding zone, the size of the corresponding zone and whether no keycode or one or more of the first keycode and the keycode or keycodes in the first region are required to be entered in the card to read data in the corresponding data zone and whether no keycode or one or more of the first keycode and the keycode or keycodes in the first region are required to be entered in the card to write data in the corresponding zone.

18. The method according to claim 17 wherein data is stored in each data zone as successively located data records and each zone definition word further specifies the maximum number of data records that can be stored in the corresponding zone, the length of the data in each data record in the corresponding zone and a zone allocation area in the memory means for storing data indicative of the location of the next data record to be stored in the corresponding zone.

19. In an IC information card containing a nonvolatile memory means having one or more data zones each requiring the entry in card of a respective keycode or combination of keycodes for reading data in the data zone and a respective keycode or combination of keycodes for writing data in the data zone, a method for preventing the dissemination of knowledge of the respective keycode or keycodes required for reading or writing in the data zones of the card comprising the steps of:

storing the respective keycode or keycodes required for reading or writing in the data zones of the memory means of the card in a separate control card; and transferring by two card reader/writer means any required keycode or keycodes from the control card to the card when reading or writing of a selected one of the data zones in the memory means of the card is to be carried out.

* * * * *

UNITED STATES PATENT AND TRADEMARK OFFICE
CERTIFICATE OF CORRECTION

PATENT NO. : 4,742,215

DATED : May 3, 1988

INVENTOR(S) : Turpen A. Daughters et al

It is certified that error appears in the above-identified patent and that said Letters Patent is hereby corrected as shown below:

On the title page, item [56], under "U.S. PATENT DOCUMENTS", after "4,105,156" insert -- 8/1978 --

On the title page, item [56], under "U.S. PATENT DOCUMENTS" insert -- 4,204,113  5/1980  Giraud et al--.

Col. 3, line 7, "care" should read -- card --.  Col. 5, line 14, ", means" should read -- means, --.  Col. 9, line 6, before "$C_1$" insert -- terminals --; line 51, "usin9" should read -- using --; line 51, "write read" should read -- write-read --.  Col. 18, line 18, "a one" should read -- one --.  Col. 24, lines 1-4 should appear directly under Col. 23, line 5.  Col. 28, line 51, "Unlock Locked" should read -- Unlock Locked Card --.  Col. 29, line 41, delete "bit".

Signed and Sealed this

Seventeenth Day of April, 1990

Attest:

HARRY F. MANBECK, JR.

*Attesting Officer*  *Commissioner of Patents and Trademarks*